(12) United States Patent
Wang et al.

(10) Patent No.: US 12,576,467 B2
(45) Date of Patent: Mar. 17, 2026

(54) WORKPIECE CONVEYING DEVICE AND COMPUTER NUMERICAL CONTROL APPARATUS

(71) Applicant: MAKEBLOCK CO., LTD., Shenzhen (CN)

(72) Inventors: Jianjun Wang, Shenzhen (CN); Zuoliang Zhao, Shenzhen (CN); Wenhua Wang, Shenzhen (CN); Kunliang Liu, Shenzhen (CN); Jiong Yang, Shenzhen (CN)

(73) Assignee: MAKEBLOCK CO., LTD., Shenzhen (CN)

( * ) Notice: Subject to any disclaimer, the term of this patent is extended or adjusted under 35 U.S.C. 154(b) by 0 days.

(21) Appl. No.: 19/216,533

(22) Filed: May 22, 2025

(65) Prior Publication Data

US 2025/0303505 A1     Oct. 2, 2025

Related U.S. Application Data

(63) Continuation of application No. PCT/CN2023/133503, filed on Nov. 23, 2023.

(30) Foreign Application Priority Data

Nov. 23, 2022 (CN) ........................ 202223135117.X
Jan. 18, 2023 (CN) ........................ 202320170181.7
(Continued)

(51) Int. Cl.
B23K 37/047 (2006.01)
B23K 26/08 (2014.01)
(Continued)

(52) U.S. Cl.
CPC .......... B23K 37/047 (2013.01); B23K 26/083 (2013.01); B23K 26/702 (2015.10); B23K 37/0408 (2013.01)

(58) Field of Classification Search
CPC .. B23K 37/047; B23K 26/083; B23K 26/702; B23K 37/0408
See application file for complete search history.

(56) References Cited

U.S. PATENT DOCUMENTS

| | | | |
|---|---|---|---|
| 2009/0050439 A1 | 2/2009 | Gillmore | |
| 2021/0001507 A1* | 1/2021 | Zambarda | .......... B23K 37/0408 |
| 2022/0270910 A1* | 8/2022 | Kakinuma | ............ H01L 23/544 |

FOREIGN PATENT DOCUMENTS

| | | | |
|---|---|---|---|
| CN | 201156003 Y | * | 11/2008 |
| CN | 203612486 U | | 5/2014 |

(Continued)

OTHER PUBLICATIONS

International Search Report and Written Opinion received for PCT Application No. PCT/CN2023/133503 on Feb. 18, 2024, 10 pgs.
(Continued)

*Primary Examiner* — Gene O Crawford
*Assistant Examiner* — Abby A Jorgensen
(74) *Attorney, Agent, or Firm* — Merchant & Gould P.C.

(57) ABSTRACT

A workpiece conveying device for conveying workpieces to a machining device, includes a first conveying assembly and a second conveying assembly, the first conveying assembly and the second conveying assembly being arranged facing to each other, and the first conveying assembly and the second conveying assembly both being used for coming into contact with and conveying workpieces. The first conveying assembly and the second conveying assembly are spaced apart from each other to form a clamping part, the clamping part being used for clamping the workpieces. The workpiece conveying device can adapt to workpieces of different sizes,
(Continued)

thus increasing the degree of adaptation of the workpiece conveying device, and ensuring the working efficiency. Also provided is a computer numerical control apparatus.

33 Claims, 23 Drawing Sheets

(30) Foreign Application Priority Data

| Jan. 18, 2023 | (CN) | .......................... | 202320179810.2 |
|---|---|---|---|
| Sep. 28, 2023 | (CN) | .......................... | 202322669567.5 |
| Oct. 27, 2023 | (CN) | .......................... | 202322922423.6 |
| Nov. 17, 2023 | (CN) | .......................... | 202311548962.6 |

(51) Int. Cl.
| | | |
|---|---|---|
| *B23K 26/70* | (2014.01) | |
| *B23K 37/04* | (2006.01) | |

(56) References Cited

FOREIGN PATENT DOCUMENTS

| CN | 103846358 | A | | 6/2014 | | |
|---|---|---|---|---|---|---|
| CN | 106514256 | A | * | 3/2017 | .............. | B23P 23/00 |
| CN | 207255490 | U | * | 4/2018 | | |
| CN | 108406138 | A | | 8/2018 | | |
| CN | 207861506 | U | | 9/2018 | | |
| CN | 208466912 | U | | 2/2019 | | |
| CN | 210662510 | U | | 6/2020 | | |
| CN | 212221968 | U | | 12/2020 | | |
| CN | 212398594 | U | * | 1/2021 | | |
| CN | 112720038 | A | | 4/2021 | | |
| CN | 213163738 | U | | 5/2021 | | |
| CN | 213195897 | U | | 5/2021 | | |
| CN | 213560293 | U | | 6/2021 | | |
| CN | 113102887 | A | * | 7/2021 | .......... | B23K 26/083 |
| CN | 213820564 | U | | 7/2021 | | |
| CN | 213833540 | U | | 7/2021 | | |
| CN | 113417436 | A | | 9/2021 | | |
| CN | 215217508 | U | | 12/2021 | | |
| CN | 215418790 | U | | 1/2022 | | |
| CN | 113996948 | A | | 2/2022 | | |
| CN | 216066022 | U | | 3/2022 | | |
| CN | 217200536 | U | | 8/2022 | | |
| CN | 217749909 | U | | 11/2022 | | |
| CN | 219358327 | U | | 7/2023 | | |
| CN | 220050467 | U | | 11/2023 | | |
| KR | 20060103637 | A | | 10/2006 | | |
| KR | 20110076143 | A | * | 7/2011 | .......... | B23K 26/082 |
| TW | M422463 | U | | 2/2012 | | |
| WO | WO-9306963 | A1 | * | 4/1993 | .......... | B23K 37/047 |
| WO | WO-2023111265 | A1 | * | 6/2023 | .............. | B27M 1/08 |

OTHER PUBLICATIONS

Chinese Utility Model Patent Evaluation Report received for CN Application No. ZL2023201701817 on Jun. 24, 2024, 12 pgs.
Chinese Decision on Invalidation Request Examination received for CN Application No. 202320179810.2 on Jul. 28, 2025, 18 pgs.
Chinese Utility Model Patent Evaluation Report received for CN Application No. ZL 2023201798102 on Jun. 28, 2024, 8 pgs.

* cited by examiner

530

530

530

530

60

616

CNC

WORKPIECE CONVEYING DEVICE AND COMPUTER NUMERICAL CONTROL APPARATUS

CROSS-REFERENCE TO RELATED APPLICATION

The present disclosure is a continuation of International Patent Application No. PCT/CN2023/133503 filed on Nov. 23, 2023, which claims the priorities to Chinese Patent Application No. 202223135117.X titled "MATERIAL FEEDING DEVICE" and filed with the China National Intellectual Property Administration on Nov. 23, 2022, Chinese Patent Application No. 202311548962.6 titled "WORKPIECE CONVEYING APPARATUS AND COMPUTER NUMERICAL CONTROL APPARATUS" and filed with the China National Intellectual Property Administration on Nov. 17, 2023, Chinese Patent Application No. 202322669567.5 titled "PRESSURE MEASUREMENT ASSEMBLY, WORKPIECE CONVEYING DEVICE, AND COMPUTER NUMERICAL CONTROL APPARATUS" and filed with the China National Intellectual Property Administration on Sep. 28, 2023, Chinese Patent Application No. 202320179810.2 titled "MATERIAL FEEDING DEVICE AND LASER PROCESSING APPARATUS" and filed with the China National Intellectual Property Administration on Jan. 18, 2023, Chinese Patent Application No. 202320170181.7 titled "MATERIAL FEEDING FRAME, MATERIAL FEEDING DEVICE, AND LASER PROCESSING APPARATUS" and filed with the China National Intellectual Property Administration on Jan. 18, 2023, and Chinese Patent Application No. 202322922423.6 titled "MATERIAL FEEDING DEVICE AND LASER PROCESSING APPARATUS" and filed with the China National Intellectual Property Administration on Oct. 27, 2023.

FIELD

The embodiments of the present disclosure relates to the technical field of a computer numerical control apparatus, and in particular to a workpiece conveying device and a computer numerical control apparatus.

BACKGROUND

At present, during processing of a workpiece by most computer numerical control apparatuses, the workpiece is usually directly placed under a processing head of the computer numerical control apparatuses to be processed. If the workpiece to be processed has a relatively long size which exceeds a processing range of the computer numerical control apparatus, the user needs to convey the workpiece so that the remaining part to be process of the workpiece enters the processing range of the computer numerical control apparatus.

SUMMARY

A workpiece conveying device and a computer numerical control apparatus are provided according to embodiments of the present disclosure, which can convey workpieces of various sizes more easily and effectively, and better protect the workpieces.

In an aspect of some embodiments of the present disclosure, a workpiece conveying device is provided to convey a workpiece to a processing device.

The workpiece conveying device includes a first conveying assembly and a second conveying assembly. The first conveying assembly and the second conveying assembly are arranged to face each other, and are configured to contact and convey the workpiece.

A predetermined spacing distance is provided between the first conveying assembly and the second conveying assembly to form a clamping portion, and the clamping portion is configured to clamp the workpiece.

In another aspect of some embodiments of the present disclosure, a computer numerical control apparatus is provided and includes a processing device and the workpiece conveying device according to any one of the above solutions, wherein the processing device is connected to the workpiece conveying device, the workpiece conveying device is configured to convey a workpiece to the processing device, and the processing device is configured to process the workpiece.

The technical solutions according to the embodiments of the present disclosure have at least the following advantages.

The workpiece conveying device according to the present disclosure includes the first conveying assembly and the second conveying assembly. The first conveying assembly and the second conveying assembly are arranged facing each other, and are configured to contact and convey the workpiece. The predetermined spacing distance is provided between the first conveying assembly and the second conveying assembly to form the clamping portion to clamp the workpiece. Since the workpiece is clamped in the clamping portion, and is conveyed by the clamping portion, the workpiece can hardly be deflected when being conveyed. In this way, the problem such as a discontinuous pattern processed on the workpiece can be avoided, and the workpiece can be conveyed more stably, integrally and safely. Therefore, the processing device is ensured to completely engrave the desired pattern, thereby preventing waste of the workpiece and reducing the production cost of the processing device.

BRIEF DESCRIPTION OF THE DRAWINGS

The accompanying drawings herein are incorporated into the specification to constitute a part of the specification, illustrate embodiments consistent with the present disclosure, and are used to explain the principles of the present disclosure together with the specification. Apparently, the drawings in the following description only relate to some embodiments of the present disclosure, and for those skilled in the art, other drawings may be obtained based on these drawings without any creative effort.

DETAILED DESCRIPTION OF THE EMBODIMENTS

Exemplary embodiments will be described more fully with reference to the accompanying drawings. However, the exemplary embodiments can be implemented in various forms and should not be construed as being limited to the embodiments illustrated herein; on the contrary, these embodiments are provided to make the disclosure more comprehensive and complete, and to fully convey the concepts of the exemplary embodiments to those skilled in the art.

In the present disclosure, terms such as "first", "second" and the like are merely for description, and should not be construed as indicating or implying relative importance, or implicitly indicating the number of technical features being referred to. In this way, the feature defined by the terms "first", "second" may explicitly or implicitly include one or more such features. In the description of the present disclosure, the term "multiple" means two or more, unless otherwise clearly and specifically defined.

In the present disclosure, unless otherwise clearly specified and limited, the terms "assembly", "connection" and the like should be understood broadly. For example, the connection may be a fixed connection, a detachable connection, or an integral connection, or may be a mechanical connection or an electrical connection, or may be a direct connection or an indirect connection through an intermediate medium, or may be a communication of interiors of two elements or interaction relationship between two elements. For those skilled in the art, the specific meanings of the above terms in the present disclosure may be understood according to specific situations.

In addition, the described features, structures, or characteristics may be combined in any suitable manner in one or more embodiments. In the following description, numerous specific details are provided for thorough understanding of the embodiments of the present disclosure. However, those skilled in the art will appreciate that the technical solutions of the present disclosure may be implemented without one or more of the specific details, or other methods, components, apparatuses, steps and the like may be employed. In other situations, well-known methods, apparatuses, implementations, or operations are not illustrated or described in detail to avoid obscuring each aspect of the present disclosure.

Figure 1:
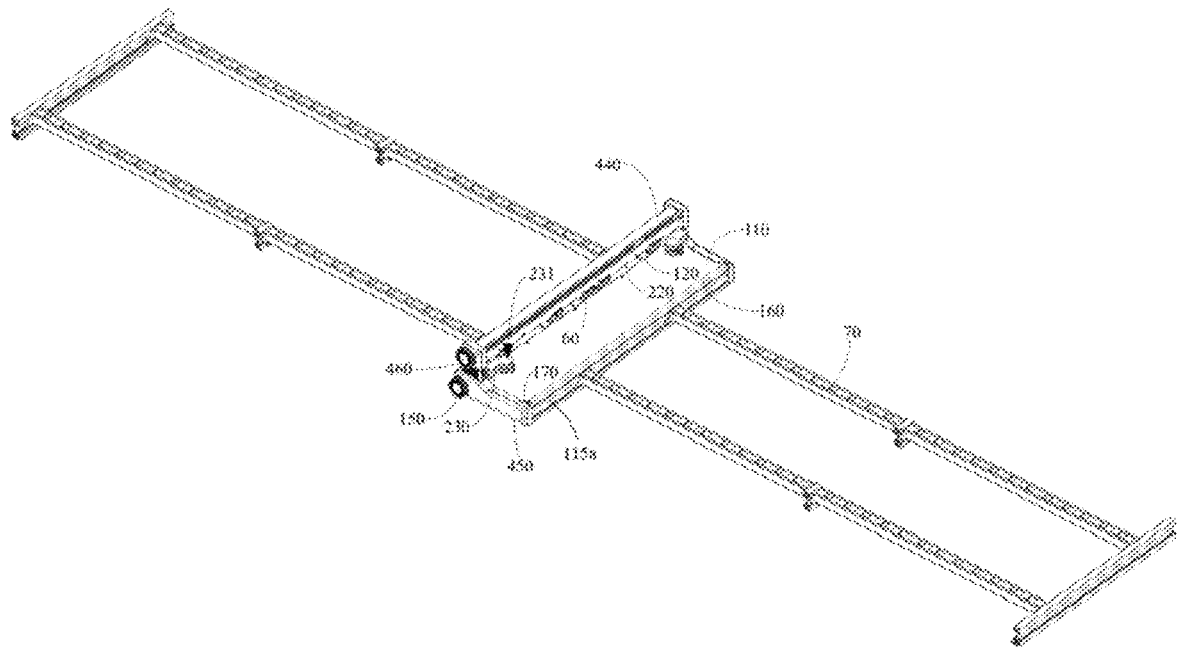
FIG. 1 is a schematic structural view of a workpiece conveying device according to an embodiment of the present disclosure.
Figure 2:
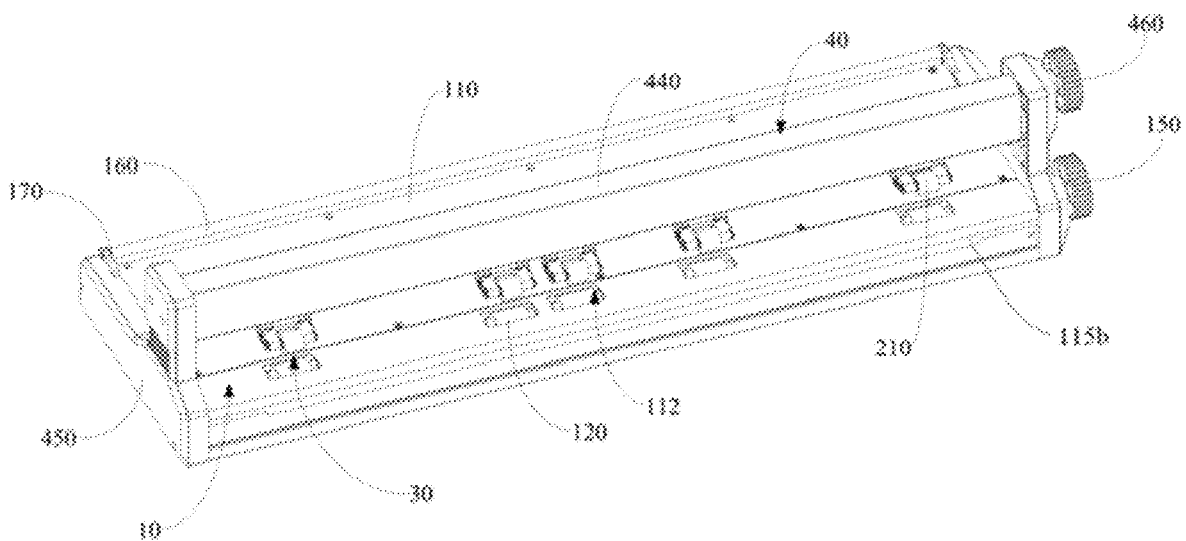
FIG. 2 is a schematic structural view showing a clamping portion formed between a first conveying assembly and a second conveying assembly according to an embodiment of the present disclosure.
Figure 54:
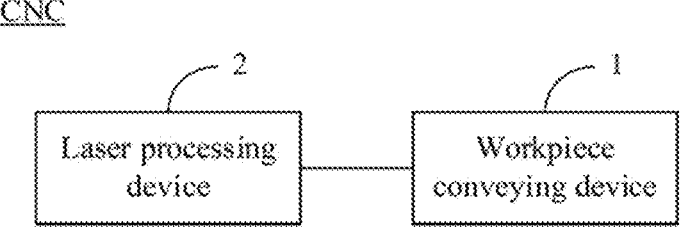
FIG. 54 is a functional block diagram of a computer numerical control apparatus according to an embodiment of the present disclosure.

Referring to FIGS. 1 and 2, a workpiece conveying device 1 is provided according to an embodiment of the present disclosure, which is applied to a computer numerical control apparatus CNC (as shown in FIG. 54) to convey a workpiece to a processing device 2 (as shown in FIG. 54). The workpiece conveying device 1 includes a first conveying assembly 10 and a second conveying assembly 20. The first conveying assembly 10 and the second conveying assembly 20 are arranged facing each other, and both the first conveying assembly 10 and the second conveying assembly 20 are configured to contact and convey the workpiece. A predetermined spacing distance is provided between the first conveying assembly 10 and the second conveying assembly 20 to form a clamping portion 30, and the clamping portion 30 is configured to clamp the workpiece to be conveyed to the processing device.

It may be appreciated that the computer numerical control apparatus may be a laser processing apparatus, a laser cutting apparatus, a laser engraving apparatus, a cutter processing apparatus or the like, which is not specifically limited herein.

It may be appreciated that the workpiece has two opposite surfaces which respectively contact the first and second conveying assemblies 10, 20 when the workpiece is clamped in the clamping portion 30 to be transported by the workpiece conveying device 1 and then can be automatically conveyed under friction forces between the conveying assemblies and the workpiece to the processing device, and that the workpiece can be positioned when being conveyed since it is clamped in the clamping portion 30, thereby preventing displacement of the workpiece. Specifically, the predetermined spacing distance formed between the first conveying assembly 10 and the second conveying assembly 20 may be equal to a thickness of the workpiece, or may be slightly smaller than the thickness of the workpiece, which can increase the friction force between feeding assemblies and the workpiece, so as to prevent sliding movement of the workpiece during transportation.

The workpiece conveying device 1 according to the embodiment of the present disclosure includes the first conveying assembly 10 and the second conveying assembly 20 which are arranged to face each other with the predetermined spacing distance formed therebetween to form the clamping portion 30. Since the workpiece is clamped in the clamping portion 30 when being conveyed, the workpiece can hardly be displaced during transportation, avoiding the problem of discontinuous pattern processed on the workpiece, and transporting the workpiece more stably, integrally and safely.

In a possible embodiment of the present application, referring to FIG. 2, the workpiece conveying device 1 further includes a lifting assembly 40. The lifting assembly 40 is connected to the first conveying assembly 10 and the second conveying assembly 20, and is configured to adjust the spacing distance between the first conveying assembly 10 and the second conveying assembly 20. That is, a size of the clamping portion 30 can be adjusted by the lifting assembly 40.

That is to say, the spacing distance between the first conveying assembly 10 and the second conveying assembly 20 can be adjusted by the lifting assembly 40, so that the size of the clamping portion 30 is adjusted. Further, workpieces of various thicknesses can be conveyed to the processing device by the first conveying assembly 10 and the second conveying assembly 20. With the lifting assembly 40, the workpiece conveying device 1 has increased adaptability and becomes more adaptive to the workpieces of various thicknesses.

Figure 3:
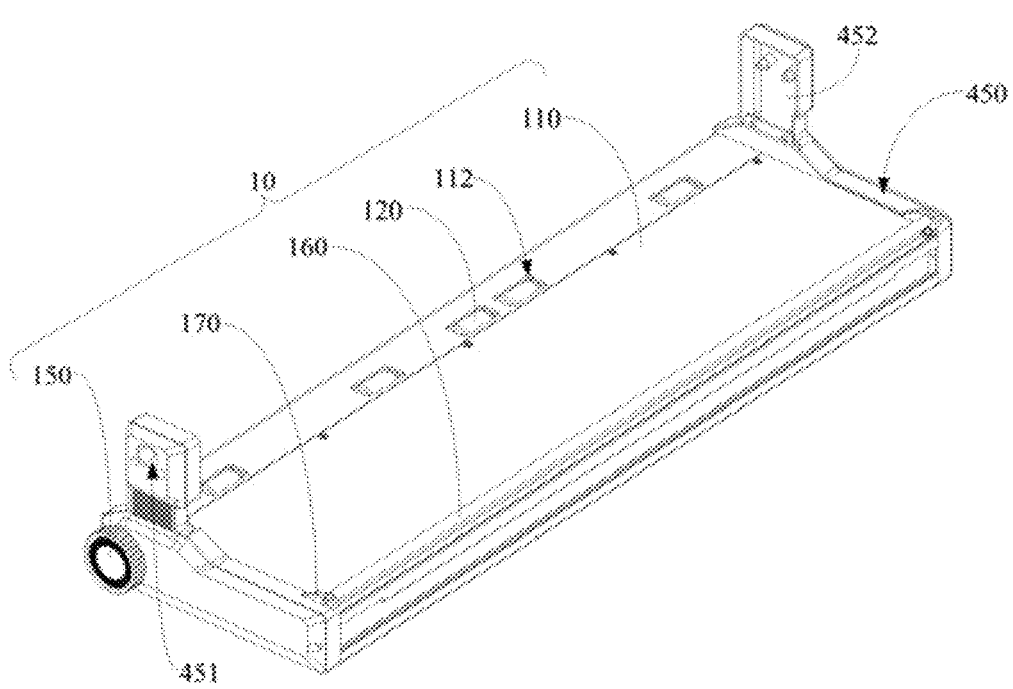
FIG. 3 is a schematic structural view showing fixing frames arranged on both sides of a feeding platform according to an embodiment of the present disclosure.

In a possible embodiment of the present application, as shown in FIG. 3, the first conveying assembly 10 includes a feeding platform 110 and a first roller 120. The first roller 120 is arranged on the feeding platform 110 and extends out of a surface of the feeding platform 110.

That is to say, the feeding platform 110 has a flat surface. A hole 112 is provided in the surface of the feeding platform 110 for protrusion of the first roller 120, and at least a part of the first roller 120 is exposed on the surface of the feeding platform 110 through the hole 112. The feeding platform 110 is configured to carry the workpiece, and the first roller 120 is configured to contact and convey the workpiece. The first roller 120 may be of a cylindrical structure, or a spherical structure, or any other structure that can convey the workpiece to the processing device.

Figure 4:
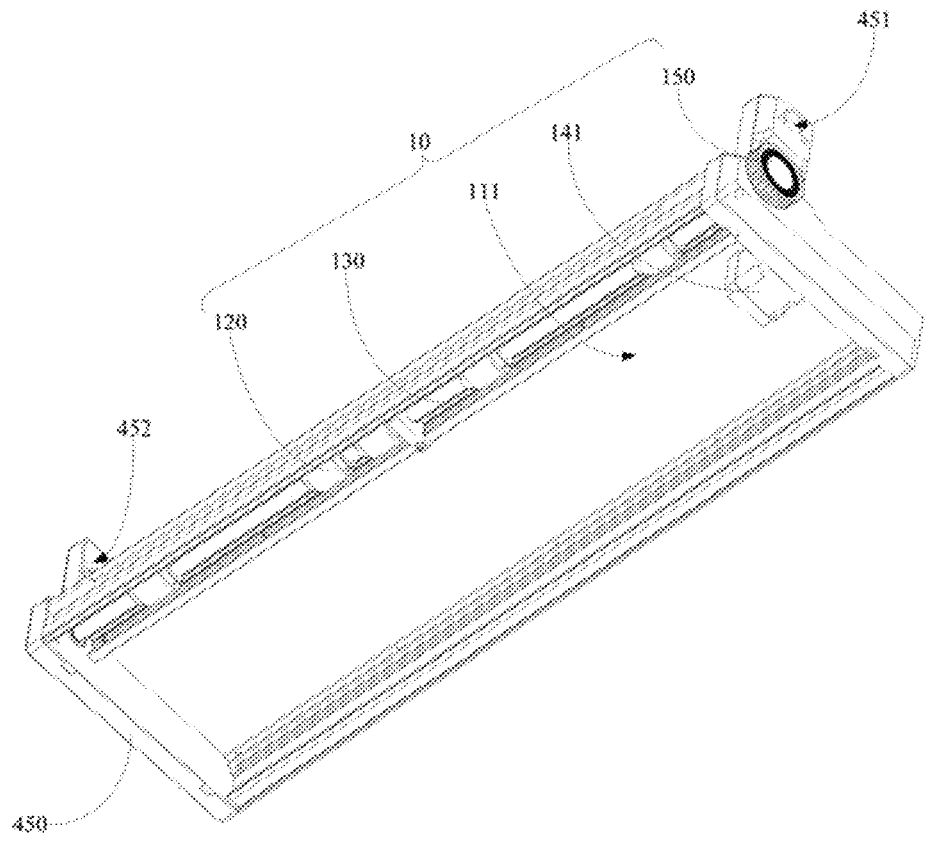
FIG. 4 is a schematic structural view showing a first rotating shaft, a first roller, and a body portion provided in an accommodation chamber according to an embodiment of the present disclosure.

In a possible embodiment of the present application, as shown in FIG. 4, an accommodation chamber 111 is provided in the feeding platform 110. The accommodation chamber 111 is in a cavity structure. A part of the first roller 120 is arranged inside the accommodation chamber 111, and the other part of the first roller 120 is exposed through the hole 112 of the feeding platform 110 to contact and convey the workpiece. Furthermore, to ensure the stability of conveying process and keep the workpiece to be intact, the first conveying assembly 10 includes multiple first rollers 120 that are spaced apart from each other. Each first roller 120 protrudes from the feeding platform 110 at the same height so as to ensure a contact area between each first roller 120 and the workpiece to be the same, such that each first roller 120 can contact the workpiece. In this way, the stability of conveying process may be ensured to prevent the workpiece from being skewed during conveying process, for example.

In a possible embodiment of the present application, referring to FIG. 4, the first conveying assembly 10 further includes a first rotating shaft 130 to facilitate mounting and fixing of the first rollers 120. The multiple first rollers 120 are provided on the first rotating shaft 130. A part of the first rotating shaft 130 on which the first rollers 120 are provided is arranged inside the accommodation chamber 111. When the first rollers 120 are replaced or mounted, the first rotating shaft 130 may be placed into or taken out of the accommodation chamber 111.

It may be appreciated that the first rollers 120 are fixedly mounted on the first rotating shaft 130, and do not rotate with respect to the first rotating shaft 130. If the multiple first rollers 120 are all arranged on the first rotating shaft 130, the multiple first rollers 120 rotate in a same direction and at a same speed, so as to ensure the stability of the conveying process of the workpiece, and avoid deviation of the workpiece during conveying process.

Figure 5:
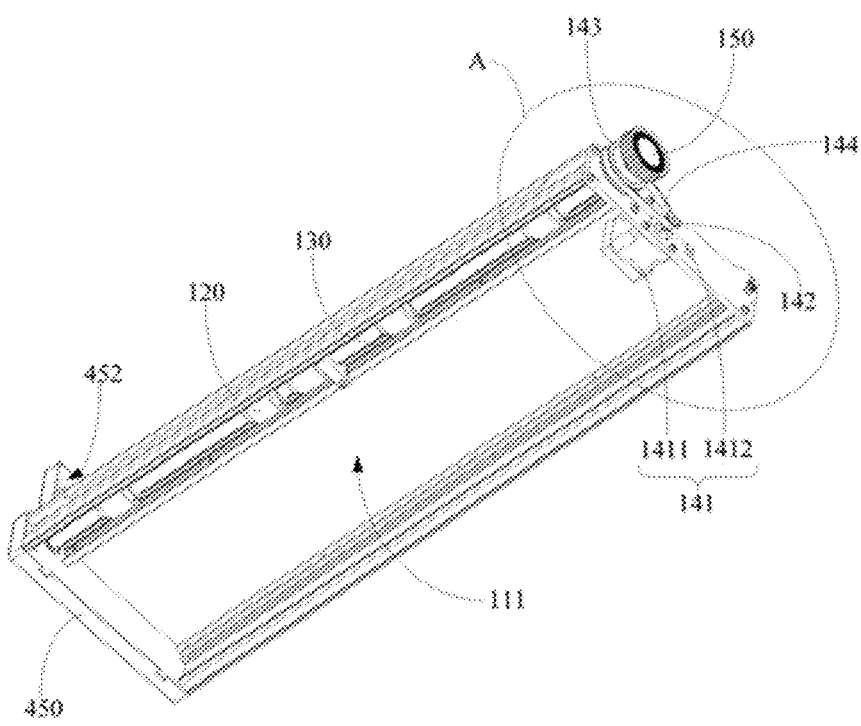
FIG. 5 is a schematic structural view showing connection between a driving wheel and a driven wheel by means of a transmission belt according to an embodiment of the present disclosure.
Figure 6:
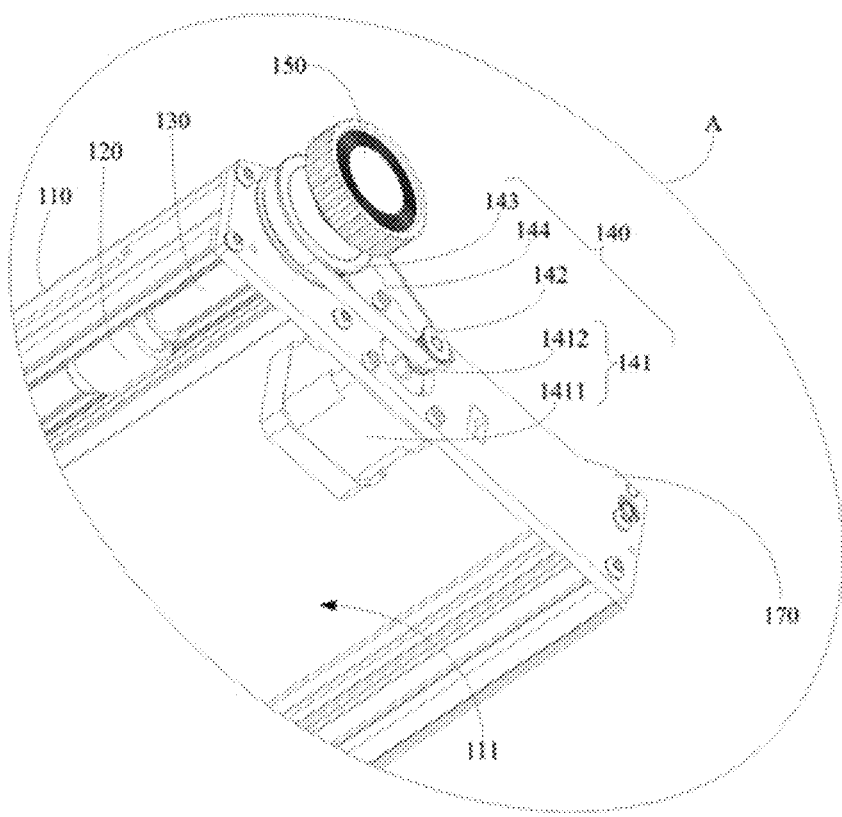
FIG. 6 is a schematic enlarged structural view of a portion A in FIG. 5 showing a driving component.

Furthermore, to ensure conveying of the workpiece, referring to FIGS. 5 and 6, the first conveying assembly 10 further includes a driving component 140. At least a part of the driving component 140 is arranged inside the accommodation chamber 111 and is connected to the first rotating shaft 130 to drive the first rotating shaft 130 to rotate, thereby driving the first rollers 120 to rotate. It may be appreciated that, since the first rollers 120 are fixedly mounted on the first rotating shaft 130, and do not rotate with respect to the first rotating shaft 130, the first rollers 120 rotate along with the first rotating shaft 130 to convey the workpiece when the first rotating shaft 130 is driven by the driving component 140.

In a possible embodiment of the present application, the feeding platform 110 has a casing, which defines the accommodation chamber 111. Two opposite ends of the first rotating shaft 130 pass through the casing and are exposed outside the accommodation chamber 111. Referring to FIG. 6, the driving component 140 includes a driving motor 141, a driving wheel 142, a driven wheel 143, and a transmission belt 144. The driving motor 141 includes a body portion 1411 and an output shaft 1412 connected to the body portion 1411. The body portion 1411 of the driving motor 141 is arranged inside the accommodation chamber 111, and the output shaft 1412 of the driving motor 141 passes through the casing of the feeding platform 110 to the outside of the accommodation chamber 111. The output shaft 1412 is fixedly connected to the driving wheel 142. The end of the first rotating shaft 130 exposed outside the accommodation chamber 111 is fixedly connected to the driven wheel 143. The transmission belt 144 is provided on the outer sides of the driving wheel 142 and the driven wheel 143, and is meshedly connected with the driving wheel 142 and the driven wheel 143. The output rate of the driving motor 141 is output trough the output shaft 1412. When the output shaft 1412 of the driving motor 141 rotates, the driving wheel 142 rotates along with the output shaft 1412, and drives the driven wheel 143 via the transmission belt 144 to rotate. Since the first rotating shaft 130 and the driven wheel 143 are fixedly connected to each other, the first rotating shaft 130 drives the first rollers 120 to rotate along with the first rotating shaft 130. In this way, the driving component 140 drives the first rollers 120 to rotate. Specifically, a radius of the driving wheel 142 may be smaller than a radius of the driven wheel 143, such that an angular velocity of the driving wheel 142 is higher than an angular velocity of the driven wheel 143. In this way, the driven wheel 143 rotates at a lower speed, enabling the first rollers 120 on the first rotating shaft 130 to rotate at a more stable speed.

Continuously referring to FIG. 6, in a possible embodiment of the present application, the workpiece may be manually conveyed. The first conveying assembly 10 includes a first knob 150 arranged on a side of the casing of the feeding platform 110 and connected to the end of the first rotating shaft 130 located outside the accommodation chamber 111. When the first knob 150 is rotated in a clockwise direction or a counterclockwise direction, the first rotating shaft 130 rotates in the same direction as the first knob 150, and further drives the first rollers 120 to rotate. In this way, by manually conveying, a rotation speed of the first rotating shaft 130 can be controlled in real time according to actual needs.

In a possible embodiment of the present application, the workpiece may be conveyed both by the driving component 140 and manually. That is, the first conveying assembly 10 includes both the driving component 140 and the first knob 150, which may be selected by a user depending on suitability of processing of the workpiece as needed, such that the processing device can better process the workpiece.

Figure 8:
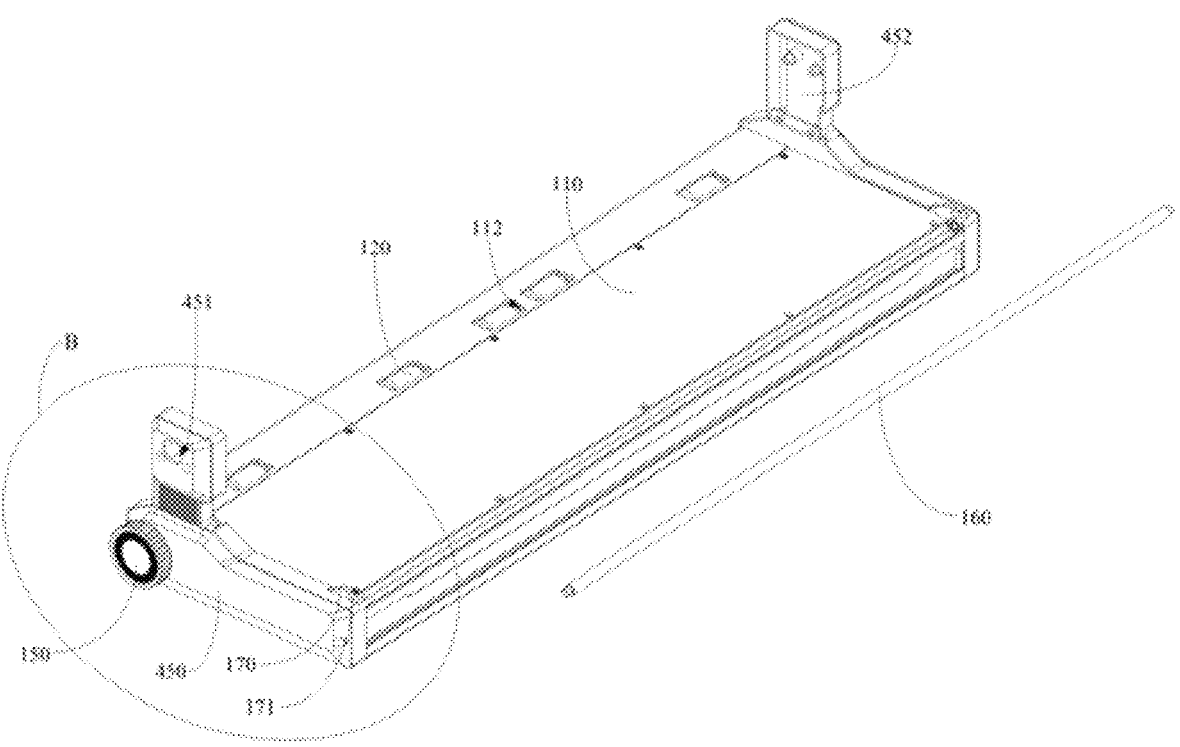
FIG. 8 is a schematic exploded structural view of a pressing rod and the feeding platform according to an embodiment of the present disclosure.
Figure 9:
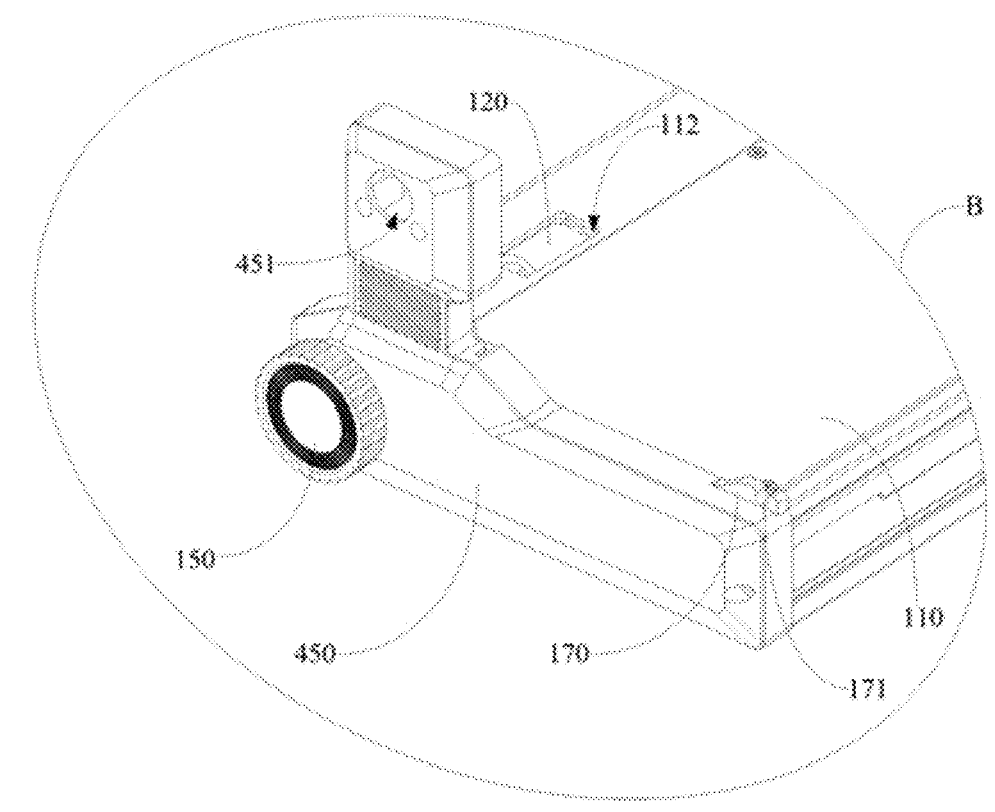
FIG. 9 is a schematic enlarged structural view of a pressing rod engagement portion in FIG. 8.

Referring to FIGS. 8 and 9, the first conveying assembly 10 further includes a pressing rod 160, and the feeding platform 110 is provided with a pressing rod engagement portion 170. The pressing rod engagement portion 170 extends from the surface of the feeding platform 110, and is provided with an engagement hole 171. The pressing rod 160 is detachably mounted on the pressing rod engagement portion 170 through the engagement hole 171, and a gap is present between the pressing rod 160 and the surface of the feeding platform 110. A relatively thin workpiece may be flattened in the gap between the pressing rod 160 and the surface of the feeding platform 110, which prevents the workpiece from being deformed during conveying.

Figure 10:
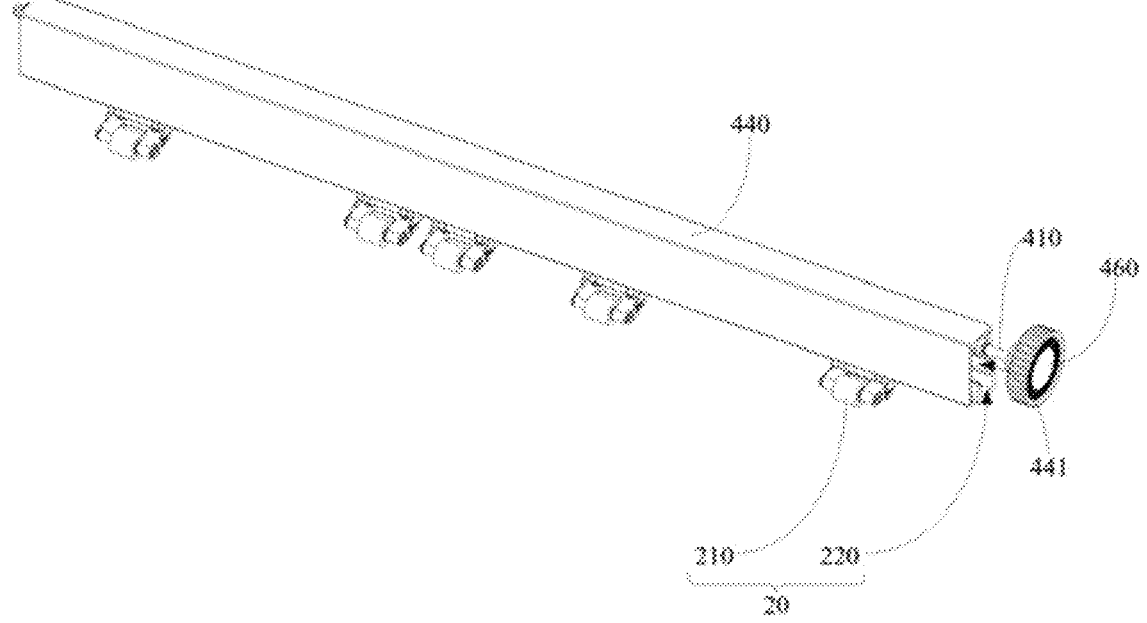
FIG. 10 is a schematic structural view showing connection between a lifting assembly and the second conveying assembly according to an embodiment of the present disclosure.
Figure 11:
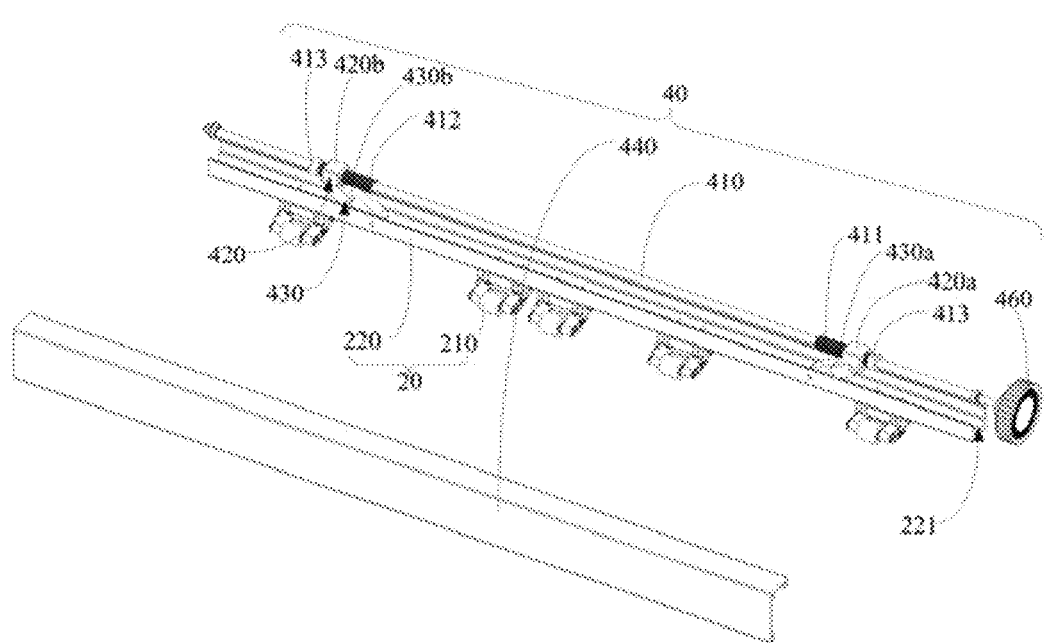
FIG. 11 is a schematic exploded structural view of a housing and a support frame according to an embodiment of the present disclosure.

In a possible embodiment of the present application, referring to FIGS. 10 and 11, the second conveying assembly 20 includes a second roller 210 and a support frame 220 that are connected to each other. The second roller 210 is configured to contact and convey the workpiece. It may be appreciated that the second roller 210 of the second conveying assembly 20 is in cooperation with the first roller 120 of the first conveying assembly 10 to convey the workpiece. The predetermined spacing distance is provided between the second roller 210 and the first roller 120 to form the clamping portion 130. The lifting assembly 40 is in connection with the support frame 220 and the first conveying assembly 10. The lifting assembly 40 is configured to adjust the support frame 220 to move away from or close to the first conveying assembly 10, thereby adjusting the spacing distance between the first roller 120 and the second roller 210 to adapt to more workpieces of various sizes, thereby improving the adaptability of the workpiece conveying device 1.

It is worth mentioning that the support frame 220 may be parallel to the feeding platform 110, and the support frame 220 may be of a frame structure.

It may be appreciated that an upper surface of the feeding platform 110 is smooth, which increases the smoothness of the workpiece on the feeding platform 110, and decreases a resistance to movement of the workpiece. According to the embodiment of the present application, the support frame 220 is arranged facing the upper surface of the feeding platform 110, so that the workpiece can be clamped between the support frame 220 and the upper surface of the feeding platform 110 when being conveyed, thereby preventing the workpiece from being deflected during conveying process.

Specifically, the number of the second roller 210 matches the number of the first roller 120. In this way, the workpiece can be conveyed more stably, and a relatively long workpiece can be easily conveyed. The second roller 210 is in correspondence to the first roller 120. The workpiece is clamped between the second roller 210 and the first roller 120, and is conveyed in a conveying direction by rotating the second roller 210 and the first roller 120 in opposite directions.

Figure 12:
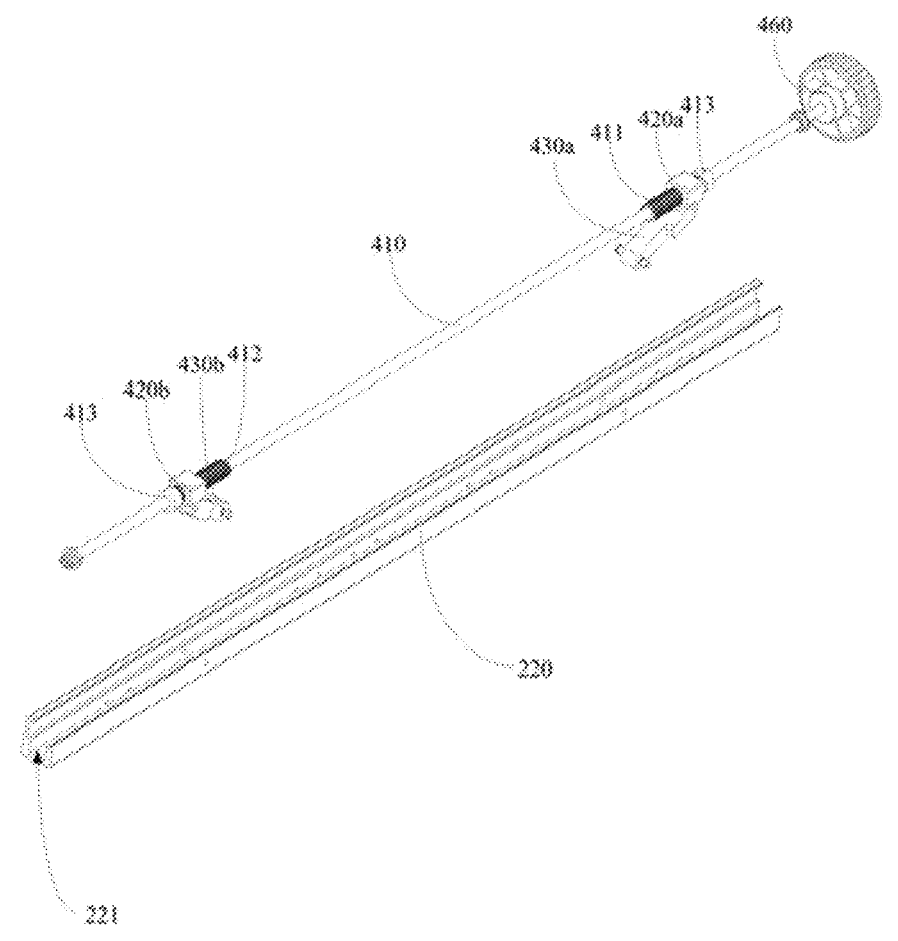
FIG. 12 is a schematic exploded structural view of the support frame and a part of the lifting assembly according to an embodiment of the present disclosure.

In a possible embodiment of the present application, referring to FIGS. 11 and 12, the lifting assembly 40 includes a second rotating shaft 410, a movable member 420, and a turning member 430. An axial direction of the second rotating shaft 410 is the same as an axial direction of the first rotating shaft 130. The movable member 420 is provided on the second rotating shaft 410, and is movable in an extension direction of the second rotating shaft 410. That is, the movable member 420 is movable in the axial direction of the second rotating shaft 410. One end of the turning member 430 is rotatably connected to the movable member 420, and the other end of the turning member 430 is rotatably connected to the support frame 220. When the second rotating shaft 410 rotates, the movable member 420 moves in the extension direction of the second rotating shaft 410, thereby driving the turning member 430 to rotate, which in turn drives the support frame 220 to move close to or away from the first conveying assembly 10. That is, when the second rotating shaft 410 rotates, the turning member 430 drives the second roller 210 to move close to or away from the first roller 120, thereby adjusting the spacing distance between the second roller 210 and the first roller 120 to adapt to workpieces of various thicknesses, and improving the adaptability of the feeding assemblies.

Specifically, one end of the turning member 430 is rotatably connected to the movable member 420 through a pin, and the other end of the turning member 430 is rotatably connected to the support frame 220 through another pin. It may be appreciated that, when the turning member 430 rotates to be perpendicular to the second rotating shaft 410, a distance between the support frame 220 and the second rotating shaft 410 is the largest, and the distance between the second roller 210 and the first roller 120 is the smallest. When the turning member 430 rotates to a position such that an angle between the turning member 430 and the second rotating shaft 410 is the smallest, the distance between the support frame 220 and the second rotating shaft 410 is the smallest, and the distance between the second roller 210 and the first roller 120 is the largest. It may be appreciated that, a relative linear motion of the second roller 210 and the first roller 120 may be achieved through a rotation motion of the second rotating shaft 410. The spacing distance between the second roller 210 and the first roller 120 can be easily adjusted through an external rotation.

Referring to FIG. 11, a first groove 221 is provided on a side of the support frame 220 close to the second rotating shaft 410, and an opening of the first groove 221 faces the second rotating shaft 410. The turning member 430 is rotatably connected to an inner wall of the first groove 221, and a width of the first groove 221 is larger than or equal to a size of the turning member 430. For example, the turning member 430 is rotatably connected to the inner wall of the first groove 221 through a rotating shaft, and the rotating shaft passes through and rotatably connected to two opposite side walls of the first groove 221. With the first groove 221 provided on the support frame 220, at least a part of the turning member 430 can be accommodated in the first groove 221 when the turning member 430 rotates. In this way, the turning member 430 and the support frame 220 are less likely to interfere with each other, and the support frame 220 can be lifted to a higher position, so that the clamping portion 30 is suitable for a workpiece of a larger thickness.

Furthermore, a screw, a crank-linkage structure, a worm-gear structure, a sprocket structure, a cam structure, a rack-and-pinion transmission structure or the like may be adopted to convert the rotation motion to the linear motion.

In a possible embodiment of the present application, the rotation is converted into the linear motion by a screw structure. In order to ensure the spacing distance between the second roller 210 and the first roller 120 to be stably adjusted, at least two movable members 420 and at least two turning members 430 are provided on the second rotating shaft 410.

In a possible embodiment of the present application, continuously referring to FIG. 11, two opposite ends of the second rotating shaft 410 are respectively provided with a first thread segment 411 and a second thread segment 412. The movable member 420 includes a first movable member 420a and a second movable member 420b, each of which has an internal thread. The internal thread of the first movable member 420a is rotatably engaged with the first thread segment 411, and the internal thread of the second movable member 420b is rotatably engaged with the second thread segment 412. Due to the threaded connection, the first movable member 420a can move linearly on the first thread segment 411 in the axial direction of the second rotating shaft 410 as the second rotating shaft 410 rotates. Correspondingly, the second movable member 420b can also move linearly on the second thread segment 412 in the axial direction of the second rotating shaft 410 as the second rotating shaft 410 rotates.

It may be appreciated that, referring to FIG. 12, the turning member 430 also includes a first turning member 430a and a second turning member 430b corresponding to the first movable member 420a and the second movable member 420b respectively. Two ends of the first turning member 430a are rotatably connected to the first movable member 420a and the support frame 220 respectively. The two ends of the first turning member 430a may be rotatably connected to the first movable member 420a and the first groove 221 of the support frame 220 respectively through rotating shafts. Correspondingly, two ends of the second turning member 430b are also rotatably connected to the second movable member 420b and the support frame 220 respectively. The two ends of the second turning member 430b may be rotatably connected to the second movable member 420b and the first groove 221 of the support frame 220 respectively through rotating shafts.

It may be appreciated that, since the lifting assembly 40 includes two movable members 420 respectively arranged at two opposite ends of the support frame 220 and two turning members 430 respectively arranged at the two opposite ends of the support frame 220, the force applied on the support frame 220 can be balanced, and the two ends of the support frame 220 can move upwards or downwards at the same time. Therefore, the spacing distance between the second roller 210 and the first roller 120 can be more stably adjusted and can be ensured to be constant, thereby conveying the workpiece more stably.

In a possible embodiment of the present application, the spacing distance between the second roller 210 and the first roller 120 can be adjusted by moving the first movable member 420a and the second movable member 420b with respect to each other.

Figure 13:
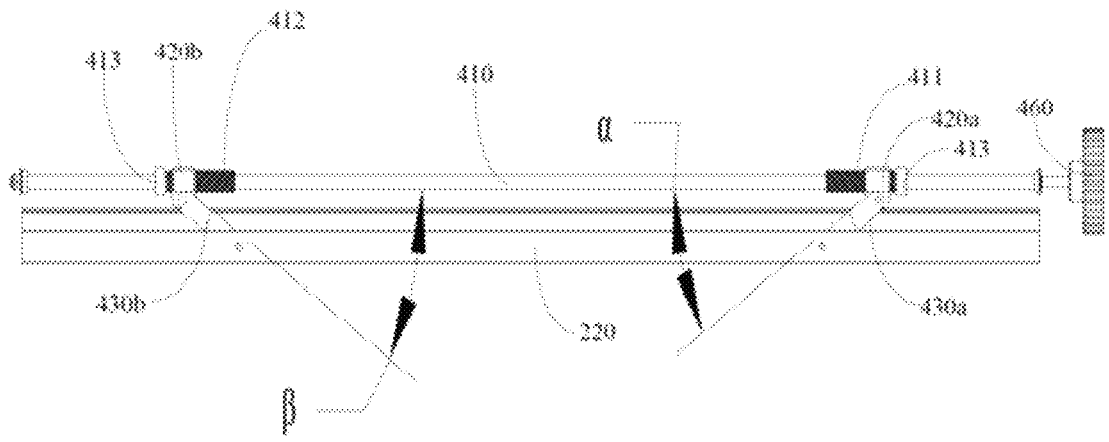
FIG. 13 is a schematic structural view showing two angles respectively formed between a first turning member and a second rotating shaft and between a second turning member and the second rotating shaft according to an embodiment of the present disclosure.

Specifically, referring to FIG. 13, the first thread segment 411 and the second thread segment 412 have threads in opposite directions. A first angle $\alpha$ is formed between the first turning member 430a and the second rotating shaft 410, and a second angle $\beta$ is formed between the second turning member 430b and the second rotating shaft 410. The first angle $\alpha$ and the second angle $\beta$ are arranged facing each other. When the second rotating shaft 410 rotates in a first circumferential direction, the first movable member 420a and the second movable member 420b move towards each other at the same time, so that the first angle $\alpha$ and the second angle $\beta$ gradually increase, and the support frame 220 moves close to the first conveying assembly 10. When the second rotating shaft 410 rotates in a second circumferential direction which is opposite to the first circumferential direction, the first movable member 420a and the second movable member 420b move away from each other at the same time, so that the first angle $\alpha$ and the second angle $\beta$ gradually decrease, and the support frame 220 moves away from the first conveying assembly 10.

The spacing distance between the second roller 210 and the first roller 120 can be adjusted by the movable member 420, the turning member 430 and the support frame 220, so as to match workpieces of various thicknesses, thereby improving the adaptability of the lifting assembly 40, and further enhancing the adaptability of the entire workpiece conveying device 1. As such, the computer numerical control apparatus can produce workpieces of more sizes.

It may be appreciated that, to prevent the movable member 420 from moving beyond a limit, the second rotating shaft 410 is provided with a limiting portion 413. The movable member 420 is located between two limiting portions 413. Referring to FIG. 13, the limiting portion 413 is configured to limit a moving range of the movable member 420 to prevent the excessive movement to damage to the turning member 430 and the support frame 220.

Figure 14:
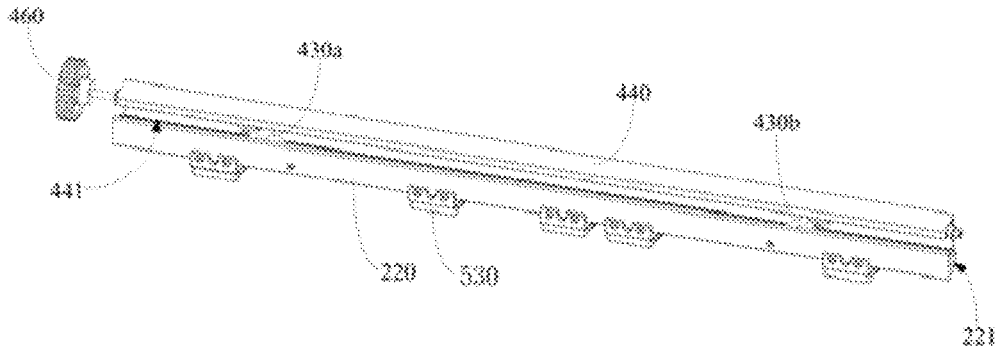
FIG. 14 is a schematic structural view of the support frame provided with a connector according to an embodiment of the present disclosure.

In a possible embodiment of the present application, referring to FIGS. 11 and 14, the lifting assembly 40 further includes a housing 440. The housing 440 is connected to the support frame 220 and, together with the support frame 220, defines an accommodation cavity 441. The second rotating shaft 410, the movable member 420, and the turning member 430 are all arranged in the accommodation cavity 441. The accommodation cavity 441 formed by the housing 440 and the support frame 220 can protect the second rotating shaft 410, the movable member 420 and the turning member 430, so as to keep the second rotating shaft 410, the movable member 420 and the turning member 430 intact, thereby ensuring adjustment accuracy of the spacing distance between the second roller 210 and the first roller 120, and stable conveying of the workpiece.

In a possible embodiment of the present application, continuously referring to FIG. 3, the lifting assembly 40 further includes a fixing frame 450 arranged on the first conveying assembly 10. The fixing frame 450 may be arranged at a side of the feeding platform 110 and is perpendicular to the feeding platform 110. The lifting assembly 40 may include two fixing frames 450 that are respectively located on two opposite sides of the feeding platform 110 and are arranged in sequence in the axial direction of the first rotating shaft 130. The fixing frames 450 are each provided with a mounting hole 451. The two ends of the second rotating shaft 410 are respectively connected to the mounting holes 451 of the fixing frames 450 in such a manner that the second rotating shaft 410 is rotatable in the mounting holes 451. The fixing frames 450 are configured to support the second rotating shaft 410 and the support frame 220, such that the spacing distance between the first roller 120 and the second roller 210 can be adjusted.

It is worth mentioning that the fixing frame 450 is fixedly connected to the feeding platform 110 and is perpendicular to the feeding platform 110. The fixing frame 450 may be fixed onto the feeding platform by a screw or a rivet, or by welding, or may be integrally formed on the feeding platform 110. Moreover, in order to keep relative positions of the support frame 220 and the feeding platform 110, the fixing frame 450 is provided at each of the two opposite sides in a length direction of the feeding platform 110. Two ends in a length direction of the support frame 220 are respectively connected to the fixing frames 450 in a movable manner, such that the support frame 220 is adjusted in a direction perpendicular to the feeding platform 110 so as to adjust the distance difference between the support frame 220 and the upper surface of the feeding platform 110.

It should be noted that the workpiece is located between the feeding platform 110 and the support frame 220 when the workpiece moves on the feeding platform 110. Since the support frame 220 is movably connected to the fixing frames 450, the user can change the distance according to a thickness of the workpiece, such that the workpiece conveying device 1 is applicable to more workpieces of various sizes, thereby improving the adaptability of the workpiece conveying device 1.

Figure 7:
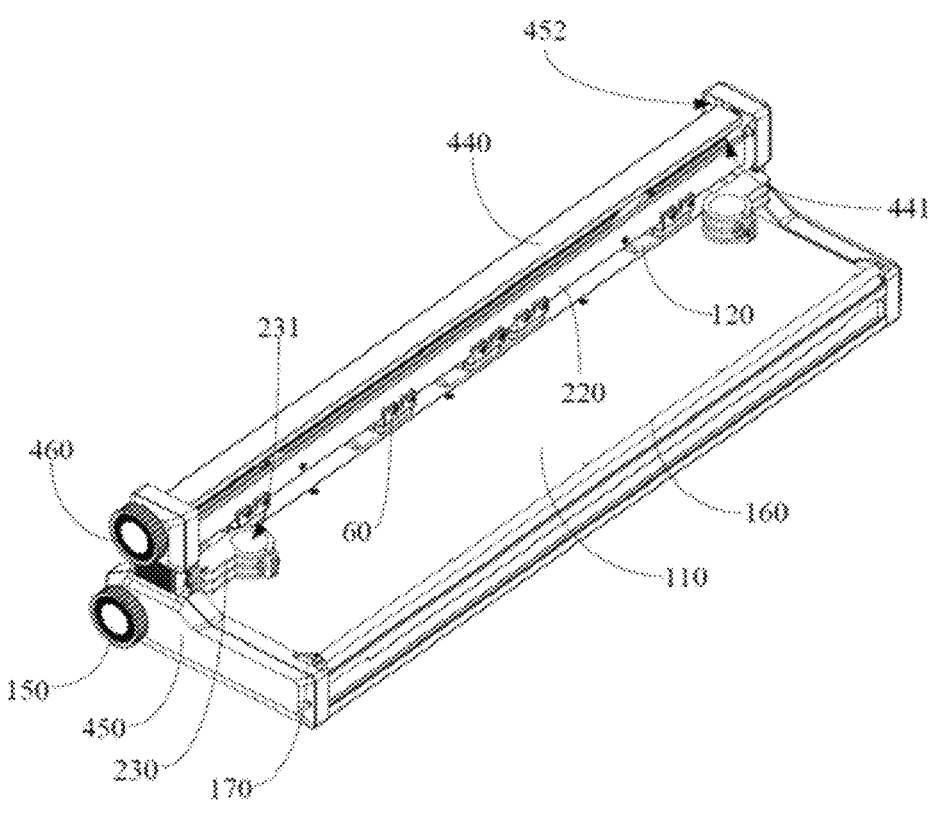
FIG. 7 is a schematic structural view showing a positioning member provided on the fixing frames according to an embodiment of the present disclosure.

In a possible embodiment of the present application, referring to FIGS. 3 and 7, the lifting assembly 40 further includes a second knob 460. One end of the second rotating shaft 410 passes through the mounting hole 451 of one of the fixing frames 450, and the second knob 460 is fixedly connected to the second rotating shaft 410 passing through the mounting hole 451. The second knob 460 is used to rotate the second rotating shaft 410, so as to control the movable member 420 to move in the axial direction of the second rotating shaft 410. With the second knob 460, a direction and an angle of the rotation of the second rotating shaft 410 can be precisely controlled, and the spacing distance between the first roller 120 and the second roller 210 can be adjusted more precisely.

In a possible embodiment of the present application, continuously referring to FIG. 3, the fixing frame 450 is provided with a second groove 452, and the two ends of the support frame 220 are respectively connected to the second grooves 452 in a slidable manner. As the turning member 430 rotates, the support frame 220 moves close to or away from the first conveying assembly 10. That is, during the rotation of the turning member 430, the support frame 220 can slide in the second grooves 452, such that the support frame 220 moves close to or away from the first conveying assembly 10. With the second grooves 452, a position of the moving support frame 220 is limited, thereby preventing the moving support frame 220 from shaking.

In a possible embodiment of the present application, referring to FIG. 7, the workpiece conveying device 1 further includes a positioning member 230 in connection with the fixing frame 450. The positioning member 230 is parallel to the feeding platform 110, and is used to fix the processing device. The positioning member 230 is provided with a fixing through hole 231. A support frame 220 of the processing device can be inserted into the fixing through holes 231 to prevent relative displacement between the workpiece conveying device 1 and the processing device during processing.

Figure 15:
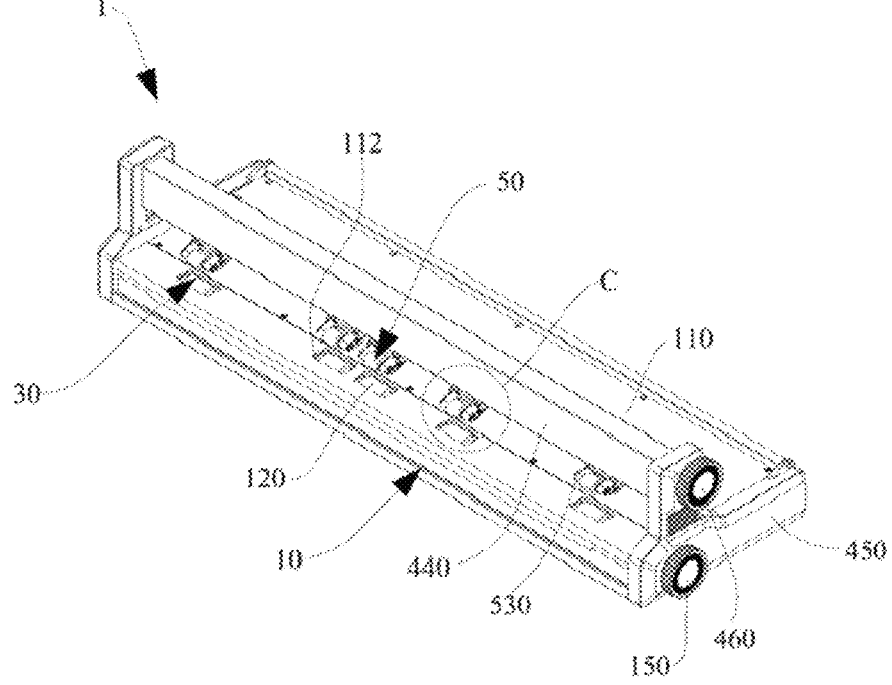
FIG. 15 is a schematic structural view of a feeding assembly according to an embodiment of the present disclosure.
Figure 16:
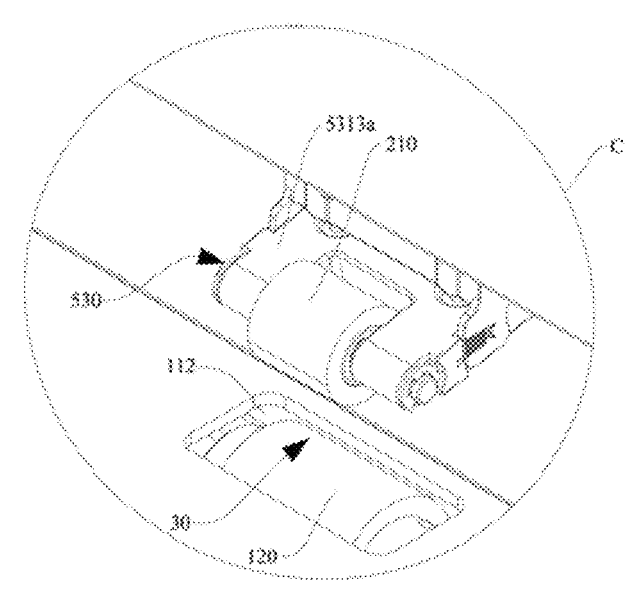
FIG. 16 is a schematic enlarged structural view of a portion C in FIG. 15 showing a first roller and a second roller.

Referring to FIGS. 15 and 16, the workpiece conveying device 1 further includes multiple feeding assemblies 50 in connection with the second roller 210. It may be appreciated that, the number of the feeding assemblies 50 is in correspondence to the number of the second rollers 210.

In a possible embodiment of the present application, referring to FIGS. 17 to 20, the feeding assemblies 50 include a plurality of first feeding assemblies 510, and the plurality of first feeding assemblies 510 are arranged on the second conveying assembly 20 through the support frame 220. A spacing distance between any two adjacent first feeding assemblies 510 is different, so as to match workpieces of various sizes, such that the workpiece moves more stably on the first feeding assembly 510 and is unlikely to be deflected.

The plurality of first feeding assemblies 510 are arranged side by side. The first preset spacing distances are present between two adjacent first feeding assemblies 510 and have gradually increased or decreased value in a direction of arrangement of the plurality of first feeding assemblies 510 to adapt to different workpieces.

In some embodiments, the feeding assemblies 50 only include the plurality of first feeding assemblies 510, and the value of the first preset spacing distances between two adjacent first feeding assemblies 510 increases or decreases in sequence. The workpiece is conveyed by the first feeding assemblies 510.

Figure 17:
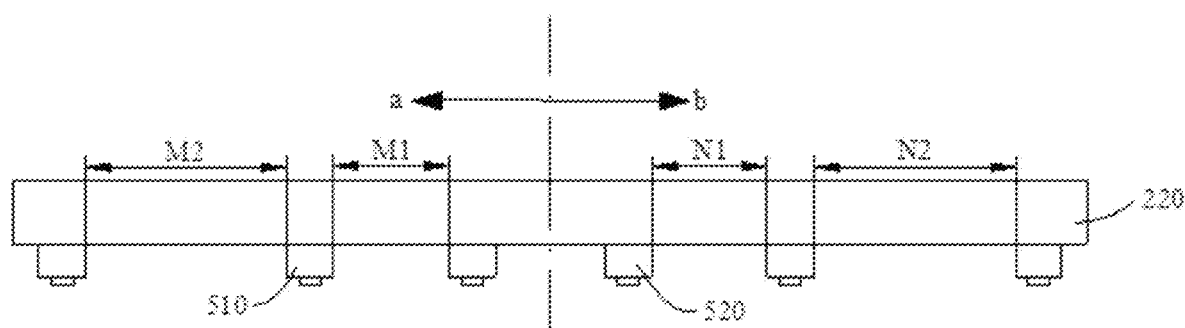
FIG. 17 is a schematic structural view showing first feeding assemblies and second feeding assemblies arranged in geometric progressions according to an embodiment of the present disclosure.

In other embodiments, referring to FIG. 17, the feeding assemblies 50 further include a plurality of second feeding assemblies 520. The feeding assemblies 50 include the plurality of first feeding assemblies 510 and the plurality of second feeding assemblies 520. The plurality of first feeding assemblies 510 are arranged side by side in a direction a, and the plurality of second feeding assemblies 520 are arranged side by side in another direction b opposite to the direction a. That is to say, the second feeding assemblies 520 and the first feeding assemblies 510 are arranged in opposite directions.

The second preset spacing distances are present between two adjacent second feeding assemblies 520. A value of the second preset distances increases or decreases in sequence in the another direction b to adapt to more workpieces of various sizes, thereby enhancing the adaptability of the workpiece conveying device 1.

In a possible embodiment, the plurality of first feeding assemblies 510 are spaced apart along the direction a, and the value of the first preset distances between two adjacent first feeding assemblies 510 increases in sequence. The plurality of second feeding assemblies 520 are spaced apart along the another direction b, and the value of the second preset distances between two adjacent second feeding assemblies 520 increases in sequence. That is, the feeding assemblies 50 in the middle of the support frame 220 are relatively denser, whereas the feeding assemblies 50 at two sides of the support frame 220 are relatively sparser. In this way, when being conveyed, the workpiece can contact at least two feeding assemblies 50 in the middle that have a smallest spacing distance therebetween, so that the feeding assemblies 50 convey the workpiece more stably. Moreover, the workpiece can contact as many feeding assemblies 50 as possible when it is placed in the middle and conveyed, thereby further improving the stability of the conveying of the workpiece. Furthermore, a friction between the workpiece and the fixing frames 450 on the sides of the feeding platform 110 may be avoided, and therefore a resistance to conveying of the workpiece may be reduced.

In a possible embodiment, the plurality of first feeding assemblies 510 are spaced apart in the direction a, and the value of the first preset spacing distances between two adjacent first feeding assemblies 510 increases in sequence, the plurality of second feeding assemblies 520 are spaced apart in the another direction b, and the value of the second preset spacing distances between two adjacent second feeding assemblies 520 decreases in sequence. That is, the feeding assemblies 50 at one end of the support frame 220 are denser, whereas the feeding assemblies 50 at the other end of the support frame 220 are sparser.

In a possible embodiment, the plurality of first feeding assemblies 510 are spaced apart along the direction a, and the value of the first preset spacing distances between two adjacent first feeding assemblies 510 decreases in sequence. The plurality of second feeding assemblies 520 are spaced apart along the another direction b, and the value of the second preset spacing distances between two adjacent second feeding assemblies 520 decreases in sequence. That is, the feeding assemblies 50 at the two sides of the support frame 220 are relatively denser. Therefore, when a relatively long workpiece is conveyed, two opposite ends of the workpiece contact more feeding assemblies 50, thereby improving the stability of the conveying of the workpiece, and preventing the workpiece from being deflected in the direction a or in the another direction b.

In a possible embodiment, the value of the first preset spacing distances and the value of the second preset spacing distances may be designed to vary in a regular manner, such as a geometric progression or an arithmetic progression. Alternatively, the value of the first preset spacing distances and the value of the second preset spacing distances may be designed to vary irregularly, as long as the values are adaptive to various workpieces, which are not described in detail herein.

Description will be given with respect to the value of the first preset spacing distances and the value of the second preset spacing distances varying in a regular manner hereinafter.

In an optional embodiment, the value of the first preset spacing distances increases in the direction a in a geometric progression. For example, as shown in FIG. 17, a value M1 of the first preset spacing distance between a first-first feeding assembly 510 and a second-first feeding assembly 510 is 2 cm, a value M2 of the second preset spacing distance between a third-first feeding assembly 510 and the second-first feeding assembly 510 is 4 cm, . . . , and so on. The first feeding assemblies 510 are arranged in sequence with a common ratio of 2. The value of the second preset spacing distances increases in the another direction b in geometric progression. For example, as shown in FIG. 17, a value N1 of the second preset spacing distance between a first-second feeding assembly 520 and a second-second feeding assembly 520 is 2 cm, a value N2 of the second preset spacing distance between a third-first feeding assembly 520 and the second-second feeding assembly 520 is 4 cm, . . . , and so on. The second feeding assemblies 520 are arranged in sequence with a common ratio of 2. That is, the plurality of first feeding assemblies 510 are arranged in the geometric progression along the direction a, and the plurality of second feeding assemblies 520 are arranged in the geometric progression along the another direction b. With such arrangements of the feeding assemblies 50, the workpiece can be stably conveyed, and a conveying force applied on the workpiece can be more stable, which improves the adaptability of the workpiece conveying device 1.

Figure 18:
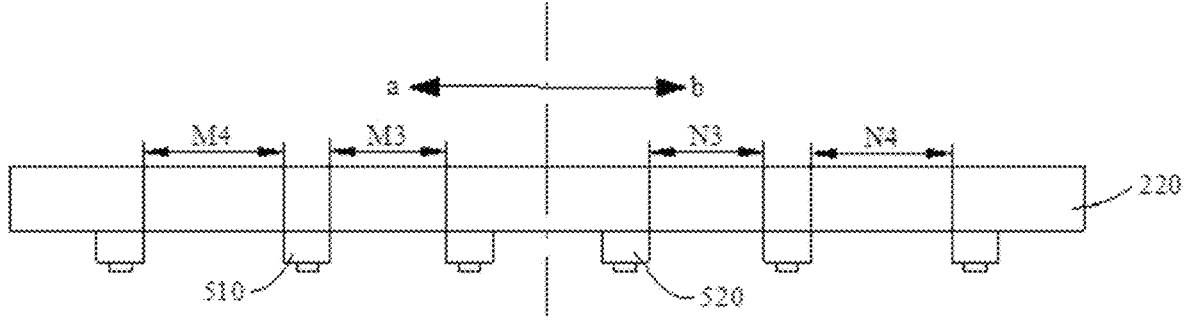
FIG. 18 is a schematic structural view showing first feeding assemblies and second feeding assemblies arranged in arithmetic progressions according to an embodiment of the present disclosure.

In another optional embodiment, the value of the first preset spacing distances increases in the direction a in an arithmetic progression. For example, as shown in FIG. 18, a value M3 of the first preset spacing distance between the first-first feeding assembly 510 and the second-first feeding assembly 510 is 2 cm, a value M4 of the second preset spacing distance between the third-first feeding assembly 510 and the second-first feeding assembly 510 is 4 cm, . . . , and so on. The first feeding assemblies 510 are arranged in sequence with a common difference of 2. The value of the second preset spacing distances increases in the another direction b in arithmetic progression. For example, as shown in FIG. 18, a value N3 of the second preset spacing distance between the first-second feeding assembly 520 and the second-second feeding assembly 520 is 2 cm, a value N4 of the second preset spacing distance between the third-second feeding assembly 520 and the second-second feeding assembly 520 is 4 cm, . . . , and so on. The second feeding assemblies 520 are arranged in sequence with a common difference of 2. That is, the plurality of first feeding assemblies 510 are arranged in the arithmetic progression along the direction a, and the plurality of second feeding assemblies 520 are arranged in the arithmetic progression along the another direction b. With such arrangements of the feeding assemblies 50, the workpiece can be stably conveyed, and a conveying force applied on the workpiece can be more stable, which improves the adaptability of the workpiece conveying device 1.

Figure 19:
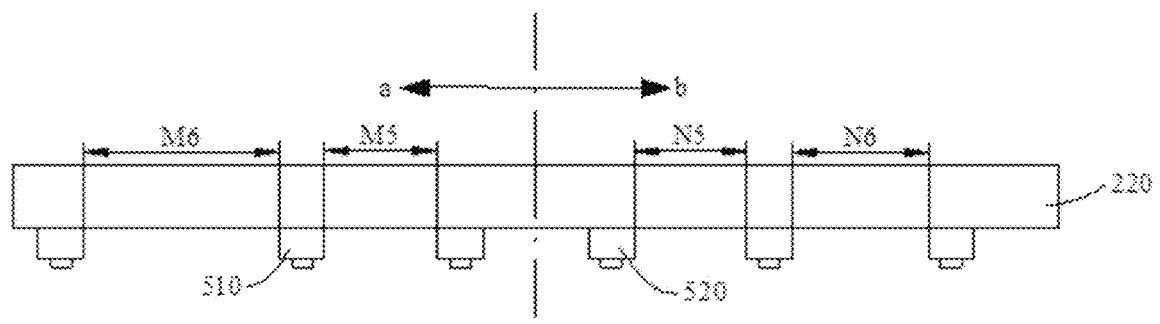
FIG. 19 is a schematic structural view showing first feeding assemblies arranged in a geometric progression and second feeding assemblies arranged in an arithmetic progression according to an embodiment of the present disclosure.

In yet another optional embodiment, the value of the first preset spacing distances increases in the direction a in a geometric progression. For example, as shown in FIG. 19, a value M5 of the first preset spacing distance between the first-first feeding assembly 510 and the second-first feeding assembly 510 is 2 cm, a value M6 of the second preset spacing distance between the third-first feeding assembly 510 and the second-first feeding assembly 510 is 4 cm, . . . , and so on. The first feeding assemblies 510 are arranged in sequence with a common ratio of 2. The value of the second preset spacing distances increases in the another direction b in an arithmetic progression. For example, as shown in FIG. 19, a value N5 of the second preset spacing distance between the first-second feeding assembly 520 and the second-second feeding assembly 520 is 2 cm, a value N6 of the second preset spacing distance between the third-second feeding assembly 520 and the second-second feeding assembly 520 is 4 cm, . . . , and so on. The second feeding assemblies 520 are arranged in sequence with a common difference of 2. That is, the plurality of first feeding assemblies 510 are arranged in the increasing geometric progression along the direction a, and the plurality of second feeding assemblies 520 are arranged in the arithmetic progression along the another direction b.

Figure 20:
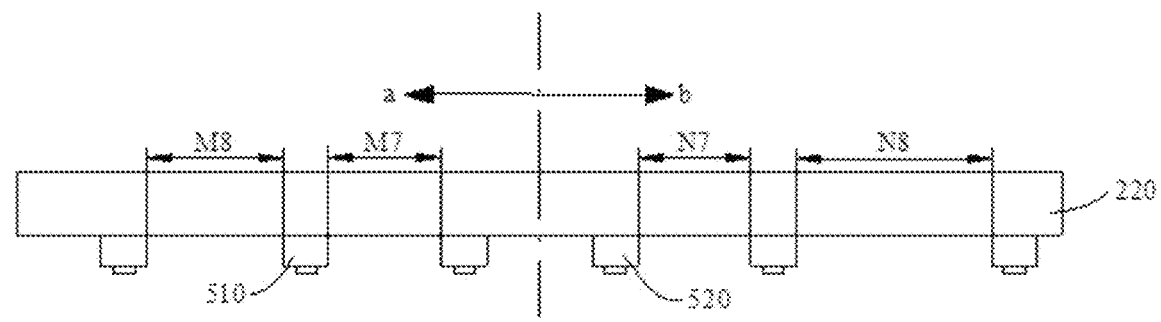
FIG. 20 is a schematic structural view showing first feeding assemblies arranged in an arithmetic progression and second feeding assemblies arranged in a geometric progression according to an embodiment of the present disclosure.

In still another optional embodiment, the value of the first preset spacing distances increases in the direction a in an arithmetic progression. For example, as shown in FIG. 20, a value M7 of the first preset spacing distance between the first-first feeding assembly 510 and the second-first feeding assembly 510 is 2 cm, a value M8 of the second preset spacing distance between the third-first feeding assembly 510 and the second-first feeding assembly 510 is 4 cm, . . . , and so on. The first feeding assemblies 510 are arranged in sequence with a common difference of 2. The value of the second preset spacing distances increases in the another direction b in a geometric progression. For example, as shown in FIG. 20, a value N7 of the second preset spacing distance between the first-second feeding assembly 520 and the second-second feeding assembly 520 is 2 cm, a value N8 of the second preset spacing distance between the third-second feeding assembly 520 and the second-second feeding assembly 520 is 4 cm, . . . , and so on. The second feeding assemblies 520 are arranged in sequence with a common ratio of 2. That is, the plurality of first feeding assemblies 510 are arranged in the increasing arithmetic progression along the direction a, and the plurality of second feeding assemblies 520 are arranged in the geometric progression along the another direction b.

It should be noted that, the value of the first preset spacing distances may decrease in the direction a in a geometric progression or in an arithmetic progression, and the value of the second preset spacing distances may decrease in the another direction b in a geometric progression or in an arithmetic progression. The decreasing arrangements are opposite to the four increasing arrangements in the geometric progression or in the arithmetic progression, which are not described in detail herein.

With the above arrangements, workpieces of various sizes can be conveyed, and the adaptability of the workpiece conveying device 1 can be improved.

It may be appreciated that, the feeding assemblies 50 may only include a third feeding assembly and a fourth feeding assembly.

In an optional embodiment, the feeding assemblies 50 include a third feeding assembly and a fourth feeding assembly. The third feeding assembly and the fourth feeding assembly are fixedly arranged on the support frame 220, and are fixedly arranged on the feeding platform 110 through the support frame 220. That is, a spacing distance between the third feeding assembly and the fourth feeding assembly is fixed, and is not adjustable.

In another optional embodiment, at least one of the third feeding assembly and the fourth feeding assembly is movably connected to the support frame 220, i.e. at least one of the third feeding assembly and the fourth feeding assembly is movably connected to the feeding platform 110, so as to adjust the spacing distance between the third feeding assembly and the fourth feeding assembly. The adjustable spacing distance is adaptive to more workpieces of various sizes, and therefore the adaptability of the workpiece conveying device 1 is improved.

For example, the third feeding assembly is movably connected to the support frame 220, and the fourth feeding assembly is fixedly connected to the support frame 220. Or, the third feeding assembly is movably connected to the support frame 220, and the fourth feeding assembly is movably connected to the support frame 220. Or, the third feeding assembly is fixedly connected to the support frame 220, and the fourth feeding assembly is movably connected to the support frame 220.

It may be appreciated that, the feeding assemblies 50 are connected to the support frame 220 and/or the feeding platform 110.

In some possible embodiments, referring to FIG. 16, each feeding assembly 50 is connected to the support frame 220. The feeding assembly 50 includes a connector 530, and the connector 530 is connected to a side of the support frame 220 close to the feeding platform 110. A bearing is provided between the second roller 210 and the connector 530, and the second roller 210 is rotatably connected to the connector 530 via the bearing. During conveying, the rollers are connected to the surfaces of the workpiece. The first roller 120 and the second roller 210 rotate to drive the workpiece to be conveyed into the processing device.

In other possible embodiments, the feeding assembly 50 is connected to the feeding platform 110. The feeding assembly 50 includes the connector 530, and the connector 530 is provided at a side of the feeding platform 110 away from the support frame 220. A bearing is provided between the first roller 120 and the connector, and the first roller 120 is rotatably connected to the connector 530 via the bearing. It should be noted that, the first roller 120 may be entirely arranged on the upper surface of the feeding platform 110, as long as the first roller 120 can drive the workpiece to be conveyed.

In a possible embodiment of the present application, the feeding assembly 50 is connected to both the support frame 220 and the feeding platform 110, and the feeding assembly 50 includes a first connector and a second connector. The first connector and the first roller 120 are arranged on the feeding platform 110, and the second connector and the second roller 210 are arranged on the support frame 220. A driving member is connected to the first connector. During operation of the workpiece conveying device 1, the driving member drives the first connector to rotate, and further drives the first roller 120 to rotate. Since the second roller 210 and the first roller 120 respectively contact two opposite sides of the workpiece, the second roller 210 also rotates along with the first roller 120, such that the workpiece is conveyed to the processing device. According to the present embodiment, the feeding assembly 50 is provided on both the support frame 220 and the feeding platform 110, hence the feeding assembly 50 contacts both sides of the workpiece. The workpiece is sandwiched between the second roller 210 and the first roller 120 of the feeding assembly 50, such that the workpiece is better conveyed, and the contact between the workpiece and the feeding platform 110 is reduced, thereby preventing the workpiece from being scratched.

It may be appreciated that, the first connector and the second connector may be the connector 530, and may have a function of pressure measurement.

It may be appreciated that, the feeding assembly 50 arranged on the feeding platform 110 may be in one-to-one correspondence or one-to-many correspondence to the feeding assembly 50 arranged on the support frame 220.

For example, in some embodiments, the first roller 120 may be an integrated piece, i.e. the first roller 120 may adopt a structure such as a rolling shaft. A length of the rolling shaft is equal to a length of the feeding platform 110, so as to prevent the workpiece from sinking caused by excessive spacing distance between the adjacent first rollers 120 during conveying, thereby protecting the workpiece better. Multiple feeding assemblies 50 are provided on the support frame 220, i.e. in the many-to-one correspondence manner.

In a possible embodiment of the present application, the feeding assembly 50 is provided with a slider. The support frame 220 and/or the feeding platform 110 are provided with a slide rail, and the slider is connected to the slide rail in a slidable manner.

In some embodiments, the slider is provided on the connector 530, and the slide rail is provided at the side of the support frame 220 close to the feeding platform 110. The slider is arranged in the slide rail in a slidable manner, such that a spacing distance between the feeding assemblies 50 located on the support frame 220 is adjustable. Relative positions of the feeding assemblies 50 can be adjusted according various sizes or widths of the workpieces, so that the workpiece conveying device 1 is adaptive to more workpieces of various sizes.

In other embodiments, the slider is provided on the connector 530, and the slide rail is provided on the feeding platform 110. The slider is arranged in the slide rail in a slidable manner for the adjustment to the spacing distance between adjacent feeding assemblies 50 to match more workpieces of various sizes.

In yet other embodiments, the feeding assemblies 50 on the support frame 220 and the feeding platform 110 are each provided with a slide rail. The roller on the support frame 220 is in correspondence to the roller on the feeding platform 110. The connector 530 on the support frame 220 is provided with a slider that is arranged in the slide rail on the support frame 220 in a slidable manner. In this way, the spacing distance between adjacent feeding assemblies can be adjusted to match more workpieces of various sizes. The connector 530 on the feeding platform 110 is provided with a slider that is arranged in the slide rail on the feeding platform 110 in a slidable manner, so that the roller on the feeding platform 110 is in correspondence to the roller on the support frame 220 to better convey the workpiece, and prevent the workpiece from colliding with other components of the workpiece conveying device 1, thereby better protecting the workpiece.

The slide rail is provided with a limiting member, and the limiting member is used to fix the slider, so as to fix a position of the feeding assembly 50 on the support frame 220 or the feeding platform 110, such that the workpiece is conveyed more stably.

Alternatively, the limiting member may be provided on the slider. The limiting member may adopt a screw or a snap-fit structure. When the feeding assembly moves to a corresponding position, the limiting member is screwed to abut against an inner bottom wall of the slide rail, such that the limiting member is fixedly connected to the slide rail. In this way, the slider is fixed relative to the slide rail, thereby limiting a position of the roller, and ensuring the workpiece to be normally conveyed.

In a possible embodiment of the present application, the connector 530 may be a pressure measurement assembly for measuring a pressure on the workpiece being conveyed by the workpiece conveying device 1.

Figure 21:
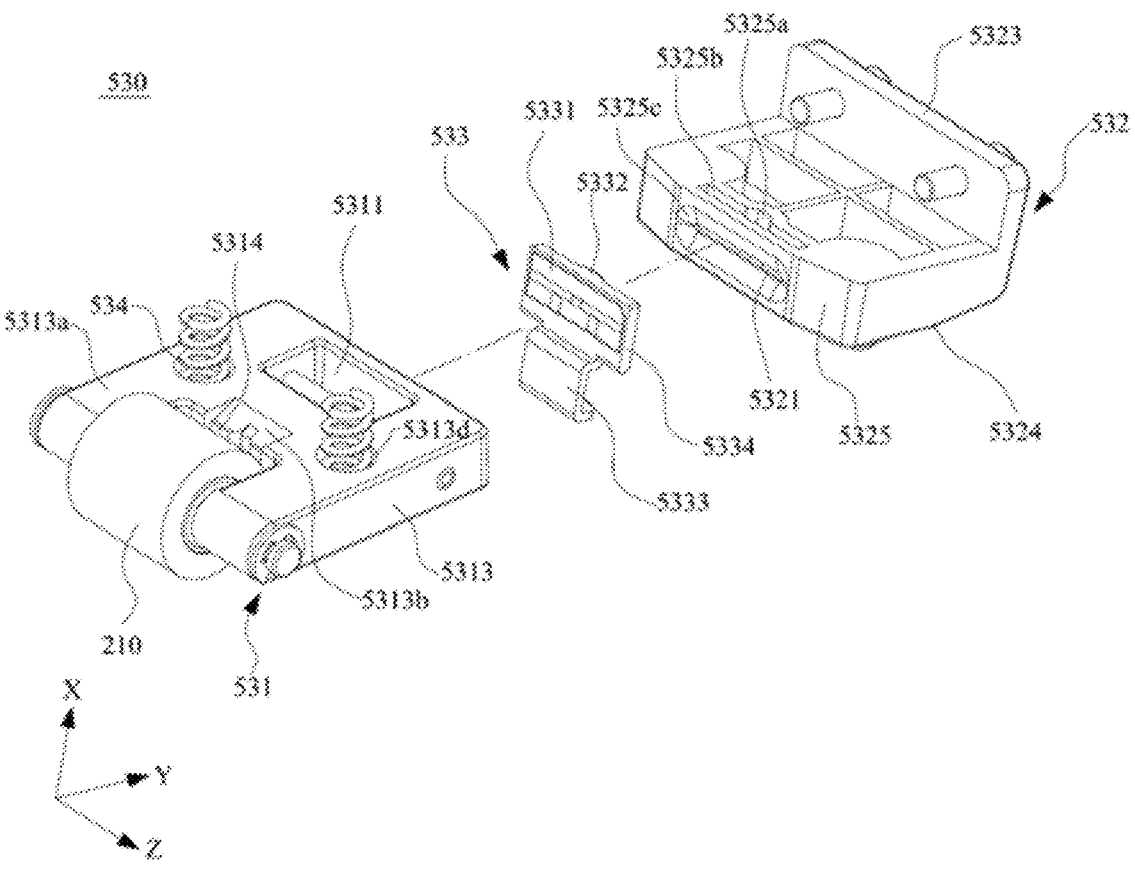
FIG. 21 is a schematic exploded structural view of a connector according to an embodiment of the present disclosure.

Referring to FIG. 21, the connector 530 includes a measurement component 531, a first fixing member 532, and a display portion 5325. The measurement component 531 is connected to the first fixing member 532, and is configured to measure the pressure on the workpiece. The first fixing member 532 is connected to the workpiece conveying device 1. The display portion 5325 is arranged on the first fixing member 532 and/or the measurement component 531, and pressure information measured by the measurement component 531 is displayed on the display portion 5325.

Specifically, the workpiece conveying device 1 is connected to the computer numerical control apparatus, and the workpiece conveying device 1 is provided with a clamping portion 30. The workpiece is conveyed to the computer numerical control apparatus through the clamping portion 30, and the computer numerical control apparatus processes the workpiece.

It may be appreciated that, since the connector 530 is connected to the second roller 210, the measurement component 531 can directly or indirectly contact the workpiece when the workpiece conveying device 1 is conveying the workpiece, so as to obtain the information of the pressure applied on the workpiece in real time. The pressure information measured by the measurement component 531 is displayed on the display portion 5325, and the user can determine the pressure information on the workpiece according to the information displayed on the display portion 5325 of the connector 530, thereby determining if the pressure applied on the workpiece by the workpiece conveying device 1 needs to be adjusted.

The connector 530 is provided on the workpiece conveying device 1, and the connector 530 includes the measurement component 531 and the display portion 5325. In this way, the measurement component 531 can measure the pressure on the workpiece when the workpiece conveying device 1 is conveying the workpiece, and the information of the pressure on the workpiece measured by the measurement component 531 can be displayed on the measurement component 5325. The user can be prompted with the pressure on the workpiece conveyed by the workpiece conveying device 1 in real time, and can adjust a compression force applied on the workpiece by the workpiece conveying device 1 according to the prompt about the pressure information, such that the pressure on the workpiece is within a reasonable range. Therefore, it is possible to prevent the workpiece not only from suffering too low pressure to cause deflection or slip of the workpiece when being conveyed by the workpiece conveying device 1, but also from suffering an excessive pressure to cause excessive resistance to conveying of the workpiece by the workpiece conveying device 1 and thus occur reduced speed of conveying the workpiece, deformation of the workpiece, etc.

In a possible embodiment of the present application, referring to FIGS. 21 to 24, the measurement component 531 is rotatably connected to the first fixing member 532, and the workpiece conveying device 1 includes the second roller 210. The second roller 210 is connected to the measurement component 531, and is configured to contact the workpiece to drive the measurement component 531 to rotate with respect to the first fixing member 532. Specifically, when the workpiece conveying device 1 is conveying the workpiece, the second roller 210 directly contacts the surface of the workpiece. The position of the second roller 210 varies, and the second roller 210 moves in a direction close to the first fixing member 532. Since the second roller 210 is directly connected to the measurement component 531, the measurement component 531 rotates with respect to the first fixing member 532 as the second roller 210 moves. In this way, the pressure exerted on the workpiece during conveying is measured.

In a possible embodiment of the present application, the display portion 5325 includes a scale and an indicator. One of the scale and the indicator is arranged on the first fixing member 532, and the other one of the scale and the indicator is arranged on the measurement component 531. The first fixing member 532 is movably connected to the measurement component 531.

It may be appreciated that, the scale is configured to indicate a magnitude of the pressure, and the scale may be a numerical value or a level. For example, the scale is arranged on the first fixing member 532, and the indicator is arranged on the measurement component 531. Since the measurement component 531 is movable with respect to the first fixing member 532, the measurement component 531 contacts the workpiece to be displaced when the workpiece conveying device 1 is conveying the workpiece, thereby changing position of the indicator relative to the scale. Thus, the connector 530 may display the pressure on the workpiece being conveyed in real time.

Figure 25:
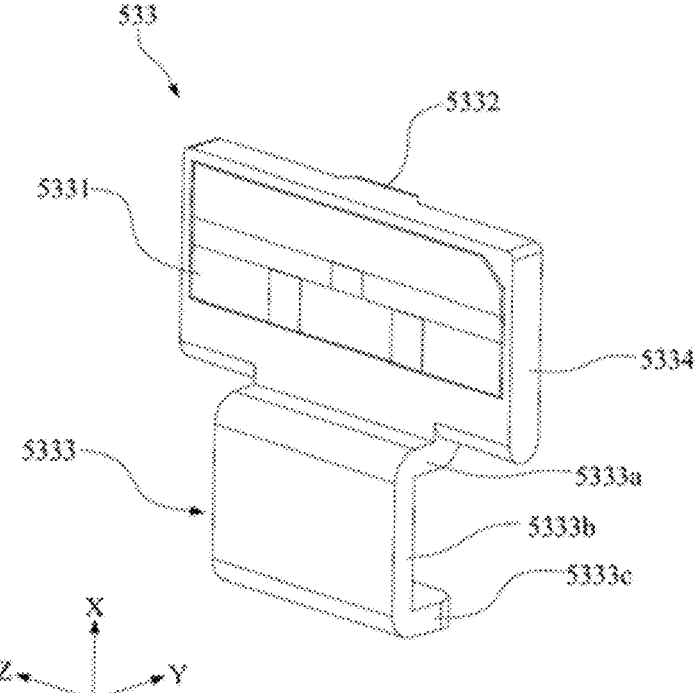
FIG. 25 is a schematic structural view of an indicating component according to an embodiment of the present disclosure.

In a possible embodiment of the present application, referring to FIG. 25, the connector 530 further includes an indicating component 533 provided with a pressure marking 5331. The display portion 5325 is provided on the first fixing member 532, and the display portion 5325 is provided with a viewing window 5321. One end of the indicating component 533 is connected to the measurement component 531, and the other end of the indicating component 533 passes through the first fixing member 532 such that the pressure marking 5331 corresponds to the viewing window 5321. The first fixing member 532 is movably connected to the measurement component 531.

Figure 26:
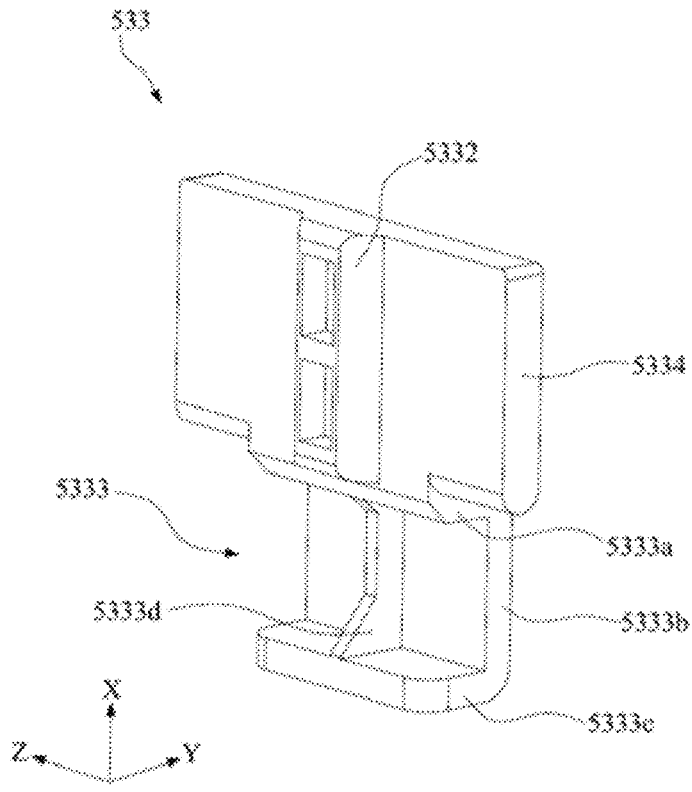
FIG. 26 is a schematic structural view showing an indicating component provided with a guide rail according to an embodiment of the present disclosure.

It may be appreciated that, referring to FIGS. 25 and 26, the indicating component 533 is provided with the pressure marking 5331 for indicating different pressures. The measurement component 531 is movable with respect to the first fixing member 532. Thus, when the workpiece conveying device 1 is conveying the workpiece, the measurement component 531 contacts the workpiece to be displaced, and thus drives the pressure marking 5331 to move in the first fixing member 532, so as to make the corresponding pressure marking 5331 displayed in the viewing window 5321.

Figure 23:
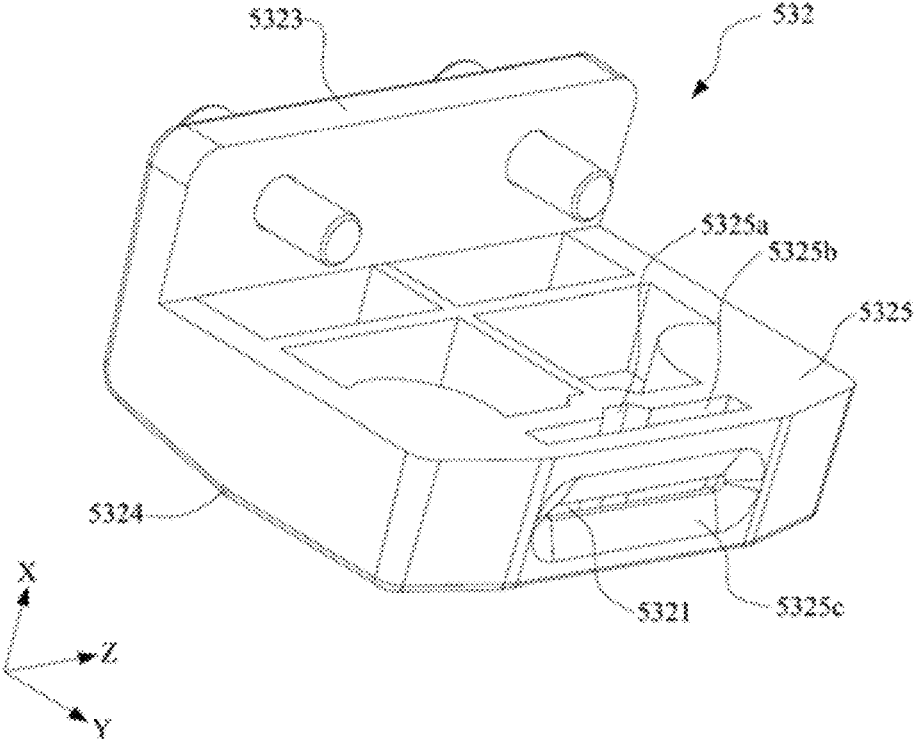
FIG. 23 is a schematic structural view of a first fixing member according to an embodiment of the present disclosure.

Referring to FIG. 23, the viewing window 5321 may be of a same structure as the pressure marking 5331, i.e. the viewing window 5321 may be an elongated opening. The viewing window 5321 and the pressure marking 5331 are of the same elongated structure, making it easy to observe the pressure marking 5331 through the viewing window 5321.

Alternatively, the viewing window 5321 may be an opening being round, square, elliptical, etc.

Specifically, referring to FIG. 21, one end of the indicating component 533 is connected to the measurement component 531. The pressure marking 5331 is provided on the indicating component 533, and is movable in the first fixing member 532 when the measurement component 531 is displaced with respect to the first fixing member 532, such that the pressure marking 5331 in correspondence to the pressure on the workpiece is displayed at the viewing window 5321. That is, the indicating component 533 can rotate along with the measurement component 531, such that the pressure marking 5331 on the indicating component 533 can be displayed at the viewing window 5321.

In a possible embodiment of the present application, the pressure marking 5331 includes multiple indicating blocks of different colors, e.g., red, yellow, and green, which respectively indicate states that the pressure between the workpiece conveying device 1 and the workpiece is too high, moderate, and too low. It may be appreciated that, the pressure marking 5331 may include multiple indicating blocks with different patterns or texts, which is not limited in the present disclosure, as long as the pressure marking 5331 can indicate the current pressure level.

It may be appreciated that, in the state that the pressure between the workpiece conveying device 1 and the workpiece is too high, the workpiece being conveyed by the workpiece conveying device 1 suffers a high resistance so that the workpiece is conveyed at a low speed. In the state that the pressure between the workpiece conveying device 1 and the workpiece is too low, the workpiece being conveyed by the workpiece conveying device 1 may easily slip and be displaced. Only in the state that the pressure between the workpiece conveying device 1 and the workpiece is moderate, the workpiece conveying device 1 can convey the workpiece with a best stability. The user can determine the current state of the pressure between the workpiece conveying device 1 and the workpiece according to the color of the pressure marking 5331 in the viewing window 5321.

According to the embodiment of the present disclosure, the pressure marking 5331 includes the multiple indicating blocks of the different colors, and the indicating block having corresponding color are displayed in the viewing window 5321 according to the state of the pressure between the workpiece conveying device 1 and the workpiece. With the bold colors, the user can determine the force condition of the workpiece quickly, thereby determining if the pressure between the workpiece conveying device 1 and the workpiece needs to be adjusted. It may be appreciated that, the pressure marking 5331 may include fixed indicating blocks of different colors according to different embodiments, and the color is not limited to those described in the above embodiment.

It may be appreciated that, the colorful fixed indicating blocks may represent specific value ranges. For example, the red one represents the state that the pressure is too high, which is higher than or equal to 1 newton (N); the yellow one represents the state that the pressure is moderate, which is higher than 0.5 newton (N) and lower than 1 newton (N); and the green one represents the state that the pressure is too low, which is lower than or equal to 0.5 newton (N).

It may be appreciated that, when workpieces of different thicknesses are applied to the measurement component 531, the fixed indicating blocks of different colors are displayed in the viewing window 5321. In this way, the user can adjust a contact pressure between the workpiece conveying device 1 and the workpiece according to the corresponding fixed indicating block of the color displayed in the viewing window 5321, thereby ensuring the normal operation of the driving motor 141 and preventing the workpiece being conveyed through the measurement component 531 from slipping or being deflected. As such, the processing performance of the computer numerical control apparatus can be ensured.

Specifically, referring to FIG. 21, the workpiece conveying device 1 includes the second roller 210, and the second roller 210 is connected to the measurement component 531 of the connector 530. The workpiece is conveyed to the computer numerical control apparatus by the friction force between the second roller 210 and the workpiece. When the friction force is generated between the second roller 210 and the workpiece, a compression force is also applied on the workpiece. The compression force applied to the workpiece by the second roller 210 is measured by the measurement component 531.

Figure 27:
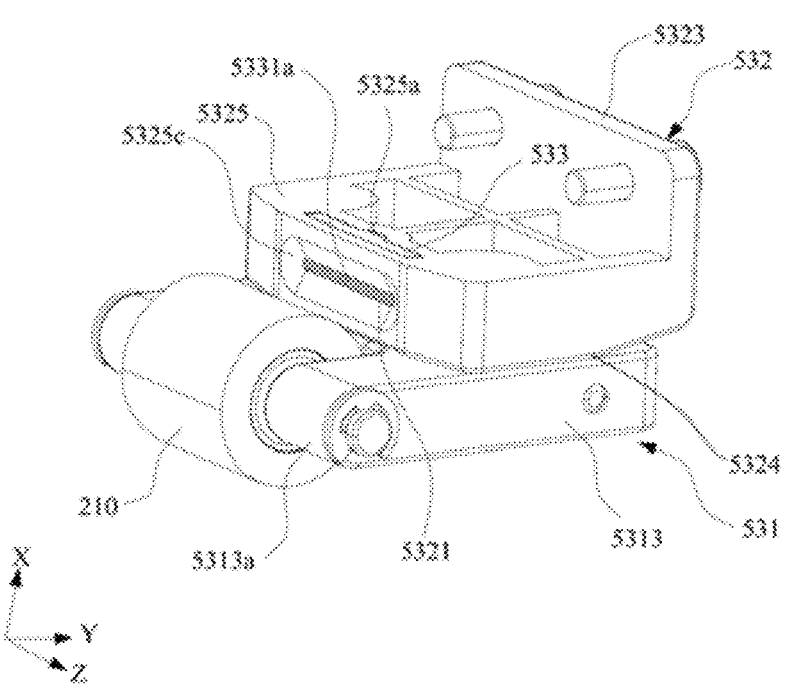
FIG. 27 is a schematic structural view showing an indicating component in red according to an embodiment of the present disclosure.
Figure 28:
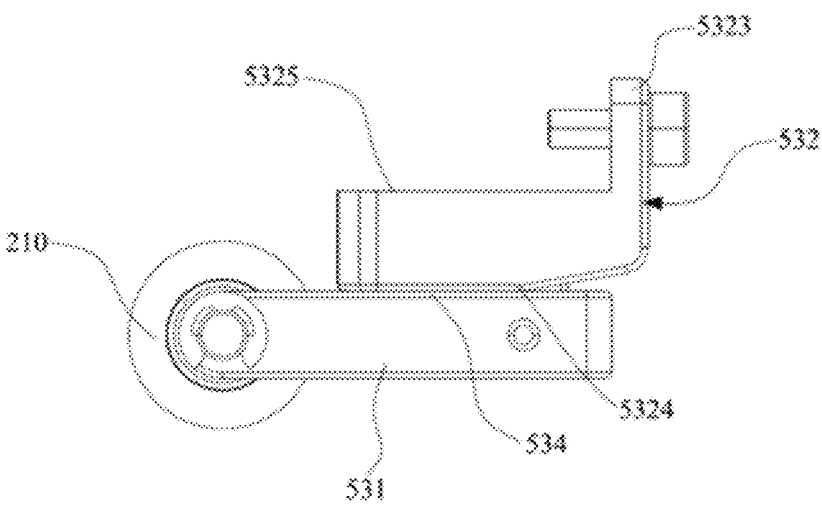
FIG. 28 is a schematic structural side view of the connector in FIG. 27.

For example, referring to FIGS. 27 and 28, when a red fixed indicating block 5331*a* is displayed in the viewing window 5321, it indicates the state that the pressure between the workpiece conveying device 1 and the workpiece is too high. In this case, the second roller 210 of the workpiece conveying device 1 may be adjusted upwards, such that the second roller 210 moves in a direction away from the surface of the workpiece to reduce the contact pressure between the second roller 210 and the workpiece. Since the measurement component 531 is connected to the second roller 210, when the second roller 210 moves upwards, the measurement component 531 also moves upwards until a yellow fixed indicating block 5331*b* is displayed in the viewing window 5321.

Figure 29:
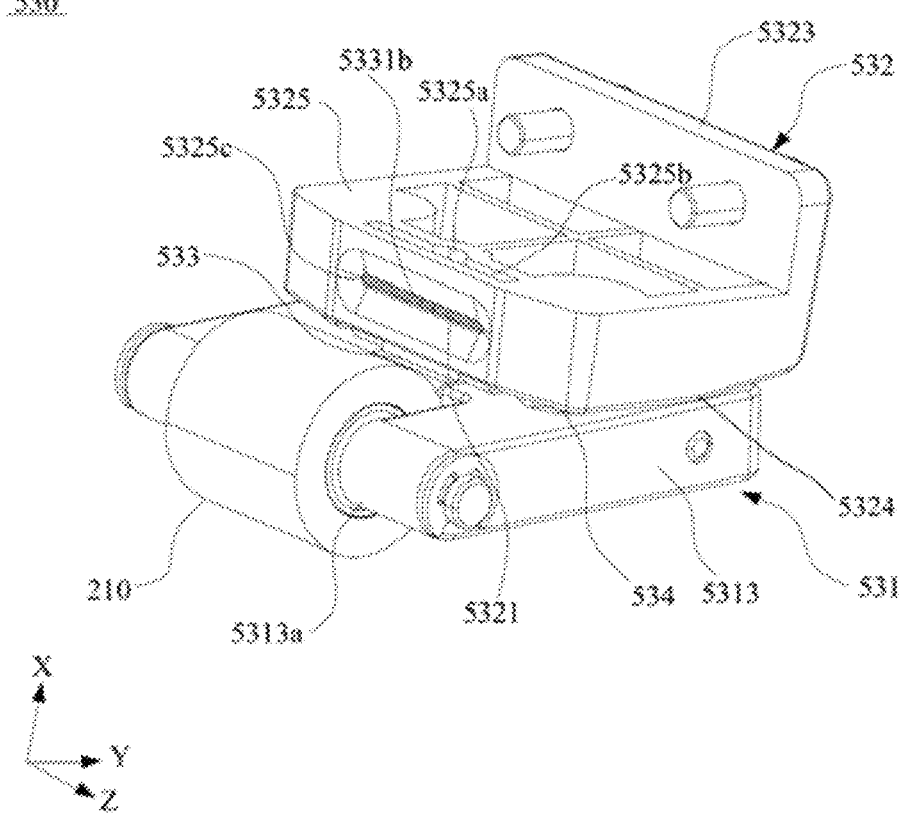
FIG. 29 is a schematic structural view showing the indicating component in yellow according to an embodiment of the present disclosure.
Figure 30:
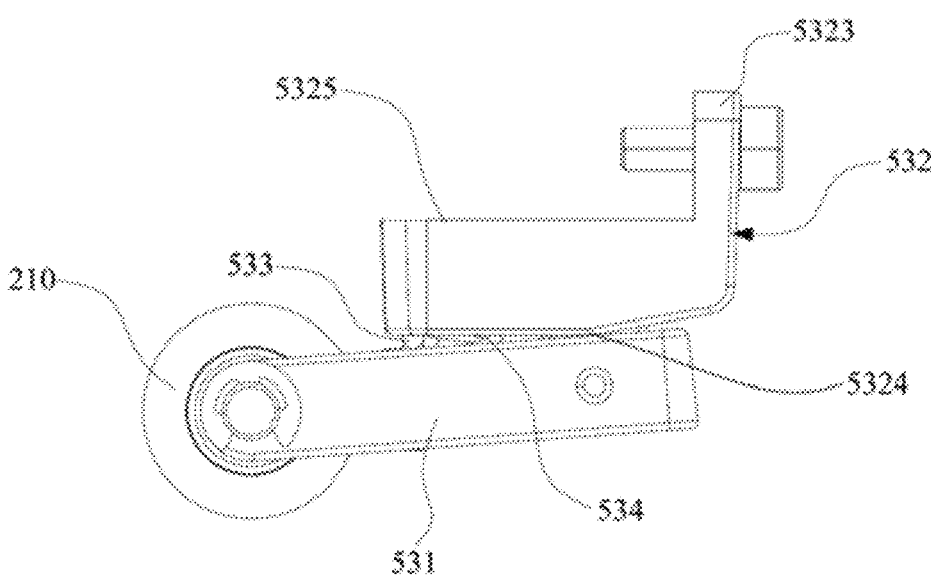
FIG. 30 is a schematic structural side view of the connector in FIG. 29.

It may be appreciated that, when the yellow fixed indicating block 5331*b* is displayed in the viewing window 5321, it indicates the case that the pressure between the workpiece conveying device 1 and the workpiece is moderate. At this time, a state of the connector 530 is shown in FIGS. 29 and 30, and the pressure between the second roller 210 and the workpiece needs not to be adjusted. Therefore, in the present embodiment, the user is prompted by the pressure marking 5331 to adjust the pressure between the workpiece conveying device 1 and the workpiece to be moderate, thereby ensuring the normal operation of the driving motor 141, and further ensuring the processing effect of the computer numerical control apparatus.

Figure 31:
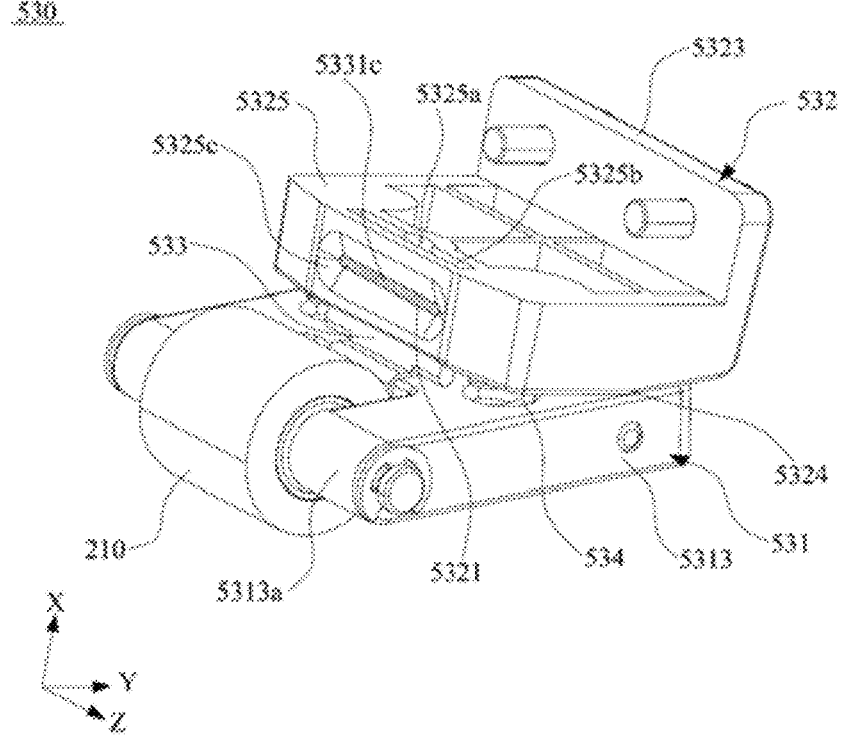
FIG. 31 is a schematic structural view showing the indicating component in green according to an embodiment of the present disclosure.
Figure 32:
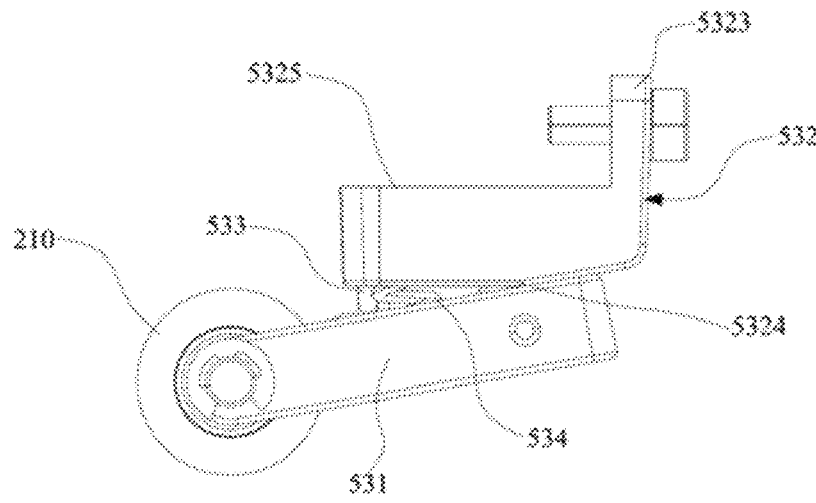
FIG. 32 is a schematic structural side view of the connector in FIG. 31.

Referring to FIGS. 31 and 32, when a green fixed indicating block 5331*c* is displayed in the viewing window 5321 during conveying of the workpiece, it indicates the state that the pressure between the workpiece conveying device 1 and the workpiece is too low. In this case, the second roller 210 of the workpiece conveying device 1 may be adjusted downwards, such that the second roller 210 moves in a direction close to the surface of the workpiece to increase the contact pressure between the second roller 210 and the workpiece. Since the measurement component 531 is connected to the second roller 210, when the second roller 210 moves upwards, the measurement component 531 also moves upwards to drive the indicating component 533 to move at the display portion 5325, such that the green fixed indicating block 5331*c* is gradually replaced by the yellow fixed indicating block 5331*b* in the viewing window 5321. As a result, the pressure between the measurement component 531 and the workpiece is increased, so as to apply a proper pressure to the workpiece, thereby preventing the workpiece from being deflected or slipping during conveying, and ensuring the processing effect of the apparatus.

It is worth mentioning that, an end of the indicating component 533 away from the measurement component 531 is not connected to the display portion 5325 of the first fixing member 532 or is connected to the display portion 5325 of the first fixing member 532 in a slidable manner, as long as the corresponding pressure marking 5331 can be displayed in the viewing window 5321 of the first fixing member 532.

In an embodiment of the present application, the end of the indicating component 533 away from the measurement component 531 is connected to the first fixing member 532 in a slidable manner. In this way, the measurement component 531 can rotate according to a height of the surface of the workpiece, to drive the indicating component 533 to move along with the measurement component 531, so that the pressure marking 5331 in correspondence to the pressure between the measurement component 531 and the surface of the workpiece is displayed in the viewing window 5321.

It may be appreciated that, the measurement component 531 may be rotatably connected to the first fixing member 532 through a rotating shaft, a pin, a hinge, a torsion spring or the like.

Referring to FIG. 23, the display portion 5325 is provided with a through groove 5325b, and a side wall of the through groove 5325b is provided with the viewing window 5321. The pressure marking 5331 of the indicating component 533 is movably arranged in the through groove 5325b, and is displayed through the viewing window 5321. Specifically, the through groove 5325b extends through the display portion 5325 along a first direction X, and the indicating component 533 is inserted in the through groove 5325b. The viewing window 5321 extends through the side wall of the through groove 5325b along a second direction Y to be in communication with the through groove 5325b, such that the user can observe the indicating component 533 in the through groove 5325b through the viewing window 5321. The first direction X and the second direction Y are perpendicular to each other.

Specifically, referring to FIGS. 23 and 26, the side wall of the through groove 5325b is further provided with a third slide groove 5325a. The indicating component 533 further includes a guide rail 5332, and the guide rail 5332 is arranged in the third slide groove 5325a in a slidable manner. The indicating component 533 is provided with the guide rail 5332 in correspondence to the third slide groove 5325a, and the guide rail 5332 is arranged at the back portion of the pressure marking 5331. When rotating, the measurement component 531 drives the guide rail 5332 of the indicating component 533 to slide in the third slide groove 5325a, and the different pressure markings 5331 are displayed in the viewing window 5321, thereby determining whether the compression force between the measurement component 531 and the workpiece is proper. With the guide rail 5332 and the third slide groove 5325a, movement of the indicating component 533 in the display portion 5325 can be prevented from being deflected. The shapes of the guide rail 5332 and the third slide groove 5325a are not limited. For example, the guide rail 5332 may be of a prism structure, a cylindrical structure or other structures.

In some embodiments, as shown in FIGS. 25 and 26, the indicating component 533 includes a sliding portion 5334, and two sides of the sliding portion 5334 are respectively provided with the guide rail 5332 and the multiple pressure markings 5331. The guide rail 5332 matches the third slide groove 5325a on an inner wall of the through groove 5325b, so that, when the measurement component 531 is rotating, the guide rail 5332 moves along the first direction X. The multiple pressure markings 5331 are arranged in sequence on the sliding portion 5334 along the first direction X, and are each of an elongated structure. The multiple pressure markings 5331 may be affixed onto the sliding portion 5334, or may be integrally formed on the sliding portion 5334. A length of the pressure marking 5331 is equal to a width of the sliding portion 5334, such that the color of the pressure marking 5331 is the same along the same direction, thereby ensuring normal display.

It may be appreciated that, the indicating component 533 and the display portion 5325 may be respectively provided with a single guide rail 5332 and a single third slide groove 5325a. With only one guide rail 5332 and one third slide groove 5325a, the design becomes easier, and the cost becomes lower. Moreover, a cross-sectional area of the sliding portion 5334 is smaller than a cross-sectional area of the through groove 5325b to ensure the sliding portion 5334 to slide in the through groove 5325b. In the first direction X, a length of the sliding portion 5334 is larger than a length of the through groove 5325b to ensure the different pressure markings 5331 to be accommodated, and to make it easy for the sliding portion 5334 to slide in the through groove 5325b.

In some other embodiments, in a third direction Z, two end faces of the indicating component 533 are each provided with a guide rail 5332, and two side walls of the through groove 5325b are each provided with a third slide grooves 5325a in correspondence to the guide rail 5332. That is to say, the guide rails 5332 and the third slide grooves 5325a are provided on both sides in the third direction Z. In this way, with the guide rails 5332 and the third slide grooves 5325a provided on both sides, the indicating component 533 can slide more stably in the through groove 5325b.

It should be noted that, the third direction Z intersects and is perpendicular to the first direction X and the second direction Y, and the third direction Z is an axial direction of the second roller 210.

Referring to FIG. 23, the display portion 5325 further includes an observation structure 5325c. The observation structure 5325c is arranged around the viewing window 5321, and is funnel-shaped. Along a positive direction of the second direction Y, a cross-sectional area of the observation structure 5325c gradually increases. That is, a portion of the observation structure 5325c where the cross-sectional area is the smallest is connected to the viewing window 5321. With the observation structure 5325c, the user can observe the pressure marking 5331 from other viewing angles, i.e. not necessarily from a perspective parallel to the viewing window 5321. In this way, the user can better observe the color of the pressure marking 5331 in the viewing window 5321.

Figure 22:
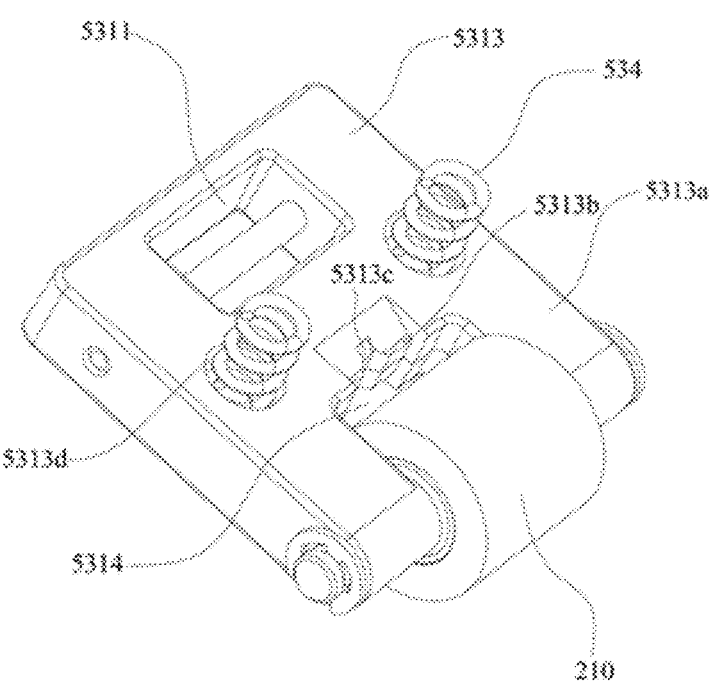
FIG. 22 is a schematic structural view showing connection between an elastic member and a measurement component according to an embodiment of the present disclosure.

In a possible embodiment of the present application, referring to FIGS. 22, 25 and 26, the measurement component 531 is provided with an engaged portion 5313b, and the indicating component 533 includes an engaging portion 5333 connected to the pressure marking 5331. The pressure marking 5331 indicates at least two different pieces of pressure information. The engaging portion 5333 is connected to the engaged portion 5313b, such that the indicating component 533 is fixed to the measurement component 531. The engaged portion 5313b is provided with a positioning groove 5313c, and the engaging portion 5333 is provided with a positioning protrusion 5333d inserted into the positioning groove 5313c. With the engaging portion 5333 and the engaged portion 5313b, the indicating component 533 is fixed to the measurement component 531, and therefore the indicating component 533 can directly display a measurement result of the measurement component 531.

In an example, referring to FIG. 26, the engaging portion 5333 includes a first connecting block 5333a, a second connecting block 5333b and a third connecting block 5333c. The first connecting block 5333a and the third connecting block 5333c are connected through the second connecting block 5333b, and the first connecting block 5333a is connected to the sliding portion 5334. One end of the first connecting block 5333a away from the sliding portion 5334 abuts against an upper end face of the engaged portion 5313b, and the third connecting block 5333c abuts against a lower end face of the engaged portion 5313b. In this way, the first connecting block 5333*a* and the third connecting block 5333*c* respectively abut against the upper end face and the lower end face of the engaged portion 5313*b*, thereby ensuring the engaging portion 5333 and the engaged portion 5313*b* to be stably fixed.

Moreover, referring to FIG. 26, the positioning protrusion 5333*d* is connected to the first connecting block 5333*a*, the second connecting block 5333*b*, and the third connecting block 5333*c*. The engaged portion 5313*b* is provided with a positioning groove 5313*c* in correspondence to the positioning protrusion 5333*d*. The positioning protrusion 5333*d* is engaged in the positioning groove 5313*c*, thereby improving the stability of the engaging portion 5333 and the engaged portion 5313*b*, and preventing the indicating component 533 and the measurement component 531 from being deflected or shaking.

Besides, referring to FIG. 22, an inclined surface is provided at a position where the engaged portion 5313*b* and the support portion 5313 are connected to each other, and a sloping surface is provided at a position where the first connecting block 5333*a* and the sliding portion 5334 are connected to each other and corresponds to the inclined surface. In this way, the first connecting block 5333*a* and the engaged portion 5313*b* can be ensured to be stably connected to each other, and the sliding portion 5334 can match the through groove 5325*b*, so that the sliding portion 5334 can slide more smoothly in the through groove 5325*b* to show the corresponding pressure marking 5331 in the viewing window 5321.

Figure 24:
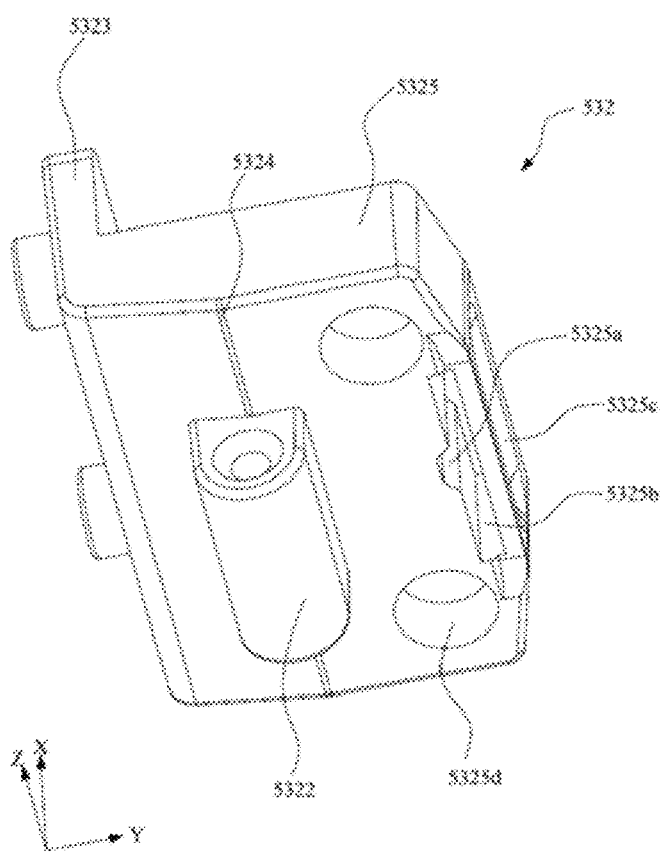
FIG. 24 is a schematic structural view of a first fixing member provided with a first connecting portion according to an embodiment of the present disclosure.

In a possible embodiment of the present application, referring to FIGS. 23 and 24, the first fixing member 532 is provided with a first connecting portion 5322 and a second connecting portion 5323. One end of the first connecting portion 5322 is connected to the first fixing member 532, and the other end of the first connecting portion 5322 is rotatably connected to the measurement component 531. The second connecting portion 5323 is connected to the workpiece conveying device 1. According to the embodiment of the present application, by providing the first fixing member 532 of the connector 530 with the first connecting portion 5322 and the second connecting portion 5323, the entire connector 530 can be fixed to the workpiece conveying device 1, and the measurement component 531 and the first fixing member 532 of the connector 530 can be movably connected to each other.

In a possible embodiment of the present application, referring to FIG. 22, the connector 530 further includes an elastic portion 534, and the measurement component 531 includes a support portion 5313. One end of the elastic portion 534 is connected to the support portion 5313, and the other end of the elastic portion 534 is connected to the first fixing member 532. The elastic portion 534 is used to change a distance between the first fixing member 532 and the measurement component 531.

It may be appreciated that, when the workpiece conveying device 1 conveys the workpiece, the second roller 210 contacts the workpiece to make the measurement component 531 move in a direction close to the first fixing member 532, and the elastic portion 534 is compressed. Even if the surface of the workpiece is not flat, a restoration force produced by the elastic portion 534 can still push the measurement component 531 to make the second roller 210 tightly press the workpiece. With the elastic portion 534 according to the embodiment of the present application, the distance between the first fixing member 532 and the measurement component 531 can be adjusted according to the actual thickness of the workpiece, such as to make the second roller 210 tightly press the workpiece, thereby preventing the workpiece from slipping when the workpiece conveying device 1 is conveying the workpiece.

In a possible embodiment of the present application, referring to FIGS. 22 and 24, the support portion 5313 is provided with a first accommodation portion 5313*d*, and at least a part of the elastic portion 534 is located inside the first accommodation portion 5313*d*. And/or, the first fixing member 532 is provided with a second accommodation portion 5325*d*, and at least a part of the elastic portion 534 is located inside the second accommodation portion 5325*d*. It may be appreciated that, since the elastic portion 534 may be accommodated both in the first accommodation portion 5313*d* and in the second accommodation portion 5325*d*, when the elastic portion 534 is compressed to a shortest length, a surface of the measurement component 531 may contact a surface of the first fixing member 532, and the distance between the measurement component 531 and the first fixing member 532 is smallest. In this way, the connector 530 can measure a wider range of pressure, and it is possible to avoid impossibility of contact between the surface of the measurement component 531 and the surface of the first fixing member 532 due to the length of the elastic portion 534.

Specifically, referring to FIG. 22, the elastic portion 534 may adopt two spring structures that are symmetric to each other. The support portion 5313 of the measurement component 531 is provided with two first accommodation portions 5313*d* in correspondence to the elastic portion 534. One end of the elastic portion 534 is mounted inside the first accommodation portions 5313*d*, and the other end of the elastic portion 534 is arranged in two second accommodation portions 5325*d* on the display portion 5325 of the first fixing member 532. In this way, the elastic portion 534 can be effectively fixed by the first accommodation portions 5313*d* and the second accommodation portions 5325*d*. When the measurement component 531 gradually rotates upwards, the elastic portion 534 can buffer the upward rotation of the measurement component 531 to protect the measurement component 531 and the first fixing member 532. When the second roller 210 contacts a workpiece having a small height, the measurement component 531 rotates in an opposite direction. At this time, the elastic portion 534 applies an elastic force downwards to the measurement component 531, thereby improving the return speed of the measurement component 531.

It is worth mentioning that the elastic portion 534 may be of an elastic rubber structure, as long as the elastic portion 534 can be compressed or expanded between the measurement component 531 and the first fixing member 532, which is not described in detail herein.

Moreover, the elastic portion 534 may be fixedly connected to the first accommodation portion 5313*d* or the second accommodation portion 5325*d* by welding or other means, so as to further improve the stability between the elastic portion 534 and the measurement component 531 as well as the first fixing member 532. Alternatively, the elastic portion 534 may be connected to the first accommodation portion 5313*d* or the second accommodation portion 5325*d* in a detachable manner. That is, the elastic portion 534 is placed into the first accommodation portion 5313*d* and the second accommodation portion 5325*d*, and abuts against inner bottom walls of the first accommodation portion 5313*d* and of the second accommodation portion 5325*d*.

In a possible embodiment of the present application, referring to FIGS. 21 to 24, the first connecting portion 5322 protrudes from the surface of the first fixing member 532, and the first connecting portion 5322 is provided with a through hole. The measurement component 531 further includes a recess portion 5311 and a pin. The recess portion 5311 is provided on the support portion 5313, and the first connecting portion 5322 is engaged in the recess portion 5311. The pin passes through the through hole of the first connecting portion 5322 to be connected to an inner wall of the recess portion 5311. It may be appreciated that, the measurement component 531 may be rotatably connected to the first fixing member 532 through the pin, wherein the first connecting portion 5322 is provided on a bottom portion of the first fixing member 532 and provided with a pin, referring to FIGS. 23 and 24, the recess portion 5311 in correspondence to the first connecting portion 5322 is provided on the measurement component 531, the measurement component 531 is provided with a passing-through hole in correspondence to the pin, and two ends of the pin are inserted in the passing-through hole. In this way, the measurement component 531 can rotate around the pin. According to the present embodiment of the application, the first connecting portion 5322 can be accommodated in the recess portion 5311, such that the surface of the measurement component 531 can contact the surface of the first fixing member 532 with the smallest distance therebetween. As such, the connector 530 can measure a larger range of pressure.

It should be noted that, there is a gap between the other end of the first fixing member 532 and the measurement component 531 in the first direction X, which facilitates the rotation of the measurement component 531 around an axial direction of the pin, and provides a space for the measurement component 531 to rotate.

It should be noted that, when the first fixing member 532 is rotatably connected to the measurement component 531, a part of the first fixing member 532 where the first fixing member 532 is rotatably connected to the measurement component 531 abuts against an end face of the measurement component 531. By abutting the first fixing member 532 against the end face of the measurement component 531, the abutting point of the first fixing member 532 against the measurement component 531 can serve as a support point for the measurement component 531, which facilitates the rotation of the measurement component 531.

Moreover, referring to FIGS. 21 and 22, the measurement component 531 further includes a rotating shaft and a hollow portion 5314. The hollow portion 5314 is provided on the support portion 5313. The rotating shaft is connected to the support portion 5313, and the rotating shaft and the hollow portion 5314 define a roller holding portion. The second roller 210 is rotatably provided on the rotating shaft, and at least a part of the second roller 210 is located in the roller holding portion. The second roller 210 contacts the workpiece. According to the present embodiment of the application, the connector 530 is provided with the roller holding portion to arrange the second roller 210 on the connector 530, such that the connector 530 can measure the pressure on the workpiece conveyed by the workpiece conveying device 1 in real time.

Specifically, as shown in FIG. 22, the support portion 5313 includes two engagement blocks 5313a that protrude from the support portion 5313 and are arranged opposite to each other. The hollow portion 5314 is formed between the two engagement blocks 5313a to accommodate the second roller 210. The second roller 210 is rotatably connected to the two engagement blocks 5313a on both sides through a rotating shaft, a bearing, or other structures. The rotating shaft is connected to the support portion 5313, and rotating shaft and the hollow portion 5314 define the roller holding portion. Thus, the second roller 210 may rotate in the roller holding portion to convey the workpiece.

Hereinafter, a specific embodiment will be given to illustrate the operation principle of the connector 530.

When the workpiece conveying device 1 is in an idle state, and no workpiece is conveyed under the measurement component 531, the elastic portion 534 is in an initial state, i.e. without any compressive deformation or tensile deformation. When the workpiece conveying device 1 is in a working state, the second roller 210 contacts the workpiece when conveying the workpiece. Therefore, the second roller 210 is pressed by the workpiece, gradually rotates upwards, and drives the support portion 5313 to rotate around the rotating portion 5324. Under the upward compression force applied by the support portion 5313, the elastic portion 534 gradually deforms upwards in an elastic manner.

At the same time, the indicating component 533 rotates upwards along with the support portion 5313, and the guide rail 5332 slides in the third slide groove 5325a. The pressure marking 5331 in the viewing window 5321 gradually switches from the fixed indicating block of one color to the fixed indicating block of another color, and the current pressure applied to the workpiece by the measurement component 531 can be determined according to the pressure marking 5331 viewed through the viewing window 5321. At this time, if the fixed indicating block in the viewing window 5321 switches from the yellow fixed indicating block 5331b to the red fixed indicating block 5331a, it means that the pressure applied to the workpiece by the measurement component 531 is too high. To prevent the conveying of the workpiece from being affected, the connector 530 may be moved upwards to increase a space between the second roller 210 and the workpiece, such that the contact pressure between the second roller 210 and the workpiece decreases. When the fixed indicating block in the viewing window 5321 gradually switches from the red fixed indicating block 5331a to the yellow fixed indicating block 5331b, a proper compression force is applied between the measurement component 531 and the workpiece, thereby preventing abnormal rotation of the driving motor 141, so as to ensure the processing effect of the apparatus.

When a height of the workpiece being conveyed is lower than a height of a previous workpiece, the workpiece applies a smaller compression force to the second roller 210. In this case, the elastic portion 534 tends to restore, and the restoring elastic portion 534 exerts a downward force on the support portion 5313, so as to enable the second roller 210 to move towards the workpiece, and contact and convey the workpiece. At this time, if the fixed indicating block switches from the yellow fixed indicating block 5331b to the green fixed indicating block 5331c, it means that the pressure exerted on the workpiece by the measurement component 531 is too low or even zero. To prevent the conveying of the workpiece from being affected, the measurement component 531 may be moved downwards to decrease the space between the second roller 210 and the workpiece, such that the contact pressure between the second roller 210 and the workpiece increases. When the fixed indicating block in the viewing window 5321 gradually switches from the green fixed indicating block 5331c to the yellow fixed indicating block 5331b, a proper compression force is applied between the measurement component 531 and the workpiece, thereby preventing the workpiece from being deflected or slipping during processing, so as to ensure the processing effect of the apparatus.

Moreover, reference may be made to FIGS. 15 and 16 which are schematic structural views showing the connector 530 fixed onto the workpiece conveying device 1 through the support frame 220.

Figure 35:
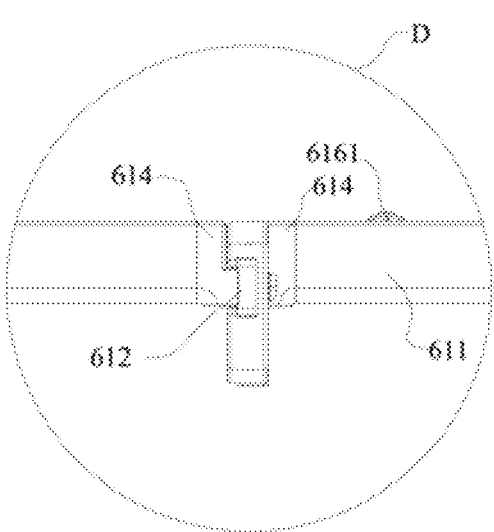
FIG. 35 is a schematic enlarged structural view of a portion D in FIG. 34 showing connection between a sliding member and an engagement groove.

In a possible embodiment of the present application, referring to FIG. 1, the workpiece conveying device 1 further includes an extension frame 60. Two extension frames 60 are provided on the two sides of the feeding platform 110, respectively. A workpiece of an elongated shape can be placed and carried on the extension frames 60. With the extension frames 60, the workpiece can be conveyed more stably, and is prevented from being damaged when being conveyed, which helps the computer numerical control apparatus engrave a desired pattern, prevents waste of the workpiece, and reduces the cost for manufacturing. Referring to FIG. 35, the extension frame 60 includes at least two extension sub-frames 610, and two adjacent extension sub-frames 610 are connected to each other.

Figure 33:
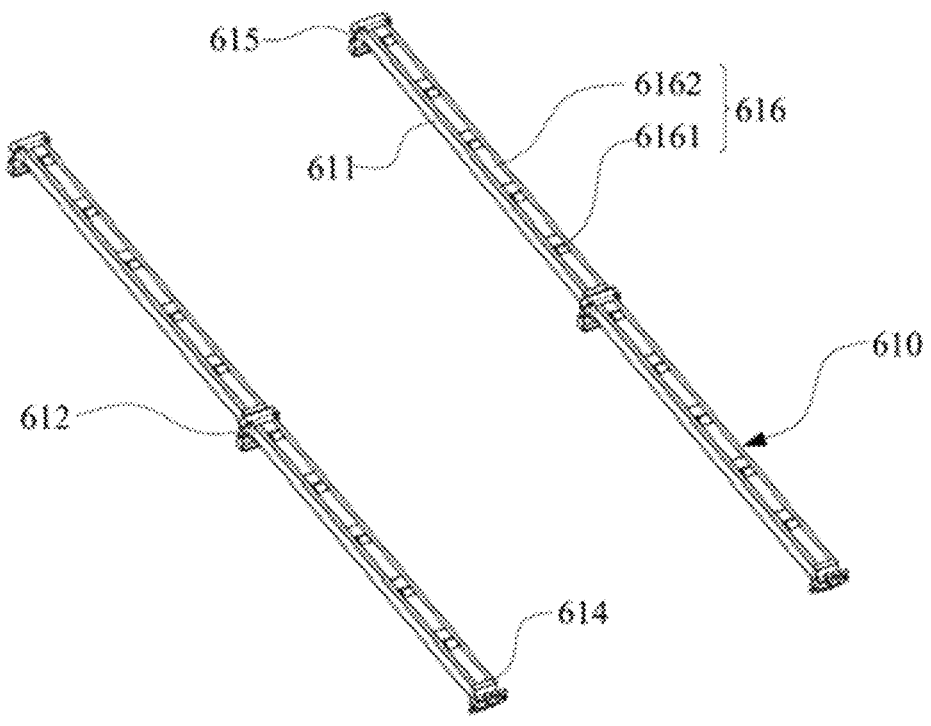
FIG. 33 is a schematic structural view of an extension frame according to an embodiment of the present disclosure.

Referring to FIG. 33, a length direction of the extension frame 60 is the same as a conveying direction of the workpiece conveying device 1. The extension frame 60 includes the at least two extension sub-frames 610. It may be appreciated that, one of the extension sub-frames 610 is connected to the workpiece conveying device 1, and the others of the extension sub-frames 610 are connected in sequence along the length direction of the extension frame 60, that is, every two adjacent extension sub-frames 610 are connected to each other. Thus, the user may determine the number of the extension sub-frames 610 according to the length of the workpiece. A total length of the extension frame 60 is increased by splicing multiple extension sub-frames 610 to adapt to more workpieces of various lengths.

According to an embodiment of the application, the extension frame 60 is connected to the first conveying assembly 10 of the workpiece conveying device 1 to support the workpiece to be processed. The extension frame 60 includes the at least two extension sub-frames 610, and each two adjacent extension sub-frames 610 are connected to each other along the length direction of the extension frame 60. Therefore, the number of the extension sub-frames 610 may be determined according to the length of the workpiece, and the total length of the extension frame 60 may be increased by splicing the multiple extension sub-frames 610 to adapt to more workpieces of various lengths. In this way, the workpiece is prevented from being inclined or deformed, and the resistance to conveying of workpiece is reduced. Further, it can ensure the flatness of the workpiece, and prevent the workpiece from being deformed, thereby improving the quality of the processed workpiece.

In a possible embodiment of the present application, the two adjacent extension sub-frames 610 are foldable with respect to each other. When the workpiece needs to be supported by the extension frame 60, the two adjacent extension sub-frames 610 are in an unfolded state to match the length of the workpiece and to support the workpiece. After the workpiece is processed, the extension frame 60 may be detached from the first conveying assembly 10, and the two adjacent extension sub-frames 610 may be in a folded state. Alternatively, the two adjacent extension sub-frames 610 are telescopic with respect to each other. When the workpiece needs to be supported by the extension frame 60, the two adjacent extension sub-frames 610 are in an extended state to match the length of the workpiece and to support the workpiece. After the workpiece is processed, the extension frame 60 may be detached from the first conveying assembly 10, and the two adjacent extension sub-frames 610 are in a retracted state. With the foldable or retractable extension sub-frames 610, the extension frame 60 can be easily stowed in the idle state, thereby reducing footprint area of the extension frame 60.

In a possible embodiment of the present application, the two adjacent extension sub-frames 610 are connected to each other in a detachable manner. When the workpiece needs to be supported by the extension frame 60, the two adjacent extension sub-frames 610 are spliced. After the workpiece is processed, the two adjacent extension sub-frames 610 may be detached and separated, thereby reducing footprint area of the extension frame 60.

Figure 34:
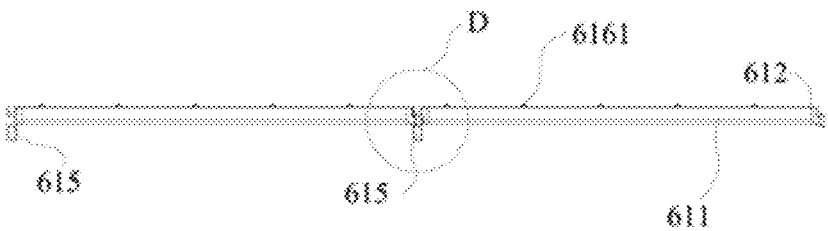
FIG. 34 is a schematic structural side view of the extension frame according to an embodiment of the present disclosure.

In a possible embodiment of the present application, referring to FIGS. 34 and 35, two ends of at least one extension sub-frame 610 are each provided with a sliding member 612 and/or an engagement groove 615. The two adjacent extension sub-frames 610 are connected through the sliding member 612 and/or the engagement groove 615. The sliding member 612 and the engagement groove 615 provide a simpler way for the connection and disconnection between the two adjacent extension sub-frames 610. Since the number of the extension sub-frames 610 may be determined according to the length of the workpiece, the extension frame 60 may be adaptive to a longer workpiece.

Figure 36:
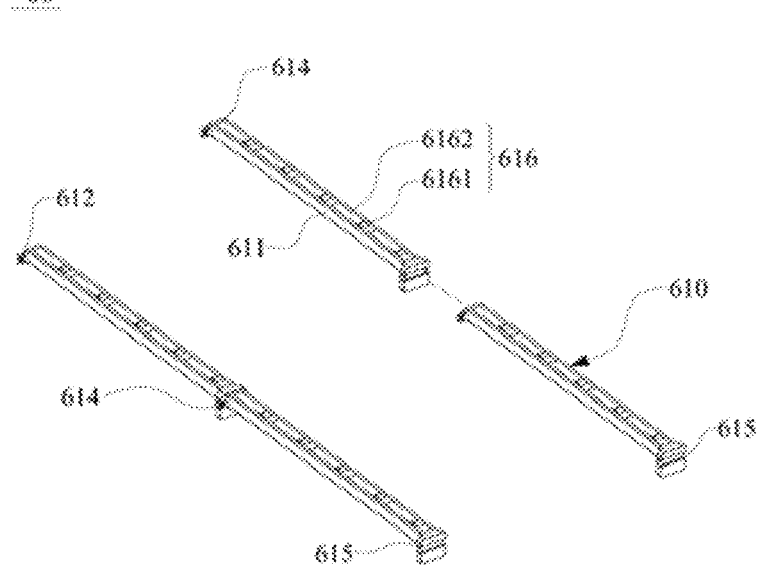
FIG. 36 is a schematic exploded structural view of adjacent extension sub-frames according to an embodiment of the present disclosure viewed from an angle.
Figure 40:
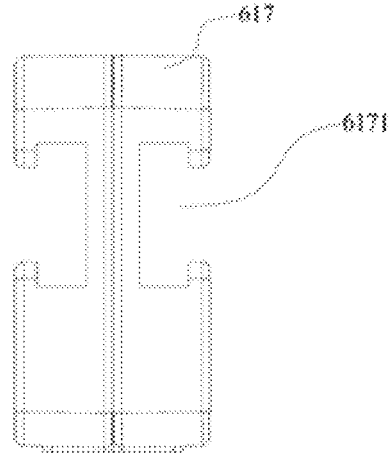
FIG. 40 is a schematic structural view of a first connector according to an embodiment of the present disclosure.
Figure 41:
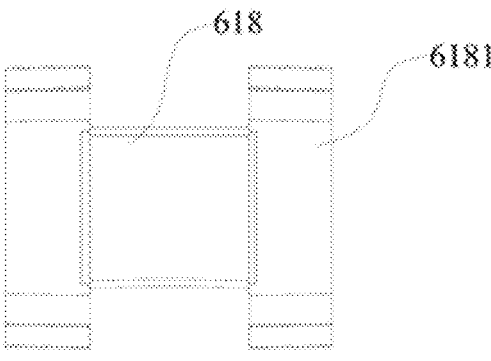
FIG. 41 is a schematic structural view of a second connector according to an embodiment of the present disclosure.

Specifically, referring to FIG. 36, the two ends of the extension sub-frame 610 are respectively provided with the sliding member 612 and the engagement groove 615. And/or, as shown in FIG. 40, an end portion of the extension sub-frame 610 is provided with the sliding member 612, and the extension frame 60 further includes a third connector 617. Two sides of the third connector 617 are each provided with a connecting groove 6171, and the two connecting grooves 6171 are configured to be respectively connected to the sliding members 612 of two adjacent extension sub-frames 610. And/or, as shown in FIG. 41, an end portion of the extension sub-frame 610 is provided with the engagement groove 615, and the extension frame 60 further includes a fourth connector 618. Two sides of the fourth connector 618 are each provided with a connecting block 6181, and the two connecting blocks 6181 are configured to be respectively connected to the engagement grooves 615 of two adjacent extension sub-frames 610.

Figure 37:
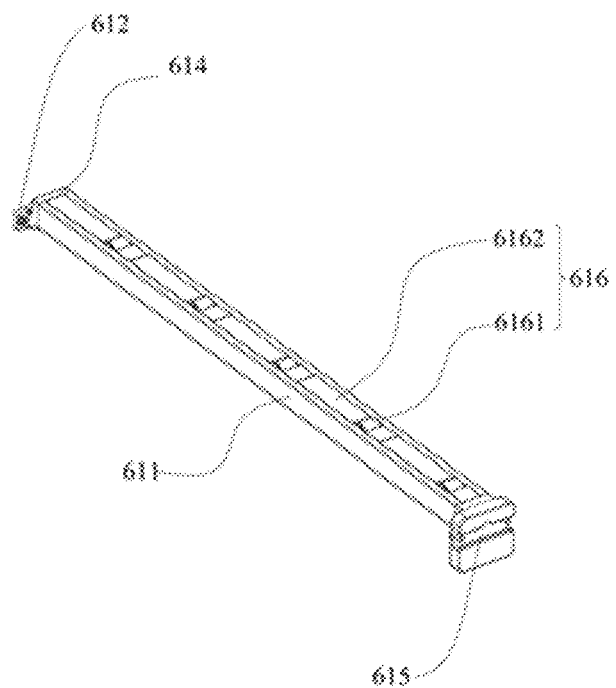
FIG. 37 is a schematic structural view of one extension sub-frame according to an embodiment of the present disclosure.
Figure 38:
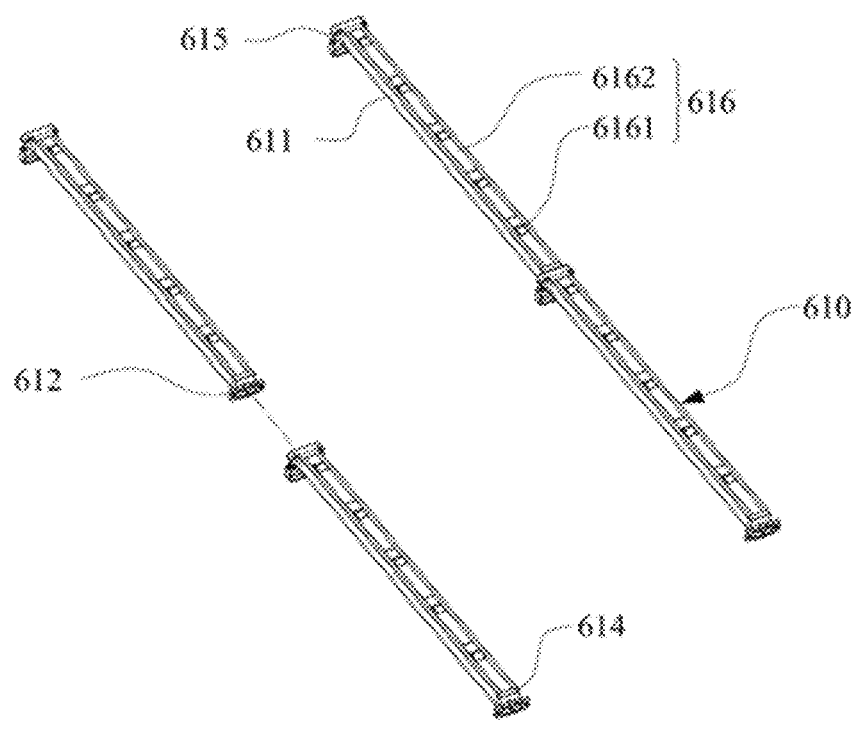
FIG. 38 is a schematic exploded structural view of the adjacent extension sub-frames according to an embodiment of the present disclosure viewed from another angle.

Referring to FIGS. 37 and 38, two ends of each extension sub-frame 610 are respectively provided with the sliding member 612 and the engagement groove 615. It may be appreciated that, the extension frame 60 includes a first extension sub-frame and a second extension sub-frame that are both the extension sub-frames 610. One end of the first extension sub-frame is provided with the sliding member 612, and the other end of the first extension sub-frame is provided with the engagement groove 615. One end of the second extension sub-frame is provided with the sliding member 612, and the other end of the second extension sub-frame is provided with the engagement groove 615. In use, the sliding member 612 of the first extension sub-frame is connected to the first conveying assembly 10, and the engagement groove 615 of the first extension sub-frame is in engagement with the sliding member 612 of the second extension sub-frame, such that the first extension sub-frame and the second extension sub-frame are connected to each other, thereby increasing the length of the extension frame 60 to adapt to the longer workpiece. Certainly, if the total length of the first extension sub-frame and the second extension sub-frame is insufficient to support the workpiece, the user may splice other extension sub-frames 610 in sequence after the second extension sub-frame according to the length of the workpiece, until the total length of the extension frame 60 is sufficient to support the workpiece.

Certainly, it may be appreciated that, if the total length of the first extension sub-frame and the second extension sub-frame is enough to support the workpiece, only one end of the second extension sub-frame needs to be provided with the sliding member 612 or the engagement groove 615 to be connected to the first extension sub-frame, and the other end of the second extension sub-frame has no need to be provided with the sliding member 612 or engagement groove 615 to be connected to other extension sub-frames 610.

Alternatively, the end portion of the extension sub-frame 610 is provided with the sliding member 612, and the extension frame 60 further includes the third connector 617. The two sides of the third connector 617 are each provided with the connecting groove 6171, and the two connecting grooves 6171 are configured to be respectively connected to the sliding members 612 of two adjacent extension sub-frames 610. It may be appreciated that, the extension frame 60 includes a third extension sub-frame and a fourth extension sub-frame that are both the extension sub-frames 610. Both ends of the third extension sub-frame and of the fourth extension sub-frame are provided with the sliding members 612. In use, the two connecting grooves 6171 of the third connector 617 are respectively connected to one of the sliding members 612 of the third extension sub-frame and one of the sliding members 612 of the fourth extension sub-frame, such that the third extension sub-frame and the fourth extension sub-frame are connected to each other, thereby increasing the length of the extension frame 60 to be adaptive to the longer workpiece. The other of the sliding members 612 of the third extension sub-frame is connected to the first conveying assembly 10. Certainly, if the total length of the third extension sub-frame and the fourth extension sub-frame is insufficient to support the workpiece, the user may splice other extension sub-frames 610 in sequence through the third connector 617 after the fourth extension sub-frame according to the length of the work-piece, until the total length of the extension frame 60 is sufficient to support the workpiece. Certainly, it may be appreciated that, if the total length of the third extension sub-frame and the fourth extension sub-frame is enough to support the workpiece, only one end of the fourth extension sub-frame needs to be provided with the sliding member 612 to be connected to the third connector 617, and the other end of the fourth extension sub-frame has no need to be provided with the sliding member 612 to be connected to the third connector 617.

Alternatively, the end portion of the extension sub-frame 610 is provided with the engagement groove 615, and the extension frame 60 further includes the fourth connector 618. The two sides of the fourth connector 618 are each provided with the connecting block 6181, and the two connecting blocks 6181 are configured to be respectively connected to the engagement grooves 615 of two adjacent extension sub-frames 610. It may be appreciated that, the extension frame 60 includes a fifth extension sub-frame and a sixth extension sub-frame that are both the extension sub-frames 610. Both ends of the fifth extension sub-frame and of the sixth extension sub-frame are provided with the engagement grooves 615. In use, the two connecting blocks 6181 of the fourth connector 618 are respectively connected to one of the engagement grooves 615 of the fifth extension sub-frame and one of the engagement grooves 615 of the sixth extension sub-frame, such that the fifth extension sub-frame and the sixth extension sub-frame are connected to each other, thereby increasing the length of the extension frame 60 to be adaptive to the longer workpiece. The other of the engagement grooves 615 of the fifth extension sub-frame is connected to the conveying assemblies. Certainly, if the total length of the fifth extension sub-frame and the sixth extension sub-frame is insufficient to support the workpiece, the user may splice other extension sub-frames 610 in sequence through the fourth connector 618 after the sixth extension sub-frame according to the length of the workpiece, until the total length of the extension frame 60 is sufficient to support the workpiece. Certainly, it may be appreciated that, if the total length of the fifth extension sub-frame and the sixth extension sub-frame is enough to support the workpiece, only one end of the sixth extension sub-frame needs to be provided with the engagement groove 615 to be connected to the fourth connector 618, and the other end of the fourth extension sub-frame has no need to be provided with the engagement groove 615 to be connected to the fourth connector 618.

It should be noted that, referring to FIG. 35, the sliding member 612 may be engaged in the engagement groove 615 by snap-fit, or by a screw, a rivet or other means. Thus, the connection and disconnection between adjacent extension frames 60 is simpler and easier.

To ensure the stability of the connection between the engagement groove 615 and the sliding member 612, the sliding member 612 abuts against an upper top wall and a lower bottom wall of the engagement groove 615 to apply a tensional force to the upper top wall and the lower bottom wall of the engagement groove 615. Thus, it is possible to ensure the conveying of the workpiece, thereby ensuring the processing performance on the workpiece.

Figure 39:
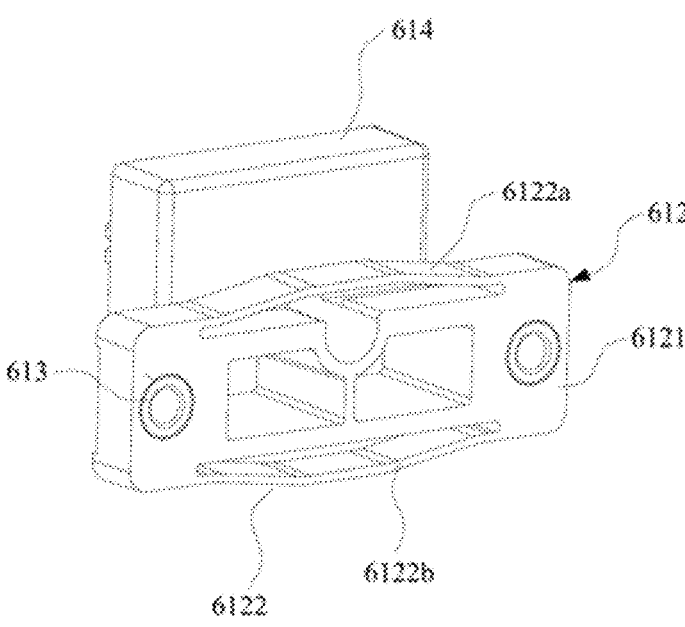
FIG. 39 is a schematic structural view showing connection between a sliding member and a fixation portion according to an embodiment of the present disclosure.

In a possible embodiment of the present application, referring to FIG. 39, two opposite ends of the sliding member 612 are respectively provided with a first elastic member 6122a and a second elastic member 6122b. When the sliding member 612 is not connected to the engagement groove 615, a distance between the first elastic member 6122a and the second elastic member 6122b is larger than a width of the engagement groove 615. When the sliding member 612 is mounted in the engagement groove 615, the first elastic member 6122a and the second elastic member 6122b are deformed and abut against a wall of the engagement groove 615. With the deformable first elastic member 6122a and the second elastic member 6122b at the two ends of the sliding member 612, the sliding member 612 is adaptive to more engagement grooves 615 of different widths, and it is possible to avoid the case that the sliding member 612 cannot be mounted into the engagement groove 615 due to an excessive width of the sliding member 612 caused by processing errors.

In a possible embodiment of the present application, referring to FIG. 39, the sliding member 612 further includes a first sliding block 6121 that is connected to the extension sub-frame 610 in a detachable manner, so as to facilitate the replacement of the first sliding block 6121 on the extension sub-frame 610. Furthermore, the first elastic member 6122a and the second elastic member 6122b are connected through the first sliding block 6121, gaps are reserved respectively between the first elastic member 6122a and the first sliding block 6121 and between the second elastic member 6122b and the first sliding block 6121 to provide spaces for elastic deformation of the first elastic member 6122a and the second elastic member 6122b.

When the sliding member 612 is engaged in the engagement groove 615, the first elastic member 6122a and the second elastic member 6122b apply the tensional force respectively to the upper top wall and the lower bottom wall of the engagement groove 615, such that the sliding member 612 may not slide horizontally in the engagement groove 615, thereby ensuring the stability of the sliding member 612 and the engagement groove 615, and further ensuring the stability of the connection between the two adjacent extension sub-frames 610.

When the sliding member 612 is not engaged in the engagement groove 615, the distance between the first elastic member 6122*a* and the second elastic member 6122*b* is larger than the width of the engagement groove 615.

Specifically, as shown in FIG. 39, the first elastic member 6122*a* and the second elastic member 6122*b* are each of an arc strip structure. Arc apex faces of the first elastic member 6122*a* and the second elastic member 6122*b* respectively contact the upper top wall of the engagement groove 615 and the lower bottom wall of the engagement groove 615. In this way, the first elastic member 6122*a* and the second elastic member 6122*b* better apply the tensional force to the upper top wall and the lower bottom wall of the engagement groove 615 respectively, have a better restoration performance, and are less likely to be damaged.

It may be appreciated that, when the sliding member 612 is engaged in the engagement groove 615, the engagement groove 615 and the sliding member 612 are fixedly connected by a connector such as a screw or a rivet, so as to ensure a tight connection between the adjacent extension frames 60.

Figure 42:
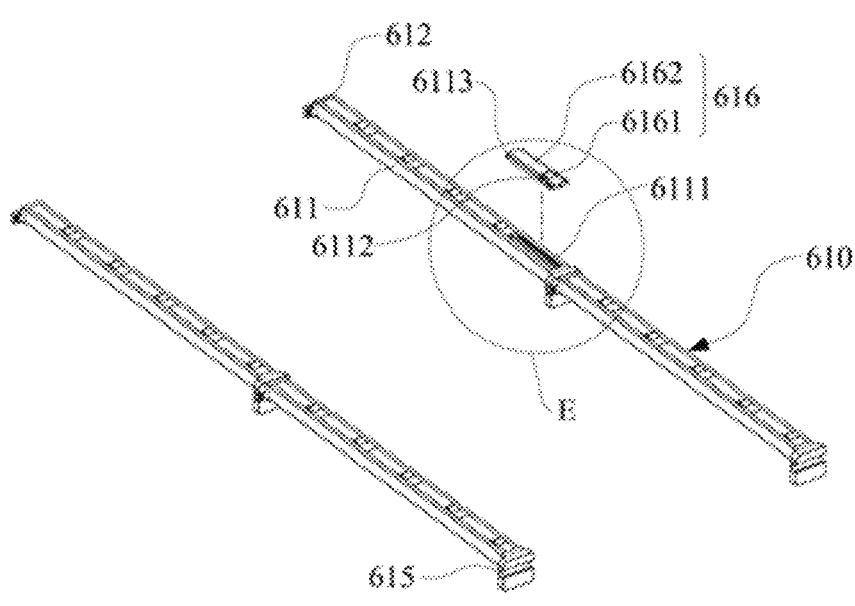
FIG. 42 is a schematic exploded structural view of a rolling assembly and a body of the extension frame according to an embodiment of the present disclosure.
Figure 43:
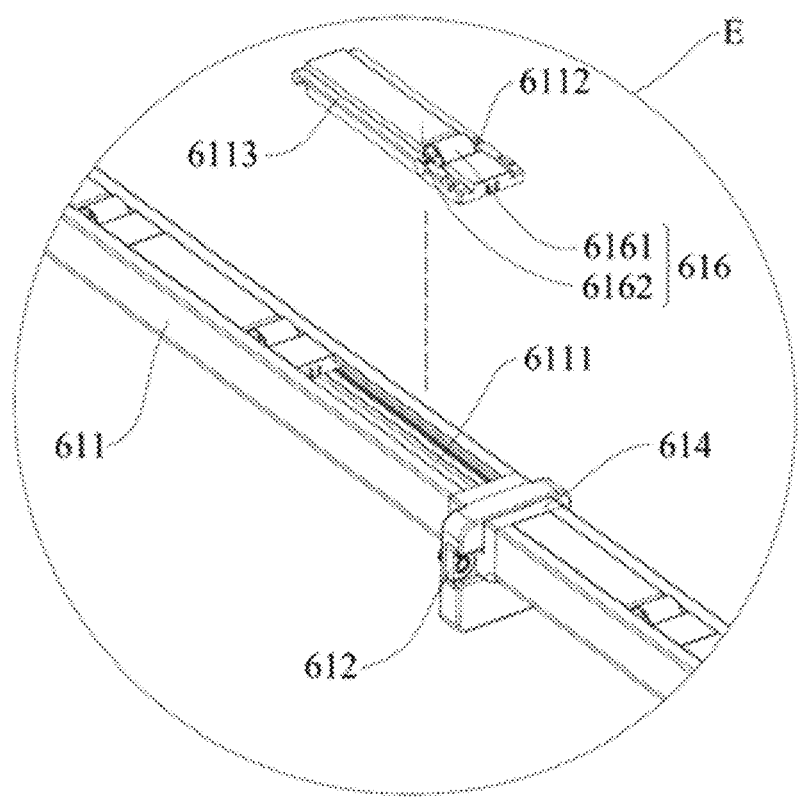
FIG. 43 is a schematic enlarged structural view of a portion E in FIG. 42 showing the rolling assembly detached from the body of the extension frame.

In a possible embodiment of the present application, to facilitate the conveying of the workpiece, referring to FIGS. 42 and 43, the extension sub-frame 610 includes a body of the extension frame 60 and a rolling assembly 616. The rolling assembly 616 is rotatably connected to the body of the extension frame 60, and at least a part of the rolling assembly 616 extends out of the body of the extension frame 60. The rolling assembly 616 is configured to contact and convey the workpiece. According to the present embodiment, the body of the extension frame 60 is provided with multiple rolling assemblies 616, and the workpiece is conveyed by the multiple rolling assemblies 616. In this way, the resistance can be reduced when the workpiece is conveyed, and the workpiece that is soft and easy to be deformed can be better protected, thereby preventing the workpiece from being damaged.

Specifically, the rolling assembly 616 may be fixed to the body of the extension frame 60 by snap-fit, welding, or other means. If the rolling assembly 616 is fixed to the body of the extension frame 60 by snap-fit, it is beneficial to mount and dismount the rolling assembly 616 on and from the body of the extension frame 60, so that the assembling becomes easier. If the rolling assembly 616 is fixed to the body of the extension frame 60 by fixation means, the rolling assembly 616 can be more stably mounted on the body of the extension frame 60, and is less likely to shake, which is beneficial to the conveying of the workpiece. A part of the rolling assembly 616 extends out of an end face of the body of the extension frame 60, and can be in rolling contact with the workpiece to convey the workpiece by rolling.

For example, the body of the extension frame 60 may be made of an aluminum profile. Referring to FIG. 43, the body of the extension frame 60 is provided with a fixation groove 6111. The rolling assembly 616 is fixed in the fixation groove 6111 by snap-fit, and the rolling assembly 616 is rotatable with respect to the body of the extension frame 60 to convey the workpiece. In this way, with the fixation groove 6111, it becomes easier to mount and dismount the rolling assembly 616 on and from the body of the extension frame 60, and time for assembling is saved.

In a possible embodiment of the present application, the rolling assembly 616 may be a rolling member 6161 or a combination of a rolling member 6161 and a support plate 6162. If the rolling member 6161 is directly mounted in the fixation groove 6111 of the body of the extension frame 60, the structure is simpler and the operation is convenient. If the rolling assembly 616 is the combination of the rolling member 6161 and the support plate 6162, multiple rolling members 6161 may be disposed on the support plate 6162 to reduce the design of the fixation groove 6111 on the body of the extension frame 60, and it is easier for mounting and dismounting compared with the solution that the rolling member 6161 is directly fixed in the fixation groove 6111. Furthermore, the support plate 6162 can provide a better protection to the rolling member 6161, improves the stability of the rolling member 6161 when conveying the workpiece, and prevents the rolling member 6161 from being deflected during conveying, thereby ensuring the engraving effect.

Figure 44:
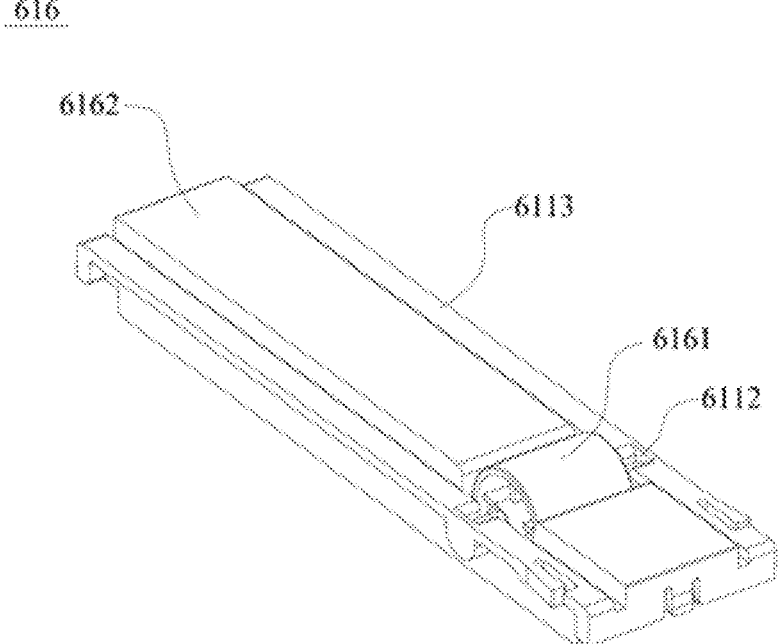
FIG. 44 is a schematic structural view of the rolling assembly according to an embodiment of the present disclosure.

For example, referring to FIGS. 43 and 44, the rolling assembly 616 includes the rolling member 6161 and the support plate 6162. The rolling member 6161 may be of a roller structure, and the rolling member 6161 and the support plate 6162 are arranged in the fixation groove 6111. The roller structure can better protect the workpiece that is soft and easy to be deformed, and prevent the workpiece from being damaged. Moreover, the support plate 6162 is provided with a mounting groove 6112 for mounting the rolling member 6161, and the rolling member 6161 is mounted on both sides of the mounting groove 6112 through a rotating shaft. There is a gap between the rolling member 6161 and a bottom wall of the mounting groove 6112, such that the rolling member 6161 can rotate in the mounting groove 6112. The rolling member 6161 extends out of the extension frame 60, and is in rolling contact with the workpiece, so as to convey the workpiece that is soft and easy to be deformed by rolling, thereby ensuring the integrity of the workpiece.

It should be noted that the rolling member 6161 may be a ball or other structures, as long as the rolling member 6161 can rotate with respect to the mounting groove 6112.

In addition, referring to FIG. 43, the support plate 6162 may be connected to the fixation groove 6111 on the extension frame 60 by snap-fit. The support plate 6162 is provided with an engagement plate 6113 that matches the fixation groove 6111, and the engagement plate 6113 is arranged in the fixation groove 6111 by snap-fit. During assembling, the support plate 6162 mounted with the rolling member 6161 is engaged in the fixation groove 6111 of the extension frame 60 through the engagement plate 6113. No screw or rivet is needed to fix the support plate 6162 and the fixation groove 6111, making assembling easy.

It is worth mentioning that, referring to FIG. 42, when the multiple rolling assemblies 616 are mounted on the extension frame 60, the multiple rolling assemblies 616 are arranged in sequence along the length direction of the extension frame 60, and the adjacent rolling assemblies 616 are closely next to each other to ensure the workpiece to be conveyed. Besides, each rolling assembly 616 may be provided with one or more rolling members 6161. If the extension frame 60 is provided with the multiple rolling assemblies 616, a spacing distance between the adjacent rolling members 6161 is always the same no matter whether the adjacent rolling members 6161 are on the same rolling assembly 616 or on different rolling assemblies 616, so as to ensure stability of conveying of the workpiece.

Furthermore, the distance between adjacent rolling members 6161 may be varied according to different workpieces, so as to improve the adaptability of the extension frame 60.

Referring to FIG. 35, after the support plate 6162 and the fixation groove 6111 are assembled, an end face of the support plate 6162 is flush with the end face of the extension frame 60, so as to ensure flatness of the end face of the extension frame 60 and prevent the workpiece from being scratched by the support plate 6162, thereby protecting the workpiece better.

It should be noted that, with the support plate 6162 according to the present application, the workpiece may be prevented from being deformed in a case that the workpiece is soft and the spacing distance between the rolling members 6161 is relatively large.

Moreover, referring to FIG. 39, the extension sub-frame 610 further includes a fixation portion 614, and both ends of the body of the extension frame 60 are connected to the fixation portion 614. The engagement groove 615 or the sliding member 612 is arranged on the fixation portion 614, such that the engagement groove 615 and the sliding member 612 can be mounted on the body of the extension frame 60 more easily, and the connection is kept stable.

It should be noted that the fixation portion 614 is connected to the body of the extension frame 60 in a detachable manner, so as to facilitate replacement, mounting and dismounting of the fixation portion 614.

Specifically, the extension frame 60 includes a first end and a second end that are opposite to each other along a direction perpendicular to the support plate 6162. The first end of the extension frame 60 is close to the support plate 6162, and the second end is away from the support plate 6162. A distance between the first end and the second end of the body of the extension frame 60 is smaller than a distance between a bottom end of the fixation portion 614 and the first end of the body of the extension frame 60. That is, a distance between a top end and a bottom end of the body of the extension frame 60 is smaller than a distance between the top end of the body of the extension frame 60 and the bottom end of the fixation portion 614. In this way, an overall height of the extension frame 60 is increased.

Figure 45:
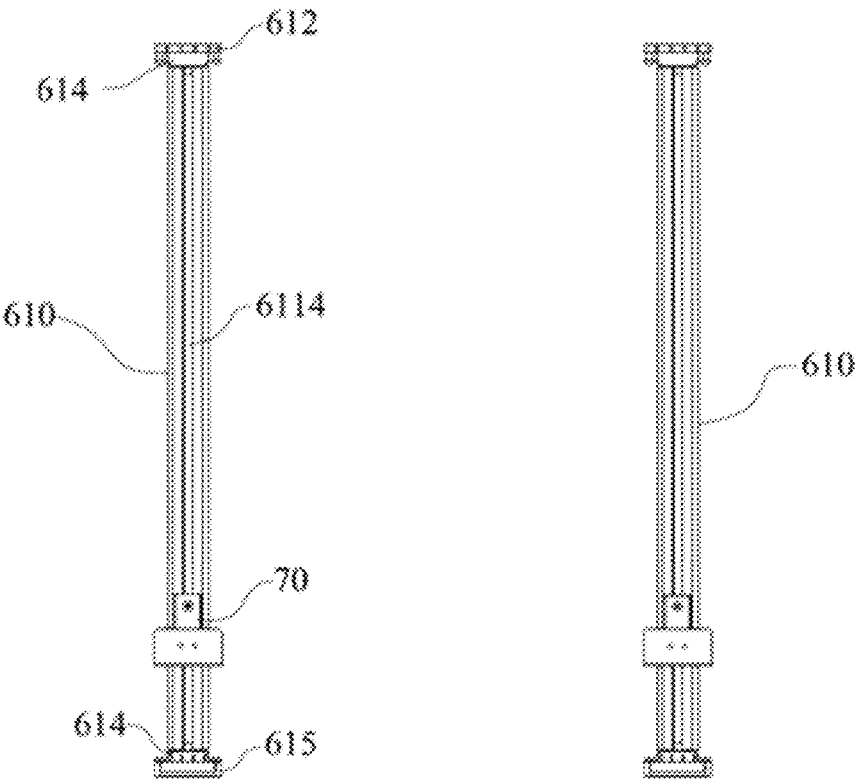
FIG. 45 is a schematic structural view showing a heightening stand mounted at a bottom portion of the extension sub-frame according to an embodiment of the present disclosure.

In a possible embodiment of the present application, referring to FIG. 45, a bottom face of the body of the extension frame 60 is provided with a fourth sliding groove 6114, and the extension frame 60 further includes a heightening stand 70. The heightening stand 70 is used to increase the height of the extension frame 60, such that the height of the extension frame 60 can be adjusted according to the size of the conveying assemblies, thereby improving the adaptability of the extension frame 60.

Figure 46:
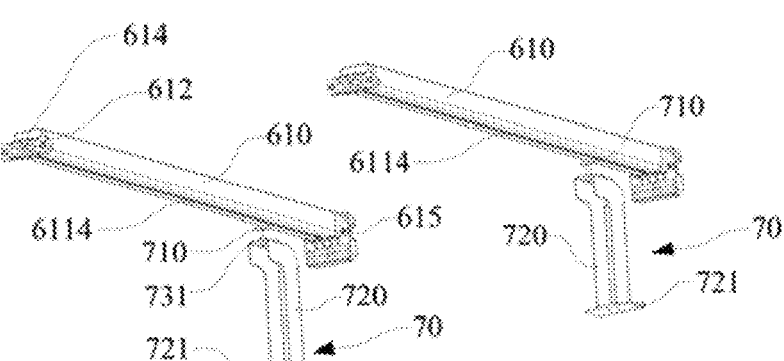
FIG. 46 is a schematic exploded structural view of the extension sub-frame and the heightening stand according to an embodiment of the present disclosure.

In a possible embodiment of the present application, referring to FIG. 46, the heightening stand 70 includes a second sliding block 710 and a heightening main body 720 that are connected to each other. The second sliding block 710 is located in the fourth sliding groove 6114 and is slidable in the fourth sliding groove 6114, so as to make the heightening main body 720 connected to the body of the extension frame 60 in a slidable manner. Since the heightening stand 70 according to the embodiment is provided with the second sliding block 710, the position of the heightening stand 70 relative to the body of the extension frame 60 is easily adjusted.

In a possible embodiment of the present application, referring to FIG. 46, the heightening stand 70 further includes a fastener 731, and the fastener 731 is in connection with the heightening main body 720 and the second sliding block 710. The fastener 731 is used to fix the heightening main body 720 relative to the body of the extension frame 60, which improves the stability of the conveying of the workpiece, and prevents the relative position of the heightening main body 720 and the body of the extension frame 60 from varying due to an action force between the workpiece and the body of the extension frame 60 during conveying of the workpiece. It may be appreciated that, the second sliding block 710 is located in the fourth sliding groove 6114, and the heightening main body 720 is located outside the fourth sliding groove 6114. The fastener 731 passes through the heightening main body 720 to be connected to the second sliding block 710 in the fourth sliding groove 6114. When the fastener 731 is tightened, the second sliding block 710 and the heightening main body 720 clamps a wall of the fourth sliding groove 6114 to fix the relative position of the heightening main body 720 and the body of the extension frame 60.

Figure 49:
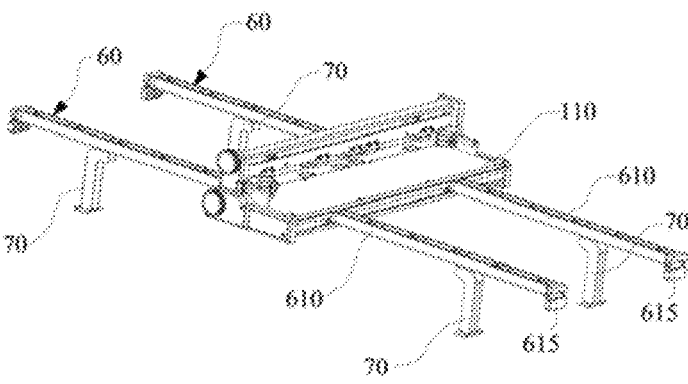
FIG. 49 is a schematic structural view showing a heightening stand provided at the bottom portion of the extension sub-frame according to an embodiment of the present disclosure.

In a possible embodiment of the present application, as shown in FIG. 49, in order to easily loosen the fastener 731 to detach the heightening stand 70 from the body of the extension frame 60 or tighten the fastener 731 to mount the heightening stand 70 onto the body of the extension frame 60, the fastener 731 is provided with a handle 732. The user can directly act on the fastener 731 through the handle 732 without any tools, which improves convenience for the user.

In a possible embodiment of the present application, the second sliding block 710 has a first width and a second width, and an extension direction of the first width and an extension direction of the second width are perpendicular to each other. The first width is smaller than a width of an opening of the fourth sliding groove 6114, and the second width is larger than the width of the opening of the fourth sliding groove 6114. The second sliding block 710 can be mounted into the fourth sliding groove 6114 through the opening by adjusting a position of the second sliding block 710 to make the extension direction of the first width parallel to an extension direction of the fourth sliding groove 6114. Then, the second sliding block 710 can be prevented from falling out of the fourth sliding groove 6114 by rotating the second sliding block 710 to make the extension direction of the second width parallel to the extension direction of the fourth sliding groove 6114 and then tightening the fastener 731.

In a possible embodiment of the present application, as shown in FIGS. 46 to 49, the heightening main body 720 may be columnar. Alternatively, the heightening main body 720 may be triangular, which brings better stability than the columnar heightening main body 720, thereby enhancing the stability of the extension frame 60 when conveying the workpiece. A bottom portion of the heightening main body 720 may be provided with a non-slip pad 721 to prevent the heightening main body 720 from slipping on a placement plane, thereby better improving the stability of the extension frame 60 when conveying the workpiece.

Figure 47:
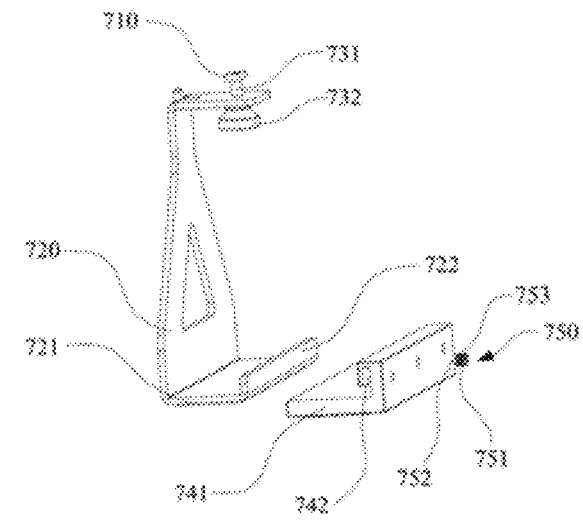
FIG. 47 is a schematic exploded structural view of another heightening stand according to an embodiment of the present disclosure.

In a possible embodiment of the present application, as shown in FIG. 47, the bottom portion of the heightening main body 720 is provided with a flange 722. The heightening stand 70 further includes a subplate 741, and the subplate 741 is provided with a groove 742. The flange 722 is engaged in the groove 742, such that the subplate 741 is connected to the heightening main body 720. By connecting the subplate 741 to the heightening main body 720, the overall height of the extension frame 60 can be fine-tuned, so as to make the extension frame 60 better match the conveying assembly.

Figure 48:
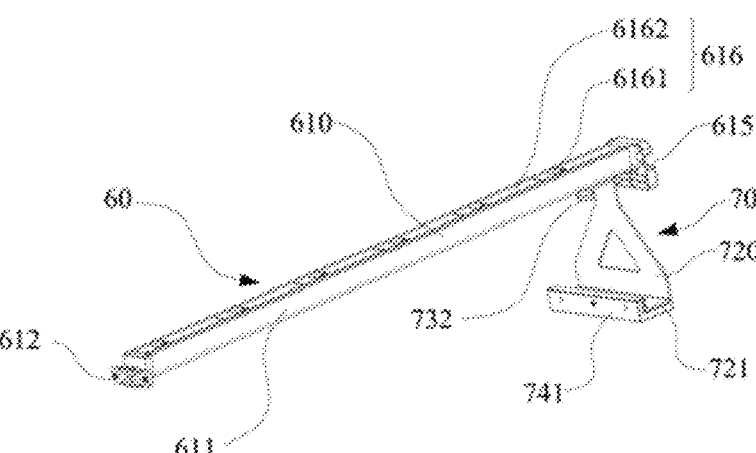
FIG. 48 is a schematic structural view showing connection between the another heightening stand and the extension sub-frame according to an embodiment of the present disclosure.

In a possible embodiment of the present application, as shown in FIGS. 47 and 48, the heightening stand 70 further includes a set screw 750. At least a part of the set screw 750 passes through the subplate 741 and abuts against the flange 722 in the groove 742, and the set screw 750 is used to fix the subplate 741 onto the heightening main body 720. Specifically, the set screw 750 includes a threaded cylinder 751, a steel ball 752, and a spring 753. The spring 753 and at least a part of the steel ball 752 are located in the threaded cylinder 751. One end of the spring 753 abuts against the threaded cylinder 751, and the other end of the spring 753 abuts against the steel ball 752 to make at least a part of the steel ball 752 exposed outside the threaded cylinder 751. When the subplate 741 and the heightening main body 720 are connected by the set screw 750, the threaded cylinder 751 is in a threaded connection with the subplate 741, and the steel ball 752 abuts against the flange 722 and makes the spring 753 in a compressed state. Since the spring 753 is provided inside the set screw 750, when the steel ball 752 abuts against the flange 722, the steel ball 752 compresses the spring 753, such that the spring 753 generates a reaction force applied to the flange 722. The reaction force generated by the spring 753 makes abutment force of the steel ball 752 against the flange 722 become larger, such that the subplate 741 and the heightening stand 70 are fixed more tightly, and there is no need to provide a threaded hole on the flange 722.

Figure 50:
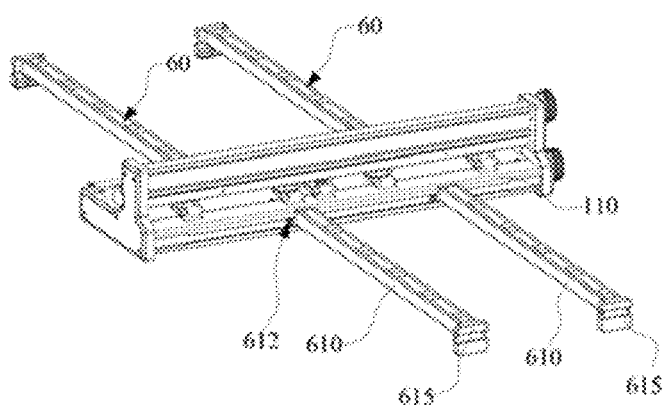
FIG. 50 is a schematic structural view of the workpiece conveying device according to an embodiment of the present disclosure.

As shown in FIG. 50, to ensure the extension frame to better carry the workpiece, a spacing distance between the extension frames 60 may be changed depending on the size of the workpiece. The extension frames 60 are connected to the feeding platform 110 in a slidable manner.

Figure 51:
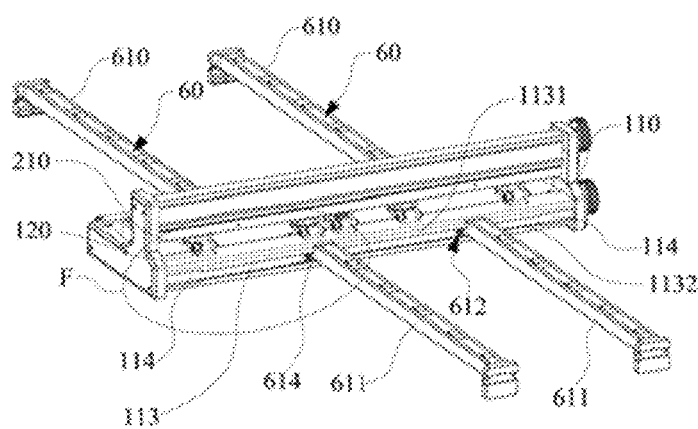
FIG. 51 is a schematic structural view showing that the extension frame is provided in a first sliding groove in a slidable manner according to an embodiment of the present disclosure.

In a possible embodiment of the present application, referring to FIG. 51, the extension frames 60 are connected to the feeding platform 110 in a slidable manner. The feeding platform 110 is provided with a first sliding groove 113, and the extension frames 60 are arranged in the first sliding groove 113 in a slidable manner. According to the present embodiment of the application, since the extension frames 60 are connected to the feeding platform 110 in a slidable manner, the position of the extension frames 60 relative to the feeding platform 110 can be adjusted to better support the workpiece.

In a possible embodiment of the present application, the feeding platform 110 is connected with at least two extension sub-frames 610 to ensure the stability of the conveying of the workpiece. Specifically, the extension frame 60 includes at least two extension sub-frames 610. The extension sub-frames 610 are arranged at a same side of the feeding platform 110 in a direction in which the workpiece is conveyed. The extension sub-frames 610 are connected to the first sliding groove 113 in a slidable manner, and a spacing distance between the two adjacent extension sub-frames 610 is adjustable. Thus, the user can adjust the spacing distance between the adjacent extension sub-frames 610 according to a width of the workpiece. For example, when the adjacent extension sub-frames 610 move away from each other, the spacing distance between the adjacent extension sub-frames 610 gradually increases to match a larger workpiece. When the adjacent extension sub-frames 610 move close to each other, the spacing distance between the adjacent extension sub-frames 610 gradually decreases. With the present embodiment, the extension frames may be adaptive to workpieces of various widths to provide support to the workpiece, and ensure that a wider workpiece can be conveyed, thereby improving the versatility of the workpiece conveying device 1.

It may be appreciated that, some workpieces are relatively large and soft, which may not be well supported by only two extension sub-frames 610. Under the action of gravity, the workpiece sinks between the two extension sub-frames 610 to deform. To avoid this issue, the user may increase the number of the extension sub-frames 610 according to the width of the workpiece. Multiple extension sub-frames 610 are arranged in parallel to improve the support for the workpiece, thereby improving the processing performance of the laser processing apparatus.

In a possible embodiment of the present embodiment, the extension frames 60 are slidably connected with both sides of the feeding platform 110 in the direction in which the workpiece is conveyed. The extension frame(s) 60 at one side of the feeding platform 110 is arranged to feed the workpiece, and the extension frame(s) 60 at the other side of the feeding platform 110 is arranged to discharge the workpiece. Two extension frames 60 may be provided at each of two sides of the feeding platform 110 to improve stability of conveying the workpiece. In this way, the workpiece can be prevented from being inclined or deformed not only when feeding but also when discharging, improving stability of conveying the workpiece by workpiece conveying device 1.

Alternatively, each side of the feeding platform 110 is connected with a single extension frame 60. That is, along the direction in which the workpiece is conveyed, each side of the feeding platform 110 is connected with one extension frame 60. It may be appreciated that, to ensure the workpiece to be conveyed normally by the extension frame 60, a width of the extension frame 60 is slightly smaller than a width of the feeding platform 110, so as to prevent the workpiece from colliding with the feeding platform 110, thereby ensuring normal conveying of the workpiece and normal engraving of the laser processing apparatus. Certainly, the extension frame 60 may be slidable with respect to the feeding platform 110. Through sliding, the position of the extension frame 60 with respect to the feeding platform 110 can be changed, that is, the position where the workpiece is conveyed can be changed, thereby matching more workpieces of various shapes or sizes.

It may be appreciated that, the feeding platform 110 provides a driving platform to the workpiece, and the extension frame 60 provides a support platform to the workpiece, so as to ensure the laser engraving apparatus to engrave normally and prevent the extension frame 60 from mismatching the size of the workpiece. Therefore, the workpiece conveying device 1 can be adaptive to more workpieces of various sizes.

It is worth mentioning that, along a direction perpendicular to the conveying direction of the workpiece, a length of the first sliding groove 113 may be equal to or less than a length of the feeding platform 110, which may be designed specifically according to different implementations.

Besides, along the conveying direction of the workpiece, two ends of the first sliding groove 113 may be each provided with a limiting member to limit the movement of the extension frame 60, preventing the extension frame 60 from sliding out of the first sliding groove 113.

Figure 53:
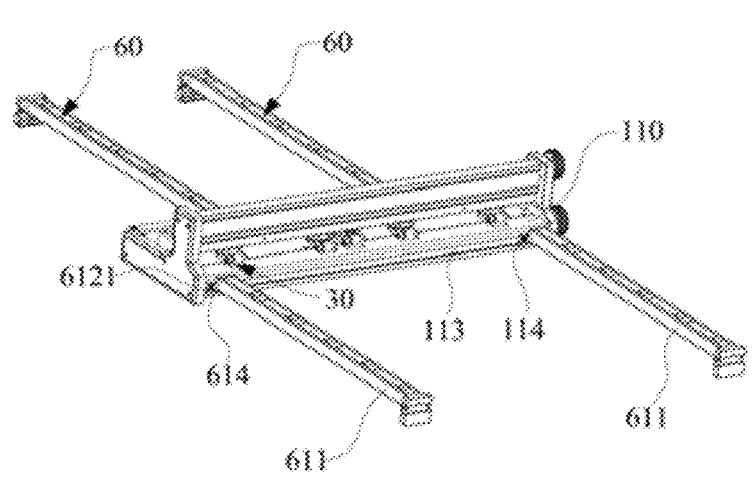
FIG. 53 is a schematic structural view showing that the extension frame is located in a second sliding groove according to an embodiment of the present disclosure.

In a possible embodiment of the present application, referring to FIGS. 53 and 54, the extension frame 60 includes an extension frame body 611 and a sliding member 612. The sliding member 612 is arranged in the first sliding groove 113 in a slidable manner, such that the extension frame 60 is connected to the feeding platform 110 in a slidable manner. The extension frame body 611 contacts a bottom surface of the workpiece to support the workpiece, and the extension frame body 611 is connected to the first sliding groove 113 of the feeding platform 110 in a slidable manner through the sliding member 612. By movably disposing the sliding member 612 in the first sliding groove 113, the position of the extension frame 60 relative to the feeding platform 110 can be adjusted more easily. It may be appreciated that the extension frame body 611 and the sliding member 612 may be connected in a detachable manner, e.g., by a screw, a rivet or the like, facilitating replacement of the extension frame body 611 and/or the sliding member 612.

In a possible embodiment of the present application, the workpiece conveying device 1 further includes a connecting plate 613. The connecting plate 613 is arranged on the sliding member 612, and is used to fix the position of the extension frame 60 relative to the feeding platform 110. With the connecting plate 613, the extension frame 60 can be fixed on the feeding platform 110, preventing the position of the extension frame 60 relative to the feeding platform 110 from being offset due to the movement of the workpiece during conveying to decrease the stability of conveying the workpiece by the workpiece conveying device 1.

Specifically, the connecting plate 613 is provided with a fixation hole. A screw passes through the fixation hole and is in a threaded connection with the fixing hole. An end portion of the screw abuts against an inner wall of the first sliding groove 113. When the screw is screwed into the fixation hole, the end portion of the screw gradually moves towards the inner wall of the first sliding groove 113, such that the sliding member 612 moves towards an opening of the first sliding groove 113. When the sliding member 612 abuts against the opening of the first sliding groove 113, the position of the extension frame 60 relative to the feeding platform 110 is fixed. When the screw is screwed out of the fixation hole, the abutment force of the sliding member 612 at the opening of the first sliding groove 113 decreases, and the sliding member 612 can be detached from the first sliding groove 113, so that the extension frame 60 is separated from the feeding platform 110.

Figure 52:
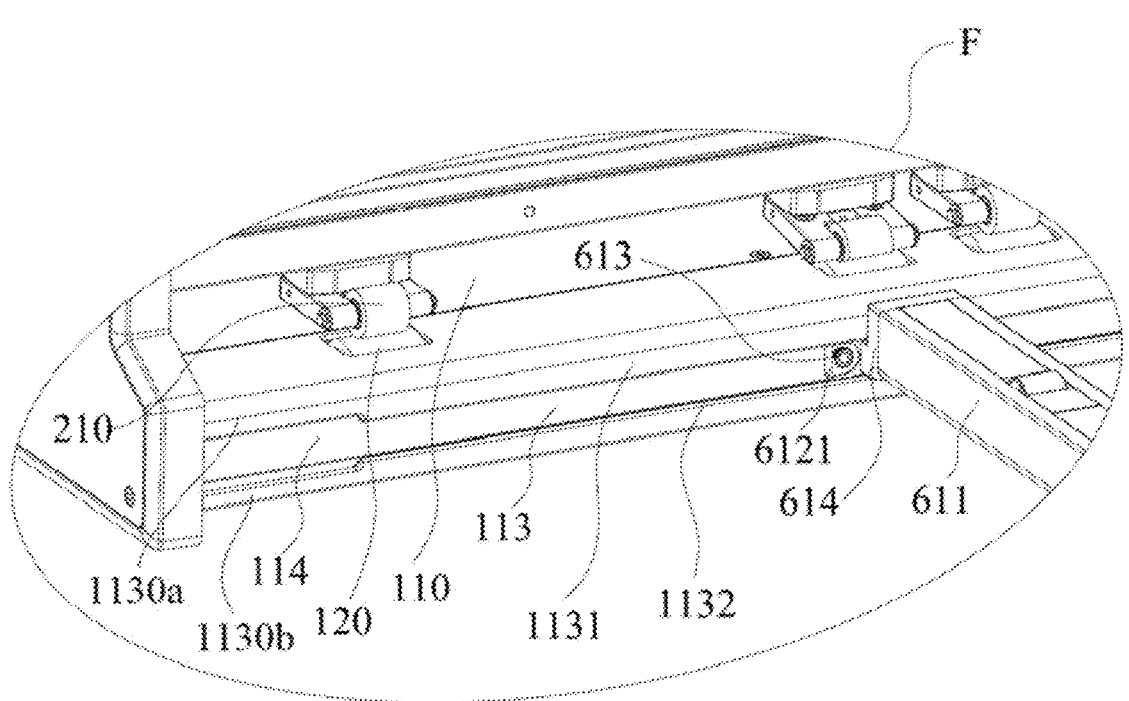
FIG. 52 is a schematic structural view of a portion F in FIG. 51 showing connection between the extension frame and the first sliding groove.

In a possible embodiment of the present application, referring to FIG. 52, the first sliding groove 113 includes a first groove wall 1130a and a second groove wall 1130b that are opposite to each other. The feeding platform 110 further includes a first limiting portion 1131 and a second limiting portion 1132. The first limiting portion 1131 is connected to the first groove wall 1130a, and the second limiting portion 1132 is connected to the second groove wall 1130b. A distance between the first limiting portion 1131 and the second limiting portion 1132 is smaller than a distance between the first groove wall 1130a and the second groove wall 1130b. The first limiting portion 1131 and the second limiting portion 1132 are used to limit a position of the sliding member 612 of the extension frame 60 sliding in the first sliding groove 113, so as to prevent the sliding member 612 from getting out of the first sliding groove 113. It may be appreciated that, the opening of the first sliding groove 113 is formed between the first limiting portion 1131 and the second limiting portion 1132. One end of the sliding member 612 extends out of the opening to be connected to the extension frame body 611. When the extension frame 60 is fixed to the feeding platform 110, the sliding member 612 tightly abuts against the first limiting portion 1131 and the second limiting portion 1132.

In a possible embodiment of the present application, as shown in FIGS. 39 and 53, the sliding member 612 includes the first sliding block 6121 and an elastic member 6122. When the first sliding block 6121 is not mounted in the first sliding groove 113, the elastic member 6122 extends out of the surface of the first sliding block 6121. When the first sliding block 6121 is arranged in the first sliding groove 113 in a slidable manner, the elastic member 6122 is deformed and abuts against the first groove wall and the second groove wall of the first sliding groove 113. The first limiting portion 1131 and the second limiting portion 1132 limit a position of the elastic member 6122 to prevent the elastic member 6122 from sliding out of the first sliding groove 113. Since the sliding member 612 according to the present disclosure includes the first sliding block 6121 and the deformable elastic member 6122, the sliding member 612 is adaptive to more first sliding grooves 113 of different widths, and it is possible to avoid the case that the sliding member 612 cannot be mounted in the first sliding groove 113 due to an excessive width of the sliding member 612 caused by processing errors.

It should be noted that, the first sliding block 6121 may be of a round or elliptical slider structure, so as to improve the sliding smoothness of the first sliding block 6121 in the first sliding groove 113, thereby improving the convenience of adjustments. Alternatively, the first sliding block 6121 may be of a roller structure or the like, which may be designed according to different implementations, and is not described in detail herein.

In a possible embodiment of the present application, referring to FIG. 39, the elastic member 6122 includes the first elastic member 6122a and the second elastic member 6122b that are symmetric to each other. That is, the first elastic member 6122a and the second elastic member 6122b are respectively located at two opposite sides of the first sliding block 6121. The first elastic member 6122a and the second elastic member 6122b are both arranged in the first sliding groove 113 in a slidable manner, and respectively abut against the first groove wall and the second groove wall to apply a tensional force to the first groove wall and the second groove wall, thereby ensuring the workpiece to be conveyed stably, and further ensuring the processing effect on the workpiece.

It may be appreciated that, with the two elastic members, the extension frame body 611 may move not only more stably but also more smoothly, and the user experience is improved.

The first sliding block 6121 is connected to the extension frame body 611 in a detachable manner, so as to make replacement of the first sliding block 6121 on the extension frame 60 more convenient. The first elastic member 6122a and the second elastic member 6122b are connected through the first sliding block 6121.

In addition, referring to FIG. 39, the first elastic member 6122a and the second elastic member 6122b are arranged opposite to each other. Gaps are formed between the first elastic member 6122a and the first sliding block 6121, and between the second elastic member 6122b and the first sliding block 6121, so as to provide spaces for the first elastic member 6122a and the second elastic member 6122b to elastically deform. When the sliding member 612 is arranged in the first sliding groove 113 in a slidable manner, the first elastic member 6122a abuts against the first groove wall of the first sliding groove 113, and the second elastic member 6122b abuts against the second groove wall of the first sliding groove 113. Due to the gaps between the first elastic member 6122a and the first sliding block 6121 and between the second elastic member 6122b and the first sliding block 6121, the first elastic member 6122a and the second elastic member 6122b respectively apply a tensional force to the first groove wall and the second groove wall of the first sliding groove 113, so that the extension frame body 611 can hardly slide horizontally, thereby ensuring the normal operation of the laser processing apparatus, and further ensuring the processing effect of the laser processing apparatus on the workpiece. The first limiting portion 1131 and the second limiting portion 1132 limit positions of the first elastic member 6122*a* and the second elastic member 6122*b* to prevent the sliding member 612 from sliding out of the first sliding groove 113.

In a possible embodiment of the present application, referring to FIGS. 39 and 52, along a direction perpendicular to the surface of the feeding platform 110, the spacing distance between the first elastic member 6122*a* and the second elastic member 6122*b* is larger than the width of the first sliding block 113, so that the first elastic member 6122*a* and the second elastic member 6122*b* easily abut against the first groove wall and the second groove wall to apply a tensional force to the first groove wall and the second groove wall respectively, so as to prevent the extension frame 60 from shaking when conveying the workpiece, thereby ensuring the workpiece to be conveyed stably, and further ensuring the engraving effect.

In a possible embodiment of the present application, spacing distance between the first elastic member 6122*a* and the second elastic member 6122*b* is larger than a spacing distance between two opposite groove walls of a second sliding groove 114. The user may manually adjust the spacing distance between the first elastic member 6122*a* and the second elastic member 6122*b* in the direction perpendicular to the surface of the feeding platform 110. For example, the user may manually press the first elastic member 6122*a* and the second elastic member 6122*b* to decrease the spacing distance between the first elastic member 6122*a* and the second elastic member 6122*b* to be smaller than the width of the second sliding groove 114, so that the extension frame 60 can be easily mounted to or dismounted from the feeding platform 110.

It should be noted that, with the two elastic members, the sliding member 612 is ensured to be stable in the first sliding groove 113, and is prevented from shaking in movement.

In an embodiment of the present application, referring to FIG. 39, the first elastic member 6122*a* and the second elastic member 6122*b* each are of an arc strip structure. Arc apex faces of the first elastic member 6122*a* and the second elastic member 6122*b* respectively abut against the first groove wall of the first sliding groove 113 and the second groove wall of the first sliding groove 113. In this way, the first elastic member 6122*a* and the second elastic member 6122*b* better apply the tensional force to the first groove wall and second side groove wall respectively, leading to a better restoration performance, and a less possibility of being damaged.

In a possible embodiment of the present application, referring to FIG. 53, the feeding platform 110 further includes a second sliding groove 114 in communication with the first sliding groove 113. Along a sliding direction of the sliding member 612, a length of the second sliding groove 114 is larger than or equal to a length of the sliding member 612, such that the sliding member 612 is guided to be mounted into the first sliding groove 113.

For example, the first sliding groove 113 and the second sliding groove 114 are arranged in sequence along the sliding direction of the sliding member 612. Along the direction perpendicular to the surface of the feeding platform 110, a width of an opening of the second sliding groove 114 is larger than a width of the opening of the first sliding groove 113. It may be appreciated that two opposite groove walls of the second sliding groove 114 are respectively connected to the first groove wall and the second groove wall of the first sliding groove 113. That is, no limiting portion is provided on the second sliding groove 114, such that the sliding member 612 can be directly mounted into the second sliding groove 114. The first elastic member 6122*a* and the second elastic member 6122*b* of the sliding member 612 can enter the first sliding groove 113 through the second sliding groove 114, so that the first elastic member 6122*a* and the second elastic member 6122*b* slide into the first sliding groove 113, and respectively abut against the first groove wall and the second groove wall.

With the second sliding groove 114, it facilitates mounting the extension frame 60 in the first sliding groove 113, saves the time of mounting the extension frame 60 in the first sliding groove 113, and enhances the convenience of mounting the extension frame 60 in the feeding platform 110.

In a possible embodiment of the present application, the second sliding groove 114 is provided at one side of the first sliding groove 113, and the two extension frames 60 may enter the first sliding groove 113 in sequence through the second sliding groove 114. The spacing distance between the adjacent first sliding grooves 113 is manually adjusted to match workpieces of various sizes. A single second sliding groove 114 is provided, so the width of the first sliding groove 113 is increased to widen an adjustment range of the first sliding groove 113, and the design work for forming the second sliding groove is reduced to save the cost for designing the first sliding groove 113.

In another possible embodiment of the present application, referring to FIG. 53, along the sliding direction of the sliding member 612, the second sliding groove 114 is provided at each of two sides of the first sliding groove 113, and the extension frames 60 may respectively enter the first sliding groove 113 through different second sliding grooves 114. With the two second sliding grooves 114 opposite to each other, the time for assembling the extension frame 60 with the feeding platform 110 may be saved, and the convenience of mounting the extension frame 60 is enhanced.

In yet another possible embodiment of the present application, the feeding platform 110 may not be provided with the second sliding groove 114, and may be provided with only the first sliding groove 113. When the sliding member 612 is mounted, the first elastic member 6122*a* is mounted in the first sliding groove 113 firstly and abuts against the first groove wall. Then, the first elastic member 6122*a* and the second elastic member 6122*b* are pressed upwards such that the spacing distance between the first elastic member 6122*a* and the second elastic member 6122*b* becomes smaller than the width of the first sliding groove 113 to allow the first elastic member 6122*a* and the second elastic member 6122*b* to be engaged in the first sliding groove 113, thereby finishing the mounting of the sliding member 612 in the first sliding groove 113. In this way, the design of the second sliding groove 114 is eliminated, so that the first sliding groove 113 can be designed with a larger size. Therefore, more values of the spacing distance between adjacent extension frames 60 can be provided, thereby further improving the adaptability of the workpiece conveying device 1.

In a possible embodiment of the present application, as shown in FIG. 39, the extension frame 60 further includes a fixation portion 614. One side of the fixation portion 614 is connected to the sliding member 612, and the other side of the fixation portion 614 is connected to the extension frame body 611 in a detachable manner, facilitating the connection between the extension frame 60 and the first sliding groove 113.

In a possible embodiment of the present application, the feeding platform 110 is slidable in the conveying direction.

Optionally, the feeding platform 110 is provided with a rib, and the extension frame 60 is provided with a fifth sliding groove. The fifth sliding groove is engaged with the rib and is slidable along an extension direction of the rib, so that the position of the extension frame 60 can be adjusted by adjusting a position of the feeding platform 110, thereby increasing the width of the feeding platform 110 and thereby improving the adaptability of the workpiece conveying device 1.

In a possible embodiment of the present application, the extension frame 60 includes a first extension frame and a second extension frame. The feeding platform 110 is provided, on a first surface 115a (as shown in FIG. 1) and a second surface 115b (as shown in FIG. 2) opposite to each other, with at least two first sliding grooves 113 extending along the sliding direction of the sliding member 612. Each of the first extension frame and the second extension frame includes at least two extension sub-frames 610. The first extension frame is connected to at least one of the first sliding grooves on the first surface 115a in a detachable manner, and the second extension frame is connected to at least one of the first sliding grooves on the second surface 115b in a detachable manner. A spacing distance between the two adjacent extension sub-frames 610 is adjustable. The first extension frame and the second extension frame are arranged on two opposite sides of the conveying assembly, respectively. The conveying assembly is extended at the two sides, thereby increasing more application scenarios. It may be appreciated that, three or more first sliding grooves may be provided. The multiple first sliding grooves are arranged side by side along the sliding direction of the sliding member 612. The extension frames 60 are selectively connected to the multiple first sliding grooves of the feeding platform 110 to adjust a spacing distance between the first extension frame and the second extension frame, so as to match the size of the workpiece and improve the adaptability of the workpiece conveying device 1.

A computer numerical control apparatus CNC is further provided according to the present disclosure. The computer numerical control apparatus includes a processing device 2 and the workpiece conveying device 1 according to any one of the above embodiments. The processing device 2 is fixed in the fixing through hole 231 of the positioning member 230 of the workpiece conveying device 1. For example, the processing device 2 is a laser processing device. With this workpiece conveying device 1, a wide workpiece can be well processed; the processing effect on the workpiece can be improved; and the processing performance of the computer numerical control apparatus can be ensured.

It may be appreciated that the computer numerical control apparatus may be a laser processing apparatus, a laser cutting apparatus, a laser engraving apparatus, a machining apparatus or the like, which is not specifically limited herein.

In the description of this specification, descriptions referring to the terms "in some embodiments", "for example", etc., mean that specific features, structures, materials or characteristics described in connection with the embodiment or example are included in at least one embodiment of the present disclosure. In this specification, schematic expressions of the above terms do not necessarily refer to the same embodiment or example. Furthermore, the specific features, structures, materials or characteristics described may be combined in any suitable manner in any one or more embodiments or examples. In addition, those skilled in the art may conjunct or combine the different embodiments or examples, and the features thereof described in this specification without contradiction.

Although the embodiments of the present disclosure have been illustrated and described hereinabove, it may be appreciated that, the embodiments are merely exemplary, and cannot be construed as limitations to the present disclosure. Changes, modifications, substitutions, and variations may be made to the above embodiments by those skilled in the art within the scope of the present disclosure. Any variations or modifications made to the claims and description of the present disclosure are deemed to fall into the scope of the present disclosure.

The invention claimed is:

1. A workpiece conveying device for conveying a workpiece to a processing device, wherein the workpiece conveying device comprises a first conveying assembly and a second conveying assembly,
the first conveying assembly and the second conveying assembly are arranged facing each other, and are configured to contact and convey the workpiece,
the first conveying assembly and the second conveying assembly are spaced apart from each other to form a clamping portion in which the workpiece is clamped,
the first conveying assembly comprises a first roller and a feeding platform, the first roller is arranged on the feeding platform and extends out of a surface of the feeding platform, the feeding platform is configured to support the workpiece, and the first roller is configured to contact and convey the workpiece,
the first conveying assembly further comprises a first rotating shaft; the feeding platform is provided with an accommodation chamber at a side of the feeding platform facing away from the second conveying assembly, and a hole at the surface of the feeding platform close to the second conveying assembly; the first rotating shaft is arranged in the accommodation chamber, and the first roller is fixedly provided on the first rotating shaft and extends out of the feeding platform through the hole.

2. The workpiece conveying device according to claim 1, wherein the first conveying assembly further comprises:
a driving component, wherein the driving component is arranged in the accommodation chamber, is connected to the first rotating shaft, and is configured to rotate the first rotating shaft, which in turn rotates the first roller; and/or
a first knob, wherein the first knob is arranged at a side surface of the feeding platform, is connected to the first rotating shaft, and is configured to rotate the first rotating shaft, which in turn rotates the first roller.

3. The workpiece conveying device according to claim 2, further comprising a lifting assembly, wherein the lifting assembly is in connection with the first conveying assembly and the second conveying assembly, and is configured to adjust a spacing distance between the first conveying assembly and the second conveying assembly and thus adjust a size of the clamping portion.

4. The workpiece conveying device according to claim 3, wherein
the second conveying assembly comprises a second roller and a support frame that are connected to each other, the second roller is configured to contact and convey the workpiece; and
the lifting assembly is in connection with the support frame and the feeding platform, and is configured to adjust the support frame away from or close to the feeding platform.

5. The workpiece conveying device according to claim 3, wherein the driving component comprises a driving motor which comprises a body portion and an output shaft connected to the body portion, the body portion of the driving motor is arranged inside the accommodation chamber, and the output shaft of the driving motor passes through a casing of the feeding platform to the outside of the accommodation chamber, the output shaft is drivingly connected to an end of the first rotating shaft exposed outside the accommodation chamber.

6. The workpiece conveying device according to claim 5, wherein the lifting assembly comprises two fixing frames that are respectively located on two opposite sides of the feeding platform and are arranged in sequence in an axial direction of the first rotating shaft.

7. A workpiece conveying device for conveying a workpiece to a processing device, wherein the workpiece conveying device comprises a first conveying assembly, a second conveying assembly, and a lifting assembly, the first conveying assembly and the second conveying assembly are arranged facing each other, and are configured to contact and convey the workpiece, the first conveying assembly and the second conveying assembly are spaced apart from each other to form a clamping portion in which the workpiece is clamped, the lifting assembly comprises a second rotating shaft, a movable member, and a turning member;

the movable member is provided on the second rotating shaft, and is movable along an extension direction of the second rotating shaft;

one end of the turning member is rotatably connected to the movable member, and the other end of the turning member is rotatably connected to the second conveying assembly; and the movable member is configured to move along the extension direction of the second rotating shaft when the second rotating shaft rotates, so as to drive the turning member to rotate, which in turn drives the second conveying assembly to move close to or away from the first conveying assembly.

8. The workpiece conveying device according to claim 7, further comprising a lifting assembly, wherein the lifting assembly is in connection with the first conveying assembly and the second conveying assembly, and is configured to adjust a spacing distance between the first conveying assembly and the second conveying assembly and thus adjust a size of the clamping portion.

9. The workpiece conveying device according to claim 8, wherein the second conveying assembly comprises a second roller and a support frame that are connected to each other, the second roller is configured to contact and convey the workpiece;

the other end of the turning member is rotatably connected to the support frame, and the lifting assembly is in connection with the support frame and the first conveying assembly, and is configured to adjust the support frame away from or close to the first conveying assembly.

10. The workpiece conveying device according to claim 9, wherein the first conveying assembly comprises a first roller and a feeding platform, the first roller is arranged on the feeding platform and extends out of a surface of the feeding platform, the feeding platform is configured to support the workpiece, and the first roller is configured to contact and convey the workpiece;

the first roller and the second roller face and are spaced apart from each other to form the clamping portion; and the lifting assembly is in connection with the support frame and the feeding platform, and is configured to adjust the support frame away from or close to the feeding platform.

11. The workpiece conveying device according to claim 10, wherein the first conveying assembly further comprises a pressing rod, the feeding platform is provided with a pressing rod engagement portion extending from the surface of the feeding platform, the pressing rod engagement portion is provided with an engagement hole, and the pressing rod is detachably mounted on the pressing rod engagement portion through the engagement hole, and there is a gap between the pressing rod and the surface of the feeding platform for passage of the workpiece.

12. The workpiece conveying device according to claim 7, wherein a first groove is provided on a side of the second conveying assembly close to the second rotating shaft, and the turning member is rotatably connected to an inner wall of the first groove; and/or the lifting assembly further comprises a housing, the housing is connected to the second conveying assembly to define an accommodation cavity in which the second rotating shaft, the movable member and the turning member are located; and/or the second rotating shaft is provided with two limiting portions, the movable member is located between the two limiting portions, and the two limiting portions are configured to limit a moving stroke of the movable member.

13. The workpiece conveying device according to claim 7, wherein the lifting assembly further comprises a second knob and a fixing frame, and the fixing frame is arranged on the first conveying assembly;

both ends of the second rotating shaft are connected to the fixing frame, and one of the two ends of the second rotating shaft passes through the fixing frame to be connected to the second knob; and the second knob is configured to rotate the second rotating shaft, so that the movable member moves along an axial direction of the second rotating shaft.

14. The workpiece conveying device according to claim 13, wherein the fixing frame is provided with second grooves, both ends of the second conveying assembly are connected in such a manner as to be slidable in the second grooves respectively, and the second conveying assembly is configured to move close to or away from the first conveying assembly as the turning member is turned; and/or the workpiece conveying device further comprises a positioning member, the positioning member is connected to the fixing frame, and the positioning member is configured to fix a processing device.

15. The workpiece conveying device according to claim 7, wherein two opposite ends of the second rotating shaft are respectively provided with a first thread segment and a second thread segment which have threads provided in opposite directions, and the movable member comprises a first movable member and a second movable member, each of the first movable member and the second movable member is provided with an internal thread; the internal thread of the first movable member is rotatably engaged with the first thread segment so as to move when the second rotating shaft rotates; and the internal thread of the second movable member is rotatably engaged with the second thread segment so as to move when the second rotating shaft rotates, the turning member comprises a first turning member and a second turning member, each of which is in the form of a connecting rod; two ends of the first turning member are rotatably connected to the first movable member and the second conveying assembly respectively, and two ends of the second turning member are rotatably connected to the second movable member and the second conveying assembly respectively; and the first turning member and the second turning member are symmetrically arranged with respect to an axis perpendicular to the second rotating shaft.

16. A workpiece conveying device for conveying a workpiece to a processing device, wherein the workpiece conveying device comprises a first conveying assembly, a second conveying assembly, and an extension frame, the first conveying assembly and the second conveying assembly are arranged facing each other, and are configured to contact and convey the workpiece, the first conveying assembly and the second conveying assembly are spaced apart from each other to form a clamping portion in which the workpiece is clamped a length direction of the extension frame is parallel to a conveying direction of the workpiece, the first conveying assembly extends and is arranged in a direction perpendicular to the length direction of the extension frame, the first conveying assembly comprises a first roller and a feeding platform, the first roller is arranged on the feeding platform and extends out of a surface of the feeding platform, and the extension frame is connected to the feeding platform of the first conveying assembly to support the workpiece conveyed to a processing device.

17. The workpiece conveying device according to claim 16, wherein the feeding platform is provided with a first sliding groove, and the extension frame comprises an extension frame body and a sliding member, the sliding member is arranged in the first sliding groove in a slidable manner, such that the extension frame is connected to the feeding platform in a slidable manner.

18. The workpiece conveying device according to claim 17, wherein the first sliding groove comprises a first groove wall and a second groove wall that are opposite to each other, and the feeding platform further comprises a first limiting portion and a second limiting portion, the first limiting portion is connected to the first groove wall, and the second limiting portion is connected to the second groove wall, and a distance between the first limiting portion and the second limiting portion is smaller than a distance between the first groove wall and the second groove wall.

19. The workpiece conveying device according to claim 18, wherein the sliding member comprises a first sliding block and an elastic member, the elastic member is configured to extend beyond a surface of the first sliding block when the first sliding block is not mounted in the first sliding groove, and to be deformed and abut against the first groove wall and the second groove wall of the first sliding groove when the first sliding block is mounted in the first sliding groove.

20. The workpiece conveying device according to claim 17, wherein the feeding platform is further provided with a second sliding groove in communication with the first sliding groove, and each of the first sliding groove and the second sliding groove extends in a direction perpendicular to the conveying direction of the workpiece, and in a sliding direction of the sliding member, a length of the second sliding groove is larger than or equal to a length of the sliding member.

21. The workpiece conveying device according to claim 16, wherein the extension frame comprises a first extension frame and a second extension frame, the feeding platform is provided with at least two first sliding grooves on a first surface and a second surface opposite to each other, the first extension frame is detachably connected to at least one of the first sliding grooves on the first surface, and the second extension frame is detachably connected to at least one of the first sliding grooves on the second surface, and each of the first extension frame and the second extension frame comprises at least two extension sub-frames connected to the first sliding groove in a slidable manner, and a spacing distance between the two adjacent extension sub-frames is adjustable.

22. The workpiece conveying device according to claim 16, wherein a connecting plate is arranged on the sliding member, and is configured to fix the position of the extension frame relative to the feeding platform, the connecting plate is provided with a fixation hole, a screw passes through the fixation hole and is in a threaded connection with the fixation hole, an end portion of the screw abuts against an inner wall of the first sliding groove.

23. A workpiece conveying device for conveying a workpiece to a processing device, wherein the workpiece conveying device comprises a first conveying assembly, a second conveying assembly, and a connector, the first conveying assembly and the second conveying assembly are arranged facing each other, and are configured to contact and convey the workpiece, the first conveying assembly and the second conveying assembly are spaced apart from each other to form a clamping portion in which the workpiece is clamped, wherein the connector comprises:

a first fixing member connected to the second conveying assembly;

a measurement component connected to the first fixing member and configured to measure the pressure on the workpiece; and a display portion arranged on the first fixing member and/or the measurement component, and configured to display pressure information measured by the measurement component, the measurement component is rotatably connected to the first fixing member, the second conveying assembly is connected to the measurement component, and is configured to contact the workpiece to drive the measurement component to rotate with respect to the first fixing member.

24. The workpiece conveying device according to claim 23, wherein the connector further comprises an indicating component, and the display portion is provided with a viewing window; the indicating component is connected to the measurement component and is aligned with the viewing window so that the indicating component shows a pressure information measured by the measurement component through the viewing window.

25. The workpiece conveying device according to claim 24, wherein the indicating component is provided with a pressure marking, and wherein the display portion is provided on the first fixing member, one end of the indicating component is connected to the measurement component, the other end of the indicating component passes through the first fixing member such that the pressure marking corresponds to the viewing window; and the first fixing member is movably connected to the measurement component; and/or wherein the display portion is provided with a through groove, and a side wall of the through groove is provided with the viewing window; and the pressure marking of the indicating component is movably arranged in the through groove, such as to be displayed through the viewing window.

26. The workpiece conveying device according to claim 23, further comprising a lifting assembly, wherein the second conveying assembly comprises a second roller and a support frame that are connected to each other, the second roller is configured to contact and convey the workpiece, the lifting assembly is in connection with the support frame and the first conveying assembly, and is configured to adjust the support frame away from or close to the first conveying assembly.

27. The workpiece conveying device according to claim 26, wherein a first connecting portion and a second connecting portion are provided on the first fixing member, one end of the first connecting portion is connected to the first fixing member, and the other end of the first connecting portion is rotatably connected to the measurement component, the second connecting portion is connected to the second conveying assembly, and the connector further comprises an elastic portion, and the measurement component comprises a support portion; one end of the elastic portion is connected to the support portion, and the other end of the elastic portion is connected to the first fixing member; the elastic portion is configured to change a distance between the first fixing member and the measurement component.

28. The workpiece conveying device according to claim 27, wherein the measurement component further comprises a rotating shaft and a hollow portion, the hollow portion is provided on the support portion, the rotating shaft is connected to the support portion, the rotating shaft and the hollow portion define a roller holding portion, the second roller is rotatably provided on the rotating shaft, and at least a part of the second roller is located in the roller holding portion, and the second roller is configured to contact the workpiece.

29. The workpiece conveying device according to claim 23, wherein the display portion comprises:

a scale and an indicator, wherein one of the scale and the indicator is arranged on the first fixing member, and the other one of the scale and the indicator is arranged on the measurement component, the first fixing member is movably connected to the measurement component; and/or an observation structure, wherein the observation structure is arranged around a viewing window and is funnel-shaped.

30. The workpiece conveying device according to claim 24, wherein the measurement component is provided with an engaged portion, and the indicating component comprises an engaging portion connected to the pressure marking, the pressure marking indicates at least two different pieces of pressure information, the engaging portion is connected to the engaged portion, such that the indicating component is fixed to the measurement component, the engaged portion is provided with a positioning groove, and the engaging portion is provided with a positioning protrusion inserted into the positioning groove.

31. A computer numerical control apparatus, comprising a laser processing device and a workpiece conveying device, wherein the workpiece conveying device comprises a first conveying assembly, a second conveying assembly, and a lifting assembly, the first conveying assembly and the second conveying assembly are arranged facing each other, and are configured to contact and convey a workpiece;

the first conveying assembly and the second conveying assembly are spaced apart from each other to form a clamping portion in which the workpiece is clamped, the lifting assembly comprises a second rotating shaft, a movable member, and a turning member;

the movable member is provided on the second rotating shaft, and is movable along an extension direction of the second rotating shaft;

one end of the turning member is rotatably connected to the movable member, and the other end of the turning member is rotatably connected to the second conveying assembly, the movable member is configured to move along the extension direction of the second rotating shaft when the second rotating shaft rotates, so as to drive the turning member to rotate, which in turn drives the second conveying assembly to move close to or away from the first conveying assembly, wherein the laser processing device is connected to the workpiece conveying device, the workpiece conveying device is configured to convey a workpiece to the laser processing device, and the laser processing device is configured to perform laser processing on the workpiece.

32. A computer numerical control apparatus, comprising a laser processing device and a workpiece conveying device, wherein the workpiece conveying device comprises a first conveying assembly, a second conveying assembly, and an extension frame, the first conveying assembly and the second conveying assembly are arranged facing each other, and are configured to contact and convey a workpiece, the first conveying assembly and the second conveying assembly are spaced apart from each other to form a clamping portion in which the workpiece is clamped, a length direction of the extension frame is parallel to a conveying direction of the workpiece, the first conveying assembly extends and is arranged in a direction perpendicular to the length direction of the extension frame, the first conveying assembly comprises a first roller and a feeding platform, the first roller is arranged on the feeding platform and extends out of a surface of the feeding platform, and the extension frame is connected to the feeding platform of the first conveying assembly to support the workpiece conveyed to a processing device, the laser processing device is connected to the workpiece conveying device, the workpiece conveying device is configured to convey a workpiece to the laser processing device, and the laser processing device is configured to perform laser processing on the workpiece.

33. A computer numerical control apparatus, comprising a laser processing device and a workpiece conveying device, wherein the workpiece conveying device comprises a first conveying assembly, a second conveying assembly, and a connector, the first conveying assembly and the second conveying assembly are arranged facing each other, and are configured to contact and convey a workpiece, the first conveying assembly and the second conveying assembly are spaced apart from each other to form a clamping portion in which the workpiece is clamped, wherein the connector comprises:

a first fixing member connected to the second conveying assembly;

a measurement component connected to the first fixing member and configured to measure the pressure on the workpiece; and a display portion arranged on the first fixing member and/or the measurement component, and configured to display pressure information measured by the measurement component, the measurement component is rotatably connected to the first fixing member, the second conveying assembly is connected to the measurement component, and is configured to contact the workpiece to drive the measurement component to rotate with respect to the first fixing member, the laser processing device is connected to the workpiece conveying device, the workpiece conveying device is configured to convey a workpiece to the laser processing device, and the laser processing device is configured to perform laser processing on the workpiece.

* * * * *